United States Patent [19]

Manabe et al.

[11] 4,201,144
[45] May 6, 1980

[54] CONTROL SYSTEMS FOR AUTOMATIC SEWING MACHINES

[75] Inventors: Takao Manabe, Sunto; Shigetugu Matunaga, Numazu; Shinji Machi, Mishima, all of Japan

[73] Assignee: Toshiba Kikai Kabushiki Kaisha, Tokyo, Japan

[21] Appl. No.: 895,652

[22] Filed: Apr. 12, 1978

[30] Foreign Application Priority Data

Apr. 15, 1977 [JP] Japan ................. 52-43803

[51] Int. Cl.$^2$ ............................. D05B 21/00
[52] U.S. Cl. ................................ 112/121.12
[58] Field of Search ............. 112/121.12, 121.11, 112/121.15

[56] References Cited
U.S. PATENT DOCUMENTS

| | | | |
|---|---|---|---|
| 3,810,414 | 5/1974 | Gerber | 112/121.12 X |
| 3,982,491 | 9/1976 | Herzer et al. | 112/121.12 |
| 4,073,247 | 2/1978 | Cunningham et al. | 112/121.12 |
| 4,114,545 | 9/1978 | Manabe et al. | 112/121.15 |
| 4,116,143 | 9/1978 | Manabe | 112/121.11 |

*Primary Examiner*—Peter P. Nerbun
*Attorney, Agent, or Firm*—Koda and Androlia

[57] ABSTRACT

The automatic sewing machine comprises a sewing head mounted on a table, cloth clamping plates driven by pulse motors in X and Y axis directions of rectangular coordinates on the table, and a pulse generator for applying driving pulses to the pulse motors. The control system of the sewing machine comprises a PROM including a first code region representing the type of control and a second region for storing data required to store data utilized to perform respective sewing steps, a sewing machine operation panel unit including a control signal generator for controlling the operation of the sewing machine, a bus line between the PROM and the sewing machine operation panel unit, a RAM including a first memory region for storing the pulse motor drive pulses and the control signals, and a second region for storing the data corresponding to an address count value for designating an address of the PROM and the type of control and the data in the second code region, a central processor unit, and PROM/ROM connected to the PROM, RAM and the central processor unit through the bus line. The PROM/ROM contains a program of various instruction groups for sequentially forming operation instructions for operating the pulse motors and the head.

19 Claims, 54 Drawing Figures

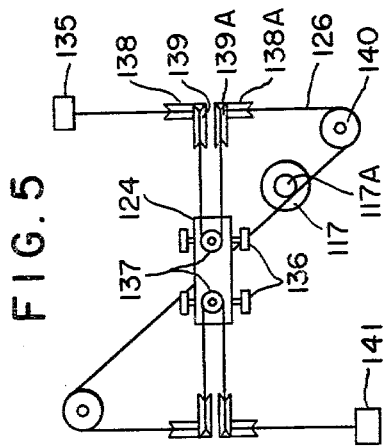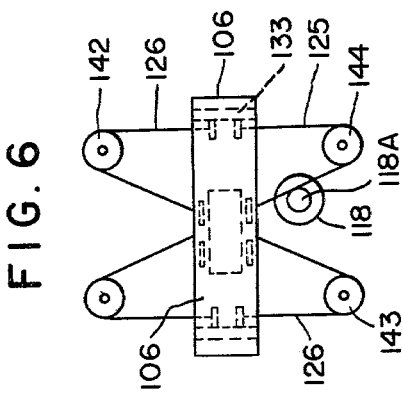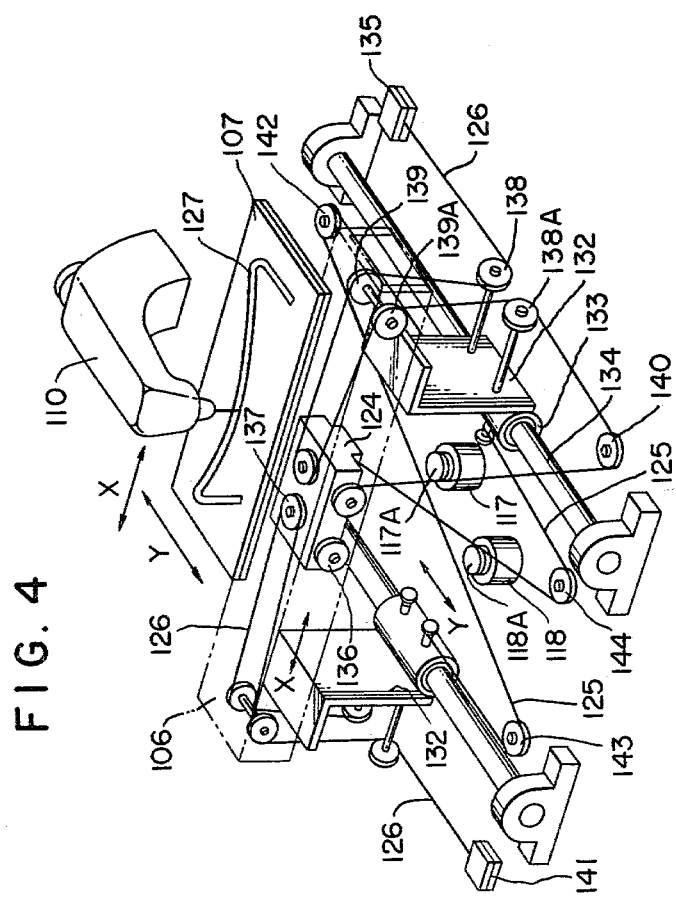

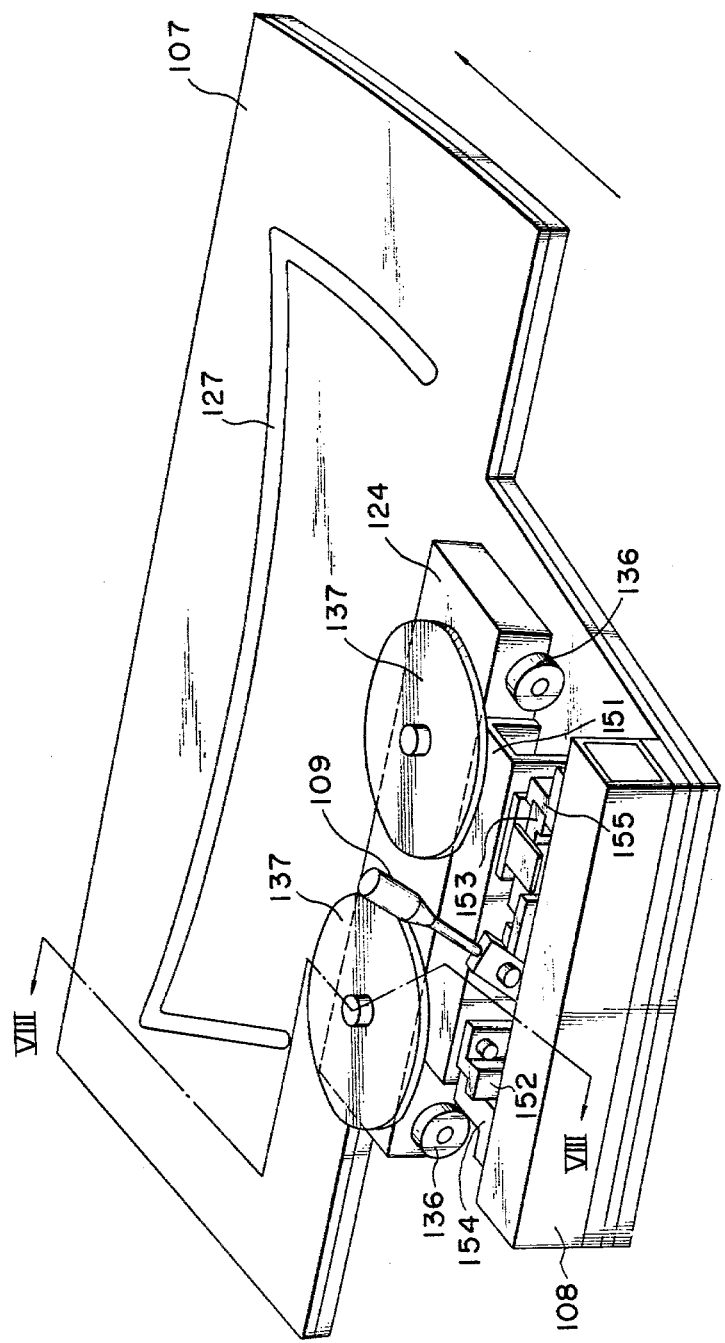

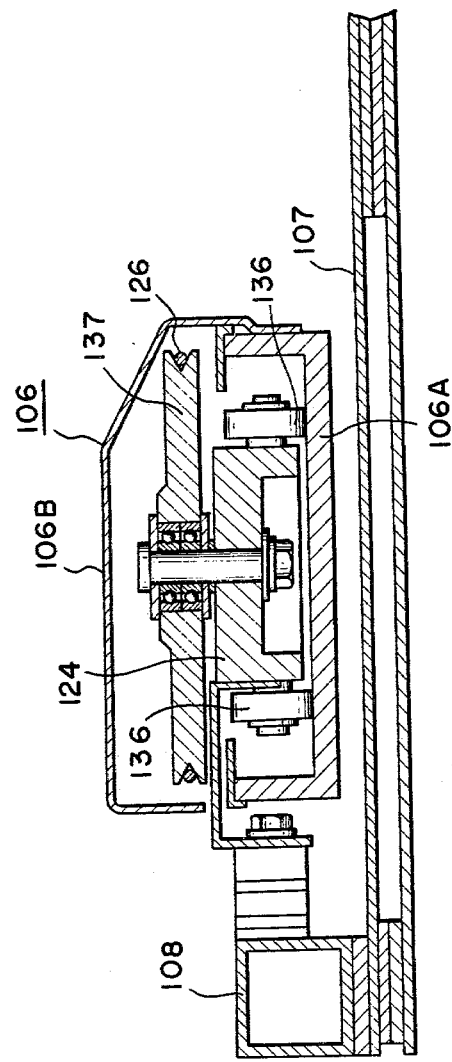

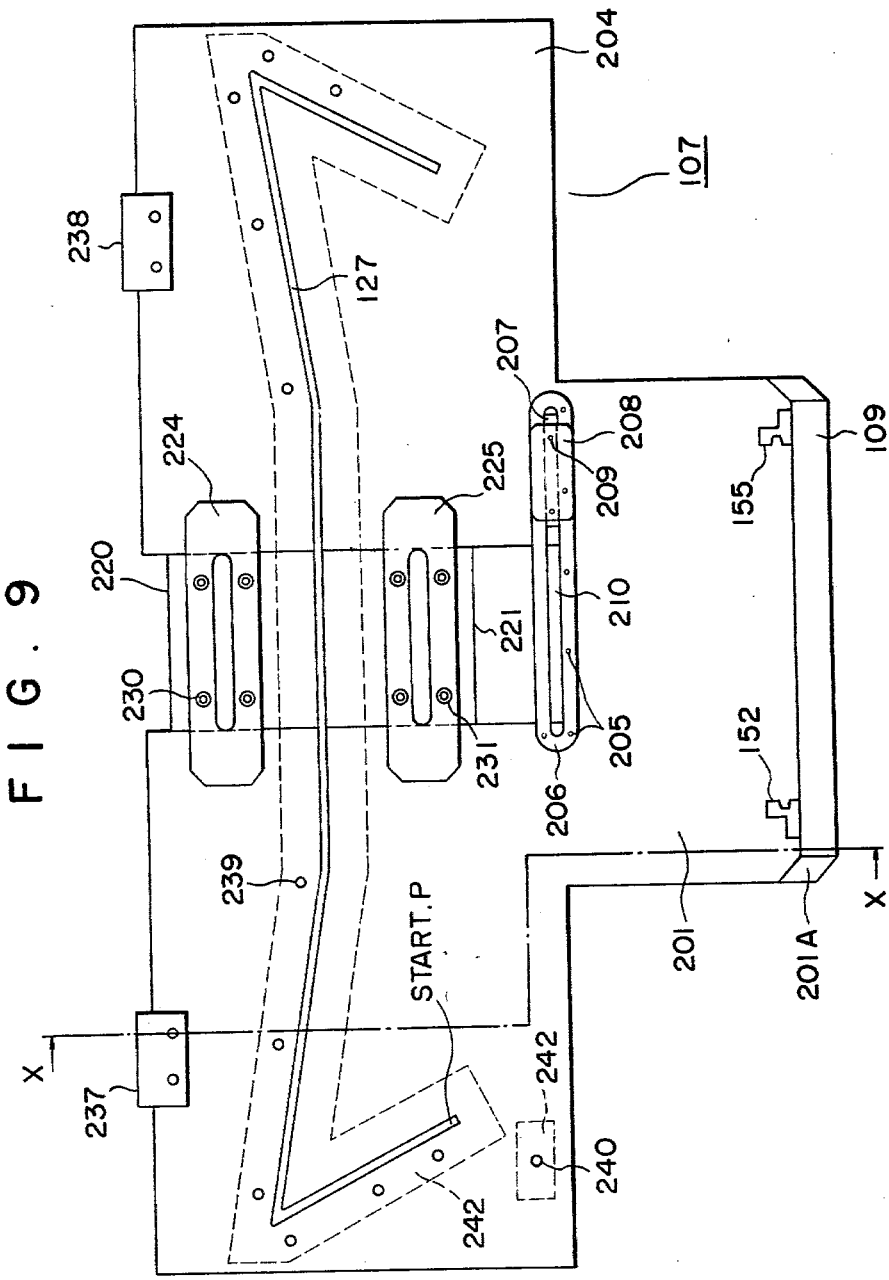

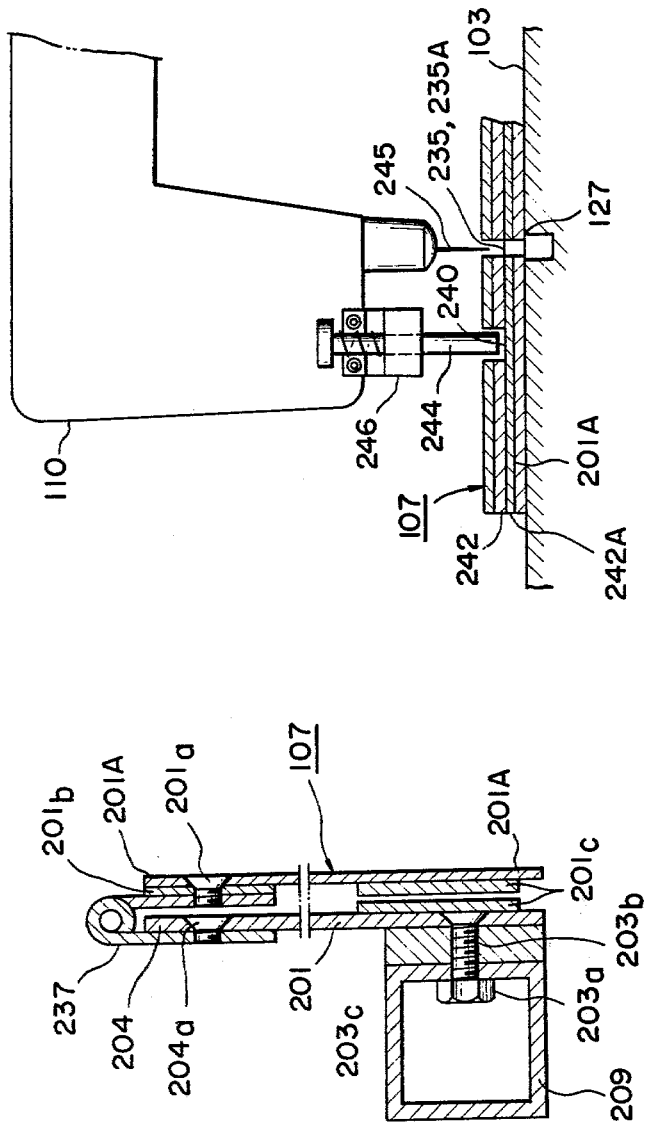

F I G. 13
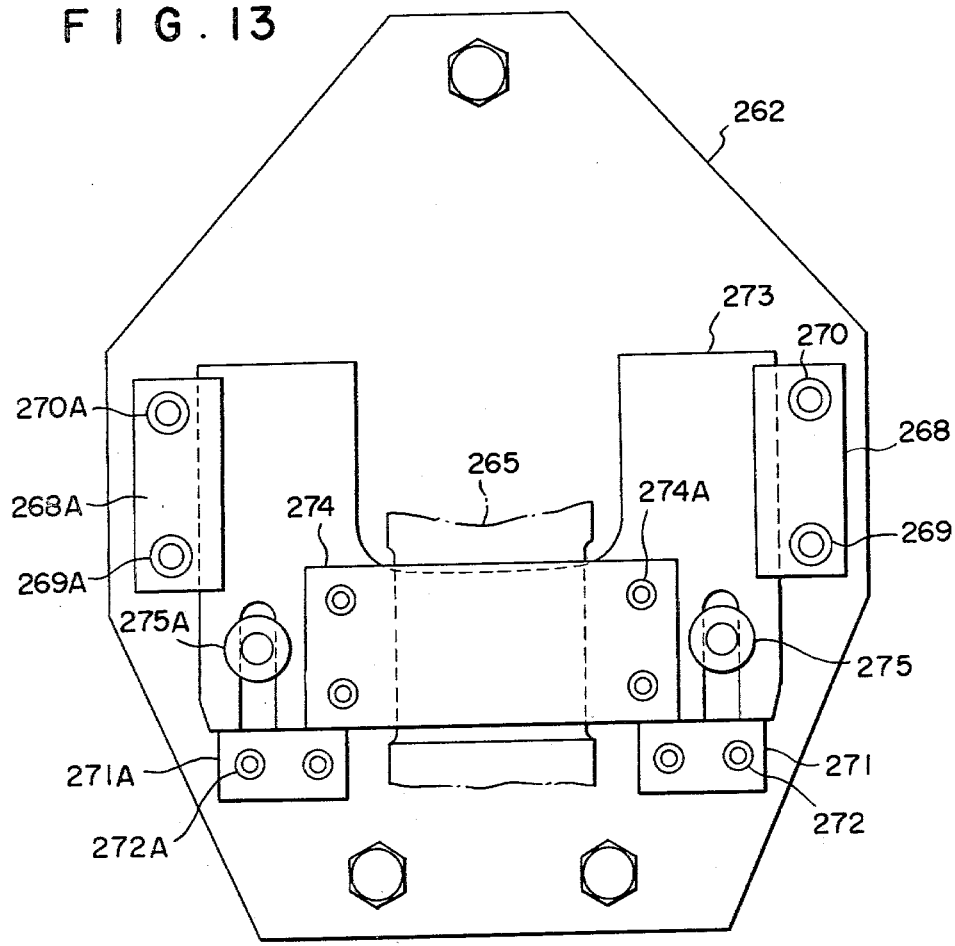
F I G. 14
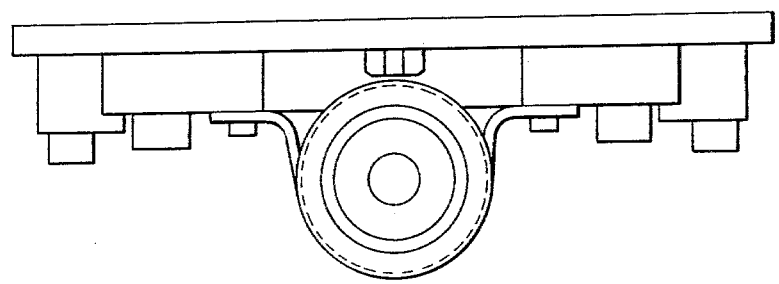

FIG. 15

| PROM NO. | (1) | | | | | | | | (2) | | | | | | | | (3) | | | | | | | |
|---|---|---|---|---|---|---|---|---|---|---|---|---|---|---|---|---|---|---|---|---|---|---|---|---|
| TYPE OF DATA | INDEX OF CONTROL | | | | CONTROL SIGNAL | | X CODE | AMOUNT OF MOVEMENT IN X DIRECTION | | | | Y CODE | AMOUNT OF MOVEMENT IN Y DIRECTION | | | | OPERATION NUMBER | | | | | | | |
| BIT NUMBER OF PROM | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| OUTPUT SIGNAL | D11 | D12 | D13 | D14 | D15 | D16 | D17 | D18 | D21 | D22 | D23 | D24 | D25 | D26 | D27 | D28 | D31 | D32 | D33 | D34 | D35 | D36 | D37 | D38 |
| | 0 | 0 | 0 | 0 (DATA CODE) | "1" AT HIGH SPEED | "1" AT LOW SPEED | (0·POSITIVE) (1·NEGATIVE) | 0 ~ 15 PULSES | | | | (0·POSITIVE) (1·NEGATIVE) | 0 ~ 15 PULSES | | | | BCD UP TO 99 | | | | | | | |
| REMARK | 0 | 0 | 0 | 1 | | | | | | | | | | | | | | | | | | | | |
| | ~ | | | | | | | | | | | | | | | | | | | | | | | |
| | 1 | 1 | 1 | 0 (MIRROR CODE) | | | | | | | | | | | | | | | | | | | | |
| | 1 | 1 | 1 | 0 (OPTIONAL STOP CODE) | | | | | | | | | | | | | | | | | | | | |
| | 1 | 1 | 1 | 1 (STOP CODE) | | | | | | | | | | | | | | | | | | | | |

F I G. 16
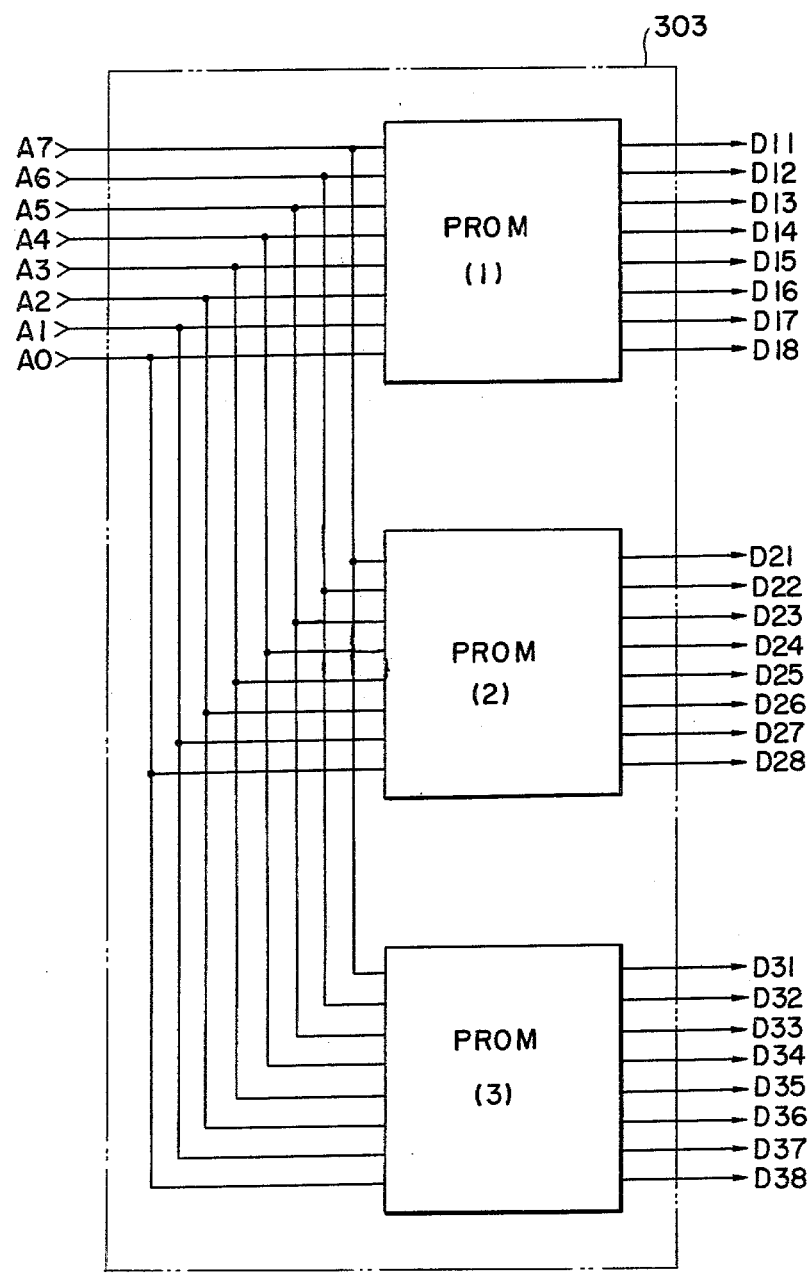

FIG. 20a

| Output of Address Counter (Decimal) | Type of Control | | | | Control (High) (Low) | | X Signe | Amount of Movement in X Direction | | | | Y Signe | Amount of Movement in Y Direction | | | |
|---|---|---|---|---|---|---|---|---|---|---|---|---|---|---|---|---|
| | D11 | D12 | D13 | D14 | D15 | D16 | D17 | D18 | D21 | D22 | D23 | D24 | D25 | D26 | D27 | D28 |
| 0 | — | — | — | — | O | O | O | O | O | O | O | O | O | O | O | O |
| 1 | O | O | O | O | O | O | O | O | O | O | O | — | — | — | — | — |
| 2 | — | — | — | O | O | O | O | O | O | O | O | O | O | O | O | O |
| 3 | O | O | O | O | O | — | O | O | O | O | O | O | O | O | O | O |
| 4 | O | O | O | O | — | O | — | O | — | O | O | O | — | — | O | O |
| 5 | O | O | O | O | — | O | — | O | O | — | O | O | O | O | O | O |
| 6 | O | O | O | O | — | O | O | — | — | — | O | — | O | O | — | O |
| 7 | O | O | O | O | — | O | O | O | — | — | — | — | O | — | — | — |
| 8 | O | O | O | O | — | O | O | — | — | — | — | O | O | O | O | O |
| 9 | O | O | O | O | — | O | O | O | O | O | O | O | O | O | O | O |
| 10 | O | O | O | — | — | O | O | — | O | O | O | O | O | O | O | O |
| 11 | O | O | — | O | — | O | O | O | O | O | O | O | O | O | O | O |
| 12 | O | O | O | O | — | O | O | — | O | O | O | O | O | O | O | O |
| 13 | O | — | — | — | — | O | O | O | O | O | O | O | O | O | O | O |
| 14 | — | — | — | — | O | O | O | O | O | O | O | — | — | — | — | — |
| 15 | O | O | O | O | O | O | O | O | O | O | O | — | — | — | — | — |
| 16 | | | | | | | | | | | | | | | | |
| 17 | | | | | | | | | | | | | | | | |
| 18 | | | | | | | | | | | | | | | | |

DATA FOR OTHER PROFILES

FIG. 20b

| OUTPUT OF ADDRESS COUNTER (DECIMAL) | OPERATION NUMBER DATA UPPER BITS | | | | LOWER BITS | | | | REMARK |
|---|---|---|---|---|---|---|---|---|---|
| | D31 | D32 | D33 | D34 | D35 | D36 | D37 | D38 | |
| 0 | 0 | 0 | 0 | 0 | 0 | 0 | 0 | 0 | STOP CODE |
| 1 | 0 | 0 | 0 | 1 | 0 | 0 | 0 | 0 | MOVE FROM PROGRAM ORIGIN P0 TO P1 |
| 2 | 0 | 0 | 1 | 0 | 0 | 0 | 0 | 0 | ALIGNING OF OPTIONAL STOP START POINT P1 |
| 3 | 0 | 0 | 0 | 0 | 0 | 0 | 0 | 1 | NEEDLE LOW SPEED INSTRUCTION (SEW POINT P1) |
| 4 | 0 | 0 | 0 | 1 | 0 | 1 | 0 | 0 | NEEDLE HIGH SPEED INSTRUCTION (SEW POINTS P2-P3) |
| 5 | 0 | 0 | 0 | 0 | 0 | 0 | 0 | 1 | SEW POINT P4 |
| 6 | 0 | 0 | 0 | 1 | 0 | 0 | 0 | 0 | SEW POINTS P5-P6 |
| 7 | 0 | 0 | 0 | 0 | 0 | 0 | 1 | 0 | SEW POINT P7 |
| 8 | 0 | 0 | 0 | 0 | 0 | 1 | 0 | 0 | SEW POINTS P8-P9 |
| 9 | 0 | 0 | 0 | 0 | 0 | 0 | 0 | 0 | M CODE RETURN FROM POINT P9 |
| 10 | 0 | 0 | 0 | 0 | 0 | 0 | 1 | 1 | SEW POINTS P10-P11 |
| 11 | 0 | 0 | 0 | 0 | 0 | 0 | 0 | 0 | M CODE RETURN FROM POINT P11 |
| 12 | 0 | 0 | 0 | 0 | 0 | 1 | 0 | 1 | SEW POINTS P12-P13 |
| 13 | 0 | 0 | 0 | 0 | 0 | 0 | 0 | 0 | M CODE RETURN FROM POINT P13 |
| 14 | 0 | 0 | 0 | 0 | 0 | 0 | 0 | 0 | STOP CODE |
| 15 | 0 | 0 | 1 | 0 | 0 | 0 | 0 | 0 | MOVEMENT BETWEEN PROGRAM ORIGIN AND START POINT |
| 16 | | | | | | | | | |
| 17 | | | | | | | | | |
| 18 | | | | | | | | | |

FIG. 22a

| OUTPUT OF ADDRESS COUNTER (DECIMAL) | TYPE OF CONTROL | | | | CONTROL (HIGH)(LOW) | | SIGNE X | AMOUNT OF MOVEMENT IN X DIRECTION | | | | | | SIGNE Y | AMOUNT OF MOVEMENT IN Y DIRECTION | | | | OPERATION NUMBER DATA | | | | | | | |
|---|---|---|---|---|---|---|---|---|---|---|---|---|---|---|---|---|---|---|---|---|---|---|---|---|---|
| | | | | | | | | | | | | | | | | | | | UPPER BITS | | | | LOWER BITS | | | |
| | D11 | D12 | D13 | D14 | D15 | D16 | D17 | D18 | D21 | D22 | D23 | D24 | D25 | D26 | D27 | D28 | D31 | D32 | D33 | D34 | D35 | D36 | D37 | D38 |
| 0 | — | — | — | — | O | O | O | O | O | O | O | O | O | O | O | O | O | O | O | O | O | O | O | O |
| 1 | O | O | O | O | O | O | O | O | O | O | O | O | — | O | — | — | O | O | O | O | — | O | O | O |
| 2 | — | — | — | O | O | O | O | O | O | O | O | O | O | O | O | O | O | O | O | O | O | O | O | O |
| 3 | O | O | O | O | — | — | O | O | O | O | O | O | O | O | O | O | O | O | O | O | O | O | O | — |
| 4 | O | O | O | O | — | O | O | O | O | O | O | — | — | O | O | O | O | O | O | O | O | — | O | O |
| 5 | O | O | O | O | — | O | O | O | O | O | O | — | O | — | O | O | O | O | O | O | O | O | — | — |
| 6 | O | O | O | O | — | O | O | O | — | — | O | — | O | — | O | O | O | O | O | O | O | O | O | — |
| 7 | O | O | O | O | — | O | O | — | — | O | O | — | O | O | O | O | O | O | O | O | O | O | O | O |
| 8 | O | O | O | O | — | O | O | — | O | O | O | O | O | O | O | O | O | O | O | O | O | O | O | O |
| 9 | O | O | O | O | — | O | O | — | O | O | — | O | O | O | O | O | O | O | O | O | — | — | O | — |
| 10 | O | O | O | O | — | O | O | O | O | — | O | O | O | O | O | — | O | O | O | O | O | O | O | — |
| 11 | O | O | O | O | O | O | O | O | O | O | O | O | — | O | O | O | O | O | O | O | O | O | O | — |
| 12 | O | O | O | O | O | O | O | O | O | O | O | O | — | O | O | O | O | O | O | — | O | O | O | — |
| 13 | O | — | O | — | O | O | O | O | O | O | O | O | O | O | O | O | O | O | O | O | — | O | O | O |
| 14 | — | — | — | O | O | O | O | — | — | — | — | O | O | O | — | — | O | O | O | O | — | — | O | — |
| 15 | O | O | O | O | O | O | O | — | O | O | O | O | O | O | O | O | O | O | O | O | O | — | — | O |
| 16 | O | — | O | — | O | O | O | O | O | O | O | O | O | O | O | O | O | O | O | O | O | — | O | O |
| 17 | O | O | O | — | O | O | O | O | O | — | O | O | O | O | O | — | O | O | O | O | O | O | O | O |
| 18 | — | — | — | — | O | O | O | O | O | O | O | O | O | O | O | O | O | O | O | O | O | O | O | O |

FIG. 22b

| OUTPUT OF ADDRESS COUNTER (DECIMAL) | REMARK |
|---|---|
| 0 | STOP CODE |
| 1 | MOVEMENT FROM POINT Q0 TO Q1 |
| 2 | OPTIONAL STOP |
| 3 | SEW POINT Q1 |
| 4 | SEW POINTS a1 ~ a6 |
| 5 | SEW POINT a7 |
| 6 | SEW POINT a8 |
| 7 | SEW POINT a9 |
| 8 | a10 ~ a9' |
| 9 | a8' |
| 10 | a7' |
| 11 | a6' |
| 12 | a5' ~ Q3 |
| 13 | Q3 → Q4 |
| 14 | Q6 → Q7 |
| 15 | Q8 → Q9 |
| 16 | Q10 → Q11 |
| 17 | Q12 → Q13 |
| 18 | STOP CODE |

Rows 13–17: SKIP CODES

FIG. 23a

| OUTPUT OF ADDRESS COUNTER (DECIMAL) | TYPE OF CONTROL | | | | CONTROL (HIGH) (LOW) | | X SIGNE | AMOUNT OF MOVEMENT IN X DIRECTION | | | | | Y SIGNE | AMOUNT OF MOVEMENT IN Y DIRECTION | | | | | OPERATION NUMBER DATA | | | | | | | |
|---|---|---|---|---|---|---|---|---|---|---|---|---|---|---|---|---|---|---|---|---|---|---|---|---|---|
| | | | | | | | | | | | | | | | | | | | UPPER BITS | | | | LOWER BITS | | |
| | D11 | D12 | D13 | D14 | D15 | D16 | D17 | D18 | D21 | D22 | D23 | D24 | D25 | D26 | D27 | D28 | D31 | D32 | D33 | D34 | D35 | D36 | D37 | D38 |
| 0 | — | — | — | — | O | O | O | O | O | O | O | O | O | O | O | O | O | O | O | O | O | O | O | O |
| 1 | O | O | O | O | O | O | O | O | O | O | O | O | — | — | — | — | O | O | O | O | — | O | O | O |
| 2 | — | — | — | O | O | O | O | O | O | O | O | O | O | O | O | O | O | O | O | O | O | O | O | O |
| 3 | O | O | O | O | O | O | O | — | — | O | O | O | O | O | O | O | O | O | O | O | O | O | O | — |
| 4 | O | O | — | O | O | O | O | — | O | — | O | O | O | O | O | O | O | O | O | O | O | O | O | — |
| 5 | O | O | — | — | O | O | — | — | — | — | — | — | O | O | — | O | O | O | O | — | O | — | O | O |
| 6 | O | — | O | — | O | O | O | O | O | O | O | O | O | O | O | O | O | O | O | O | O | O | O | O |
| 7 | O | — | O | O | O | O | O | O | O | O | O | O | O | O | — | — | O | O | O | O | O | — | O | O |
| 8 | O | O | O | — | O | O | O | O | O | O | O | O | O | O | O | O | O | O | O | O | O | O | O | — |
| 9 | O | O | O | O | — | O | O | O | O | O | O | O | — | — | O | O | O | O | O | O | O | — | — | O |
| 10 | O | O | O | O | — | O | O | O | — | O | O | O | — | — | O | — | O | O | O | O | O | — | O | — |
| 11 | O | O | O | O | — | O | O | — | — | O | — | O | O | O | — | O | O | O | O | O | O | O | O | — |
| 12 | O | O | O | O | — | O | O | O | O | O | O | — | O | O | O | O | O | O | O | O | O | O | O | — |
| 13 | O | O | O | O | — | O | O | — | O | O | O | O | O | O | O | O | O | O | O | O | O | O | — | O |
| 14 | — | O | O | O | — | O | O | O | O | — | O | O | O | O | O | O | O | O | O | O | O | O | O | O |

FIG. 23b

| OUTPUT OF ADDRESS COUNTER (DECIMAL) | REMARK |
|---|---|
| 0 | STOP CODE |
| 1 | MOVEMENT FROM POINT Q0 TO Q1 |
| 2 | OPTIONAL STOP |
| 3 | Q3 → Q4 } SKIP CODES |
| 4 | Q6 → Q7 |
| 5 | Q8 → Q9 |
| 6 | Q10 → Q11 |
| 7 | Q12 → Q13 |
| 8 | Q1 |
| 9 | a1 ~ a6 |
| 10 | a7 |
| 11 | a8 |
| 12 | a9 |
| 13 | a10, Q2 |
| 14 | MIRROR CODES |
| 15 | |
| 16 | |
| 17 | |
| 18 | |

FIG. 33
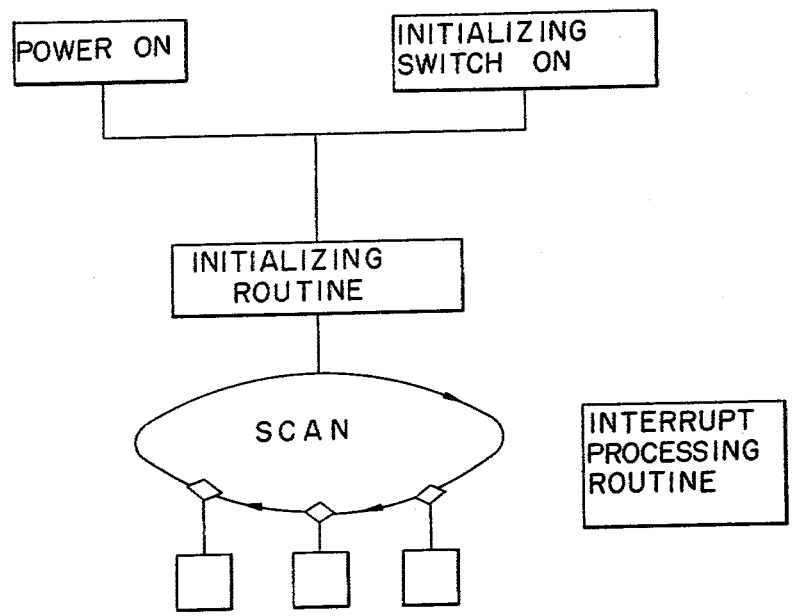
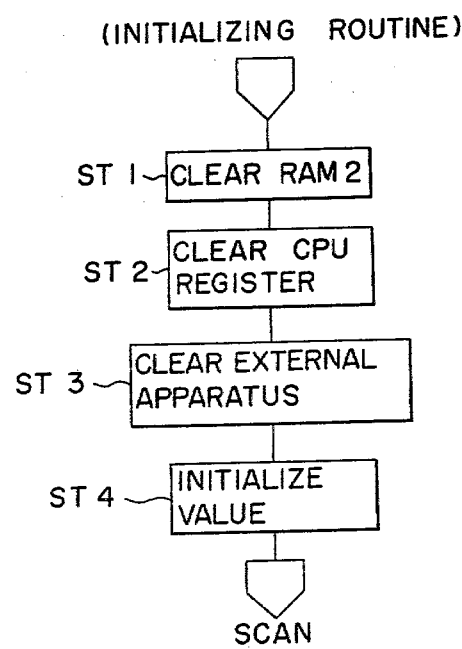
(INITIALIZING ROUTINE)
ST 1 — CLEAR RAM 2
ST 2 — CLEAR CPU REGISTER
ST 3 — CLEAR EXTERNAL APPARATUS
ST 4 — INITIALIZE VALUE
SCAN

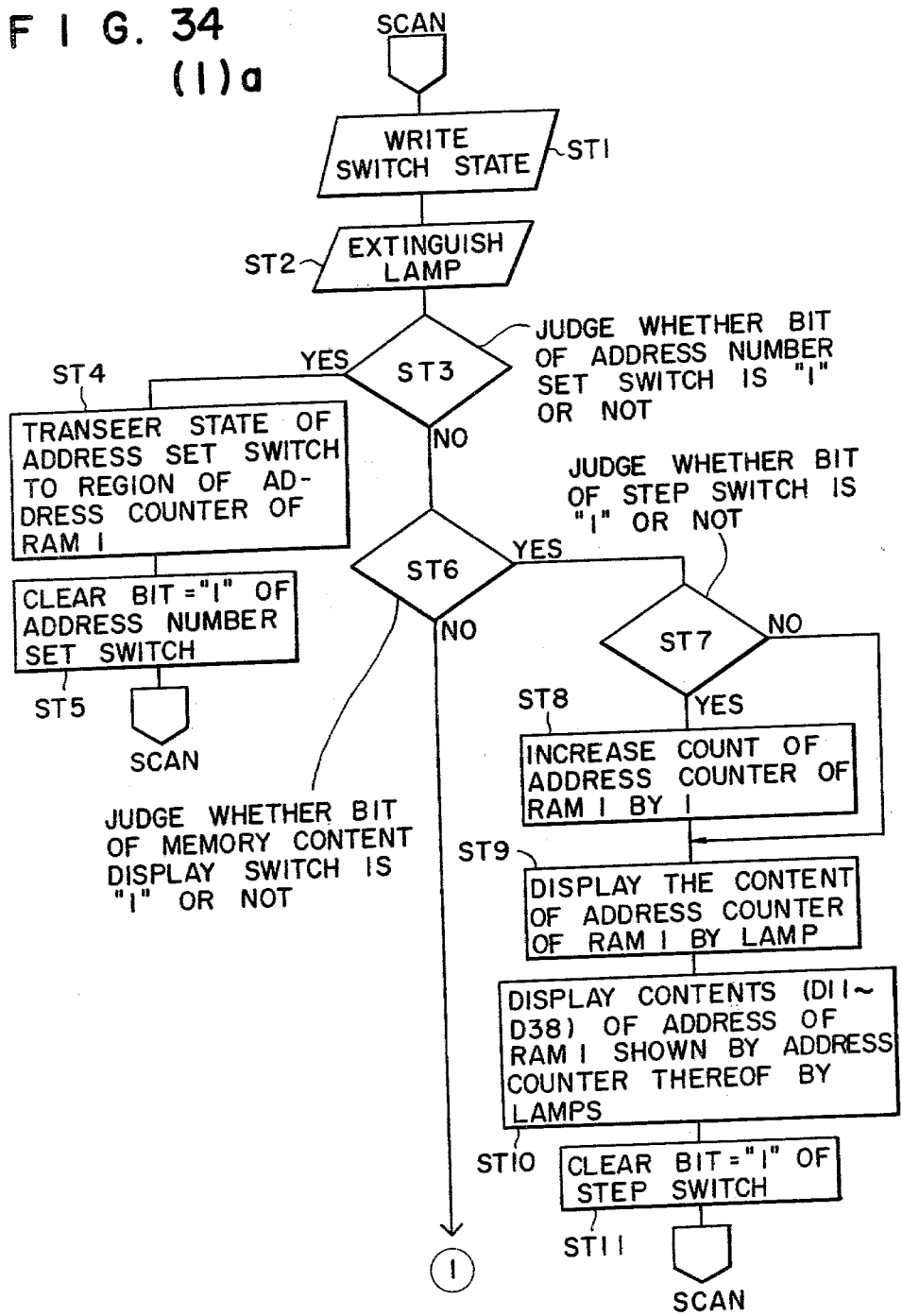

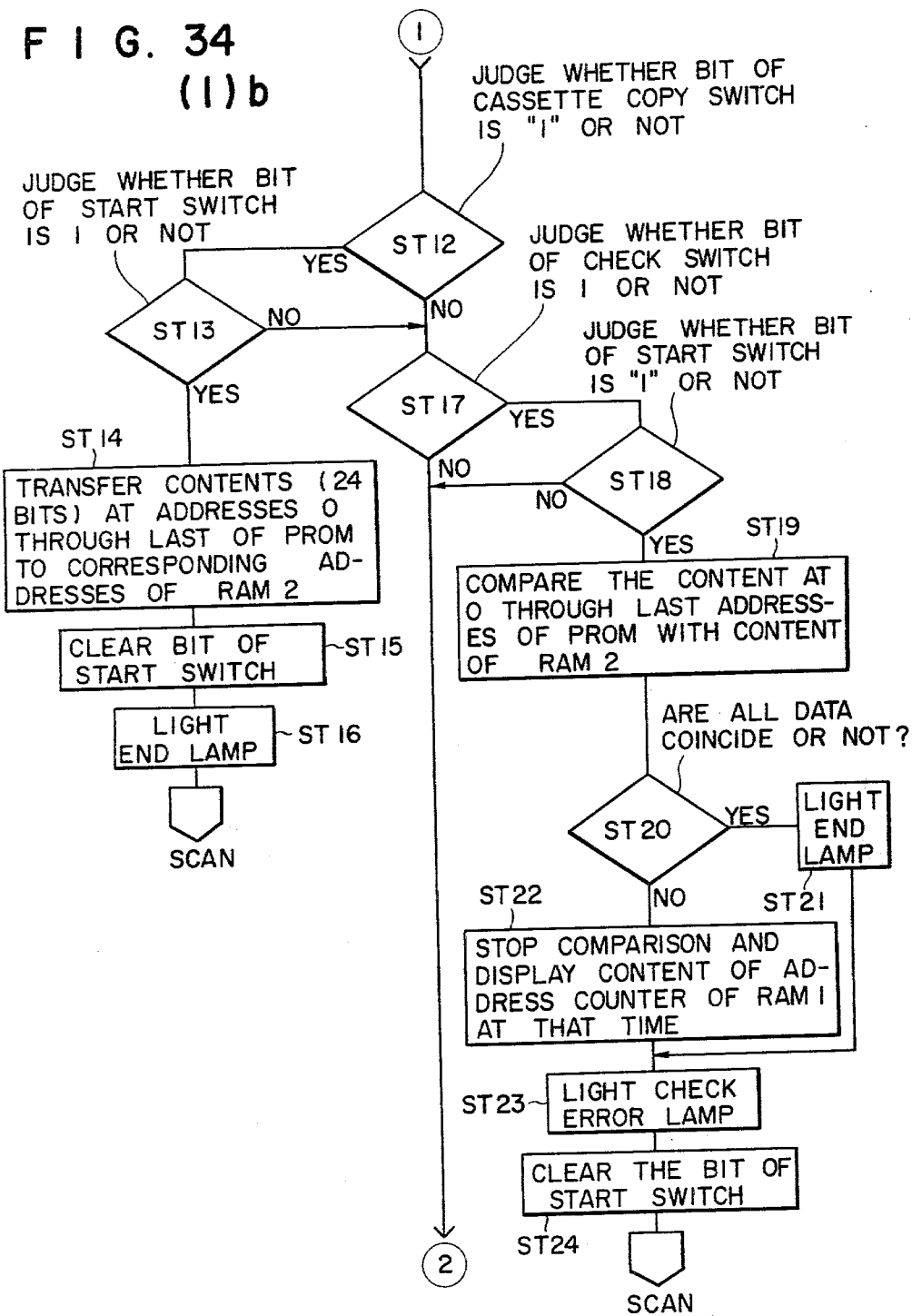

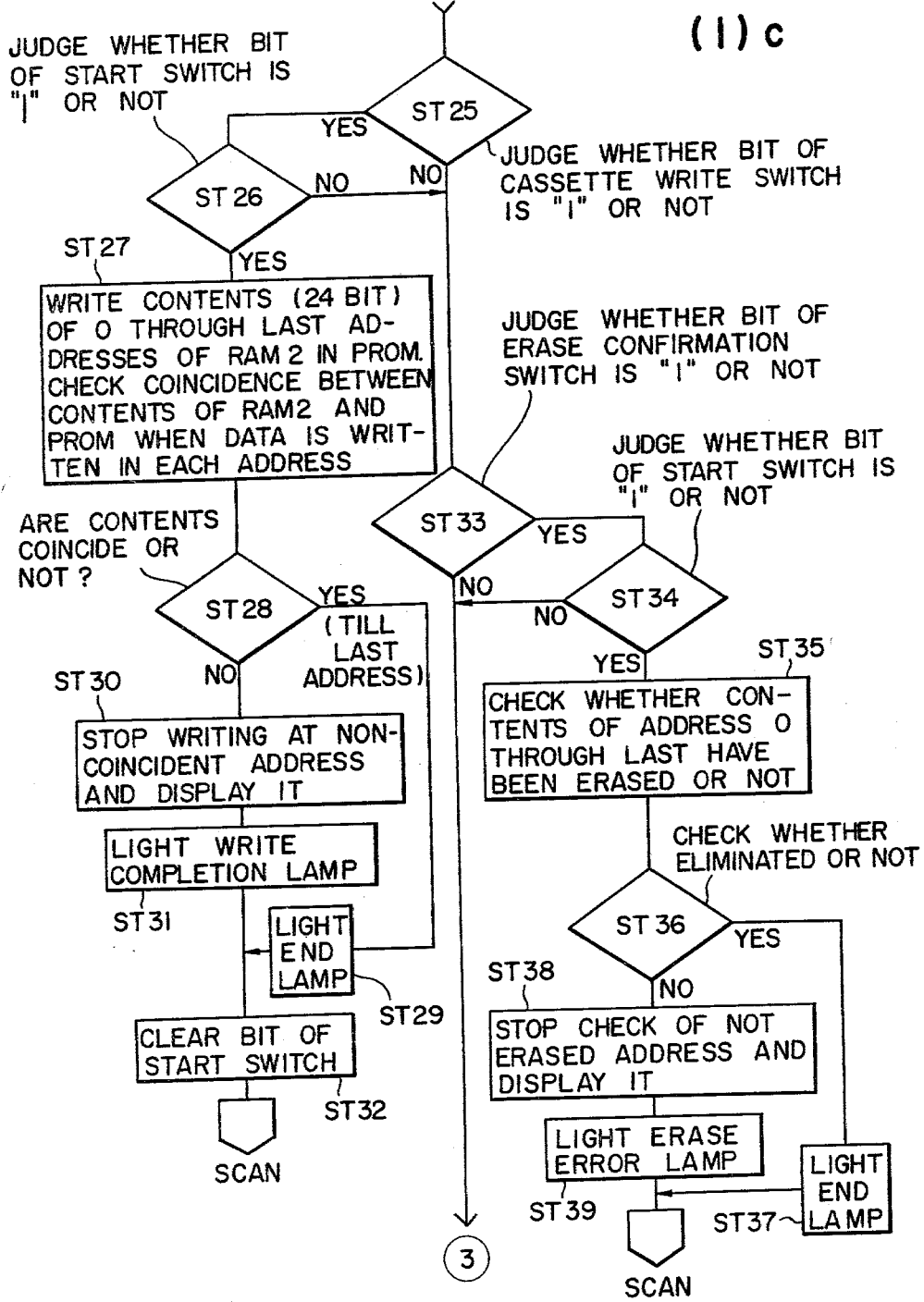

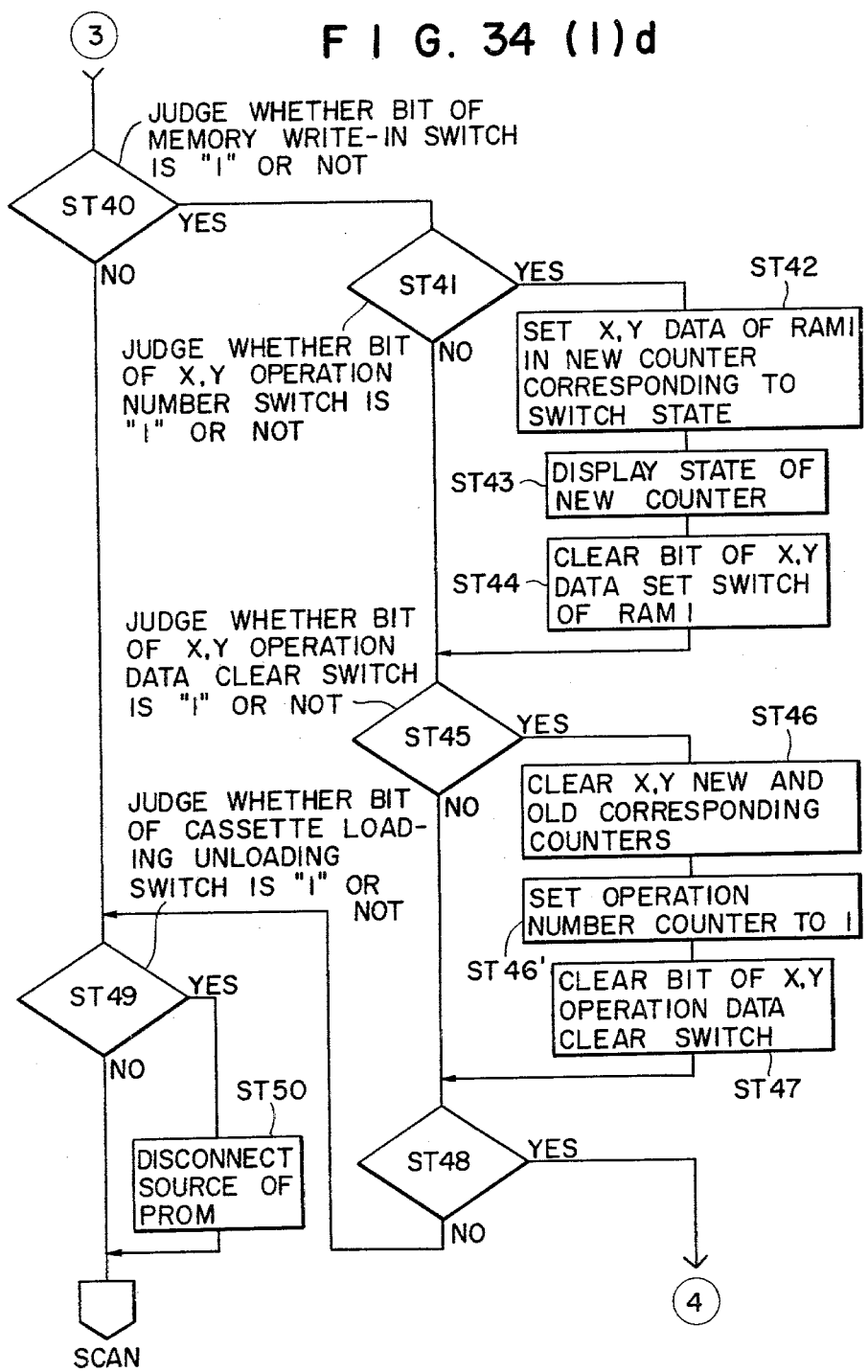

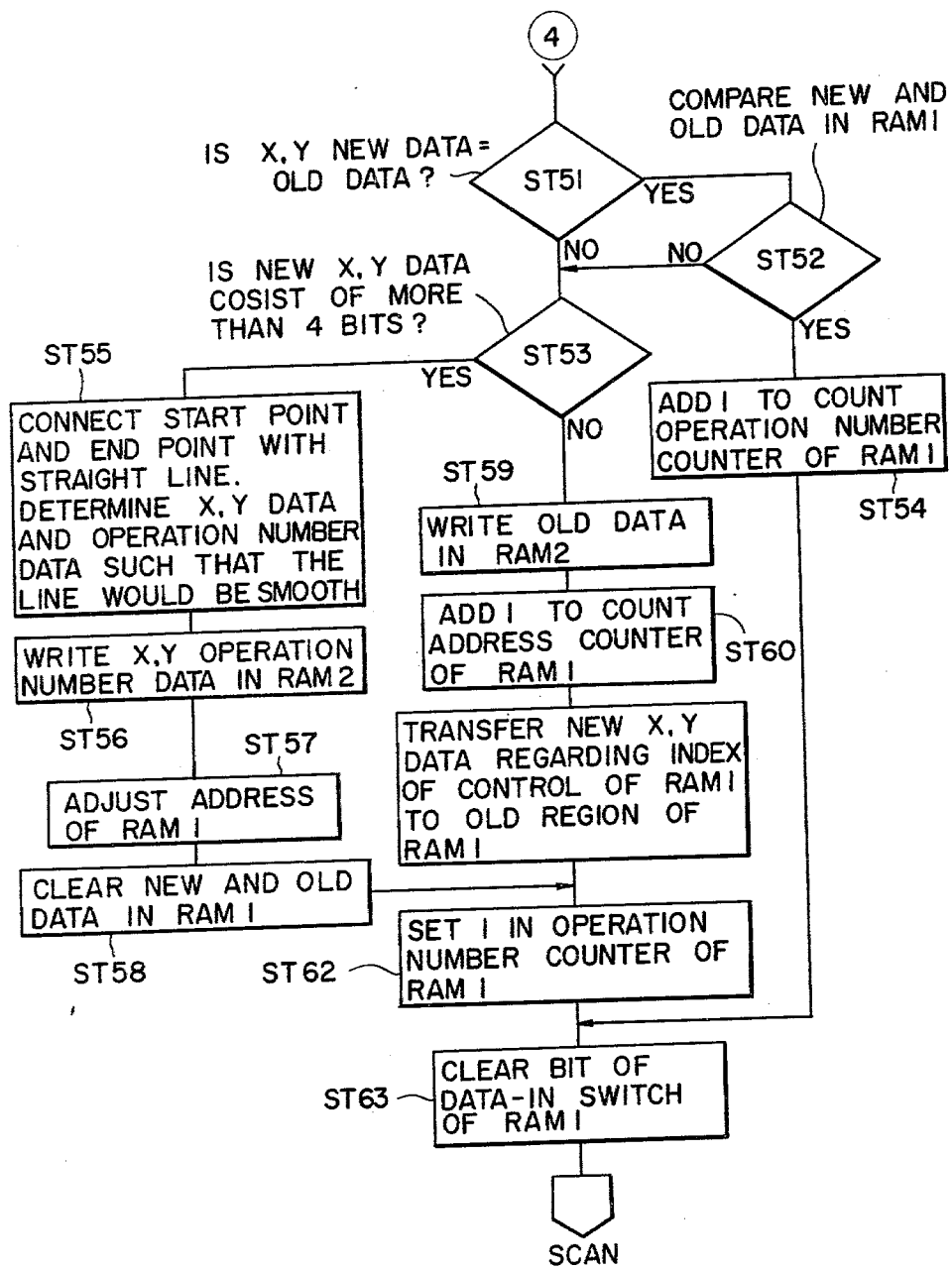

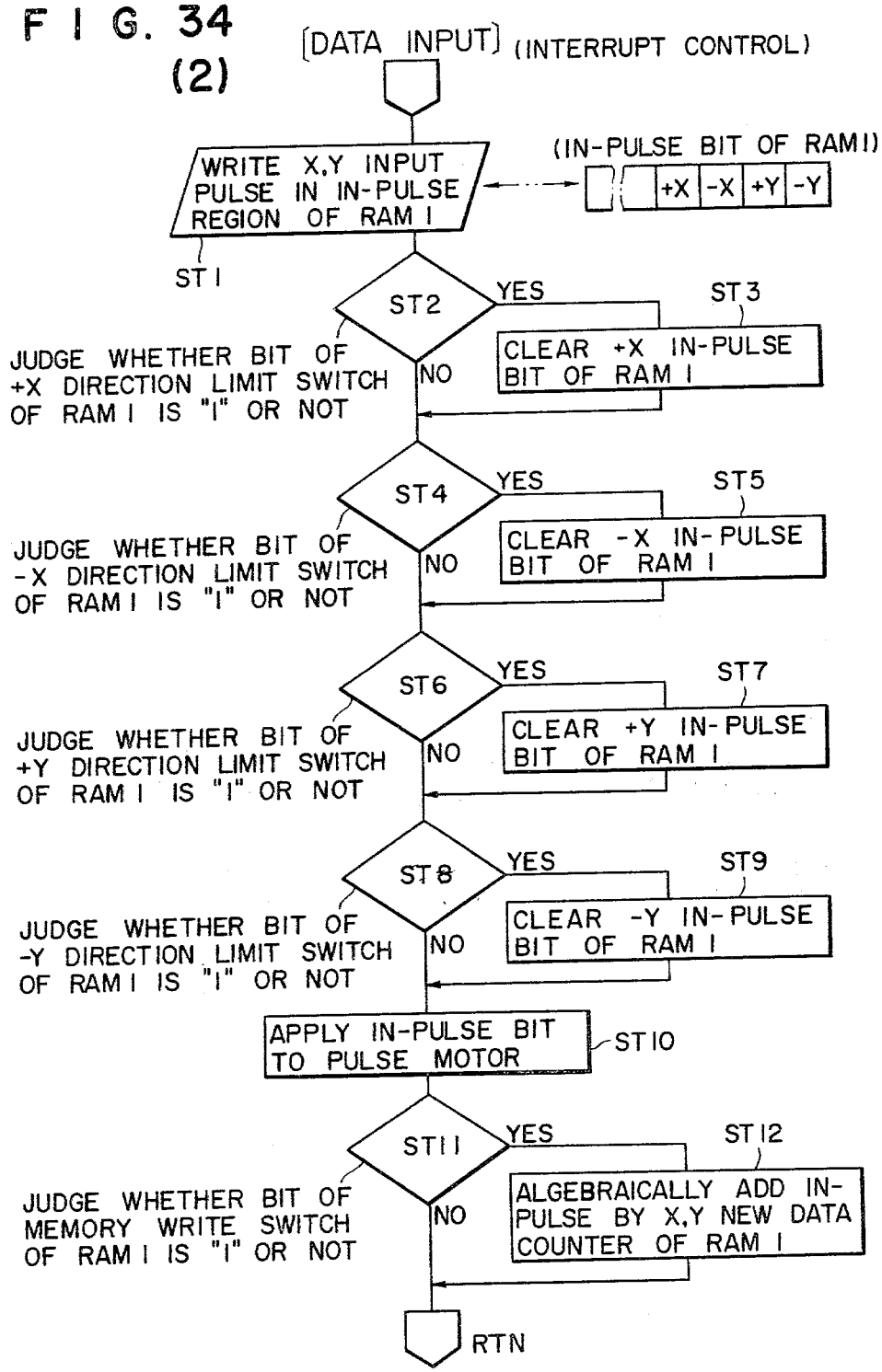

FIG. 35
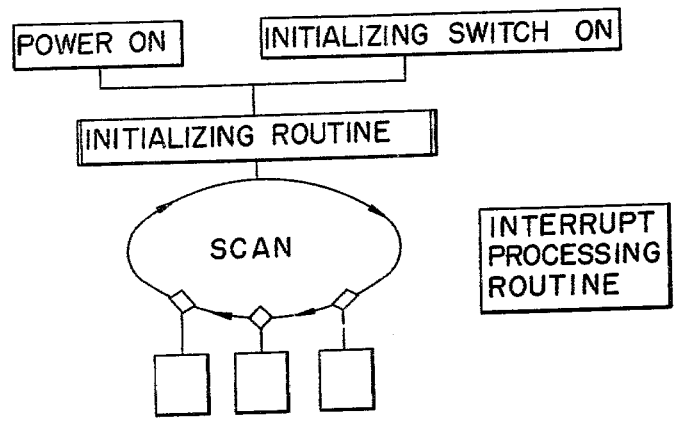
(INITIALIZING ROUTINE)
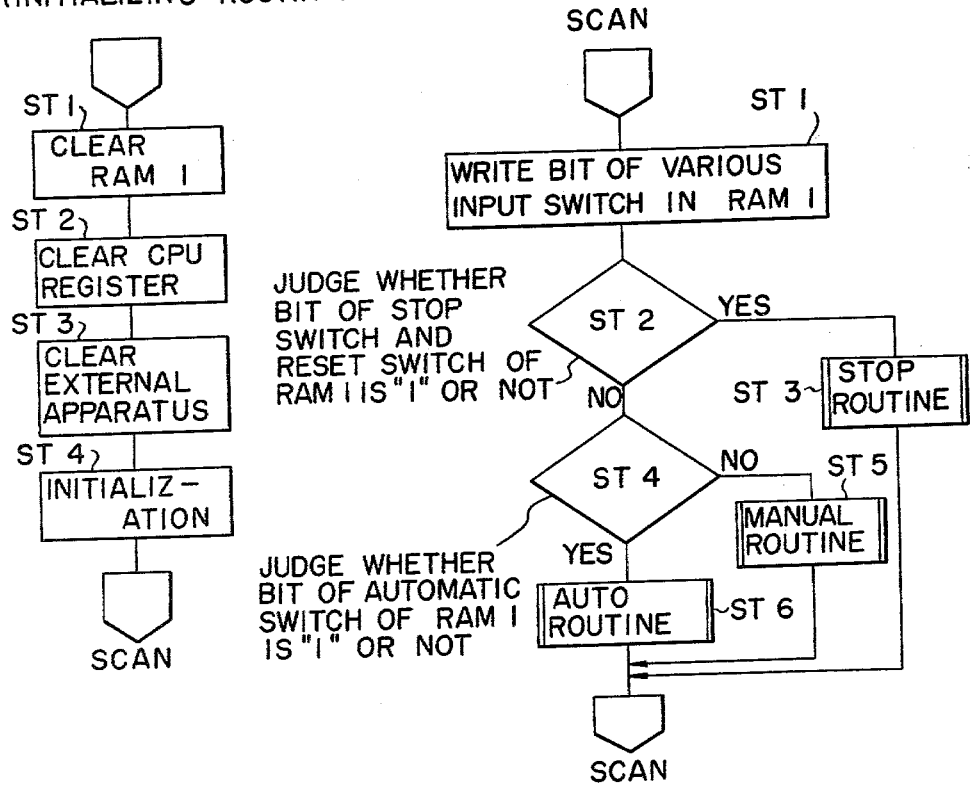

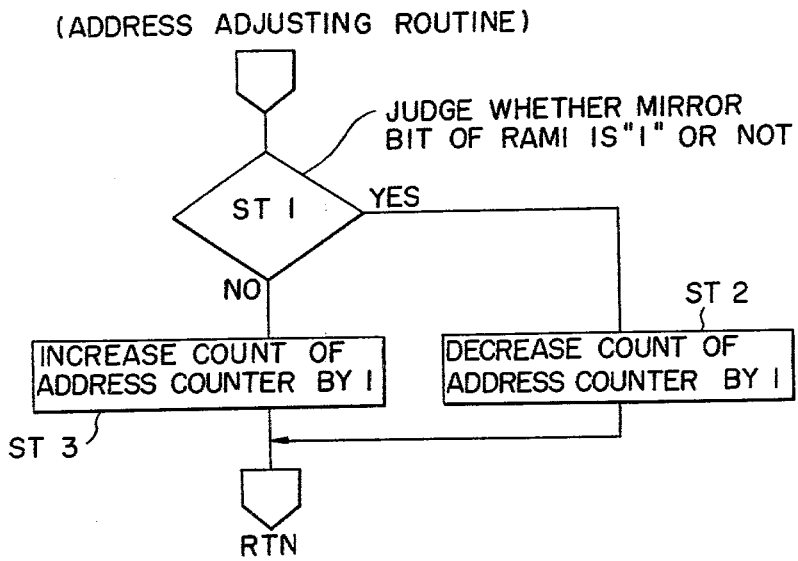
FIG. 37a
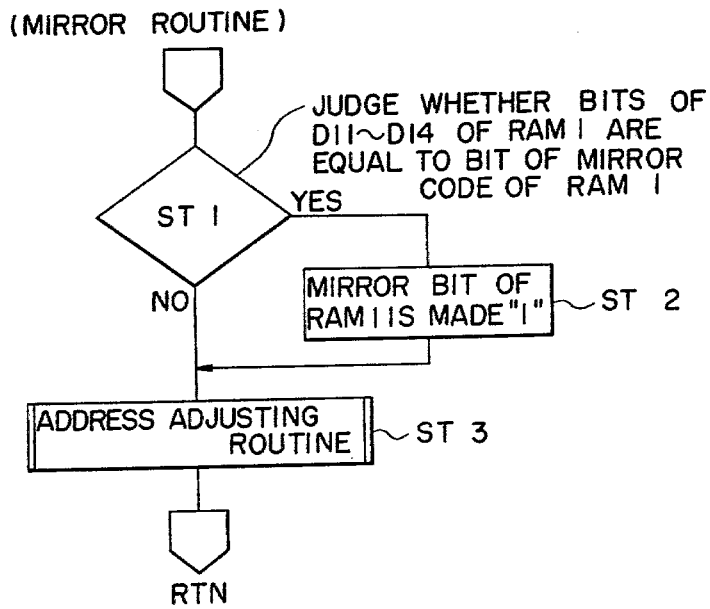

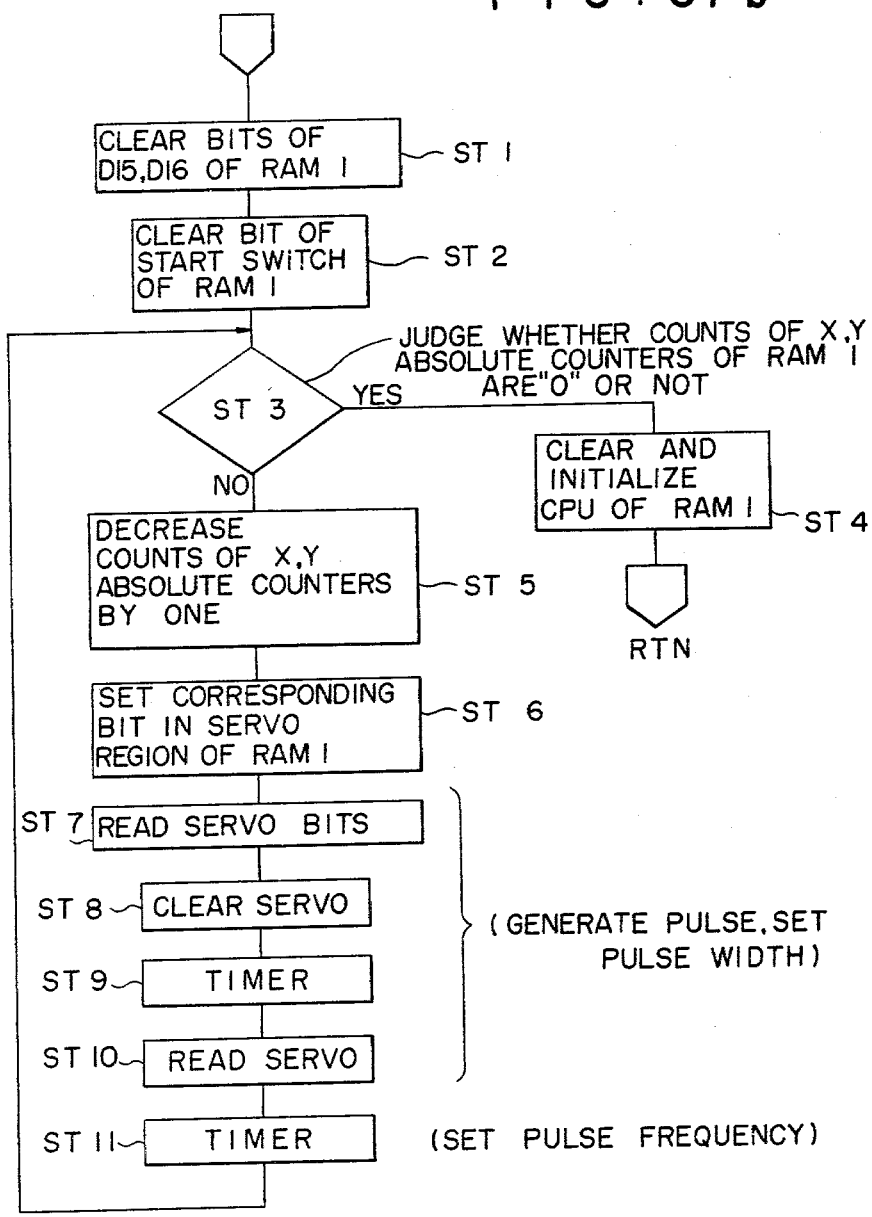

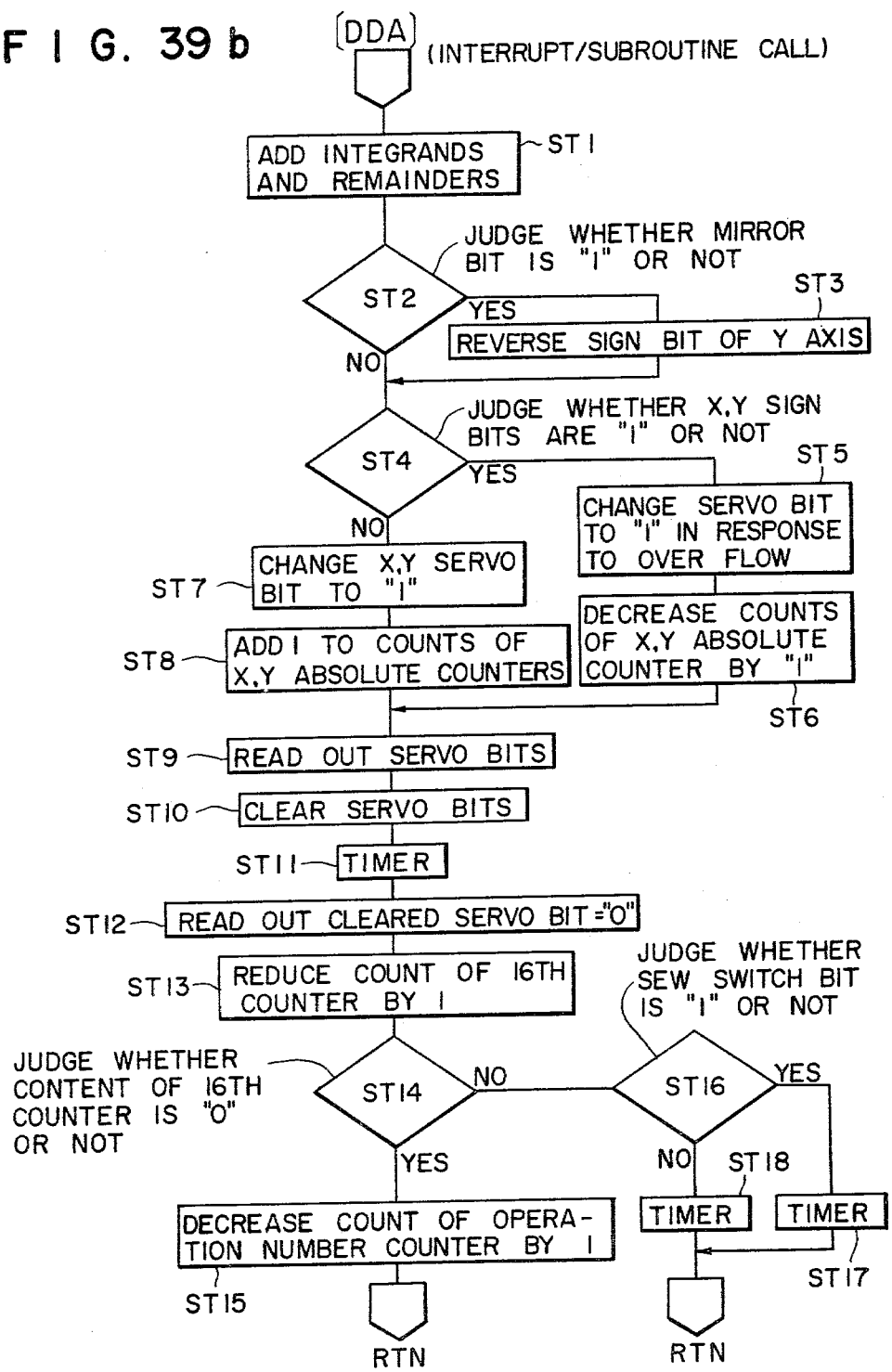

CONTROL SYSTEMS FOR AUTOMATIC SEWING MACHINES

BACKGROUND OF THE INVENTION

This invention relates to an automatic sewing machine, more particularly an automatic sewing machine in which informations utilized to sew such predetermined patterns as a pocket or collar of a shirt are stored in a memory device and the addresses thereof are designated to sequentially read out the informations from the addresses for sewing a predetermined pattern.

According to one system of storing the informations in the memory device, a paper depicted with a predetermined sewing pattern is mounted on a coordinate reading device, the stylus in the form of a magnifying lens of the coordinate reading device is coincided with the stitching positions on the pattern and the number of pulses corresponding to the increment of the coordinates is stored in a memory device (Japanese patent application No. 155676/75). This system, however, requires use of the coordinate reading device and means for measuring the amount of movement of the stylus in addition to the sewing machine. Furthermore, in the prior art automatic sewing machine, the reading of the data stored in the memory means is made by using special circuit elements or hardwares (Japanese patent application No. 19998/77) and means for storing a program in a read only memory device (hereinafter called PROM) and a control device of the automatic sewing machine have been constructed as independent devices.

SUMMARY OF THE INVENTION

Accordingly it is an object of this invention to provide a control system of an automatic sewing machine wherein the control system is constituted by a microcomputer for sewing a predetermined sewing pattern so that it is possible to greatly simplify the circuit construction.

Another object of this invention is to provide an improved control system for an automatic sewing machine capable of cutting a stitch groove of said sewing pattern through cloth clamping plates by using the microcomputer.

A further object of this invention is to provide a novel control system capable of readily forming, modifying or correcting, or erasing a predetermined sewing program.

Yet another object of this invention is to provide a control system capable of sewing a number of the same or different patterns formed on the same cloth clamping plate under control of the microcomputer.

Another object of this invention is to provide a novel control system capable of using mirror codes where the pattern formed on the cloth clamping plate is symmetrical with respect to the center thereby simplifying the address construction of the memory means.

According to this invention these and further objects can be accomplished by providing a control system for an automatic sewing machine having a sewing head mounted on a table, cloth clamping plates, cloth clamping plates driving means including pulse motors for moving the cloth clamping plates on the table in the X and Y axis directions of rectangular coordinates, and pulse generating means for applying driving pulses to the pulse motors, said control system comprising first memory means including a first code region representing type of control corresponding to a predetermined number of addresses, and a second code region for storing data for respective sewing steps, a sewing machine operation panel unit including means for generating control signals for controlling the operation of the sewing machine, a bus line extending between the first memory means and the sewing machine operation panel unit; second memory means connected to the bus line and including a first memory region for storing drive pulses supplied to the pulse motors and the control signals, and a second region for storing data corresponding to an address count value which designates an address of the first memory means, and for storing the type of control, and the data in the second code region, of the first memory means; a central processor unit connected to the bus line; and a third memory means in the form of a programmable memory means connected to the first and second memory means and to the central processor unit through the bus line, said third memory means containing a program of various instruction groups for sequentially forming operation instructions for operating the pulse motors and the head.

According to a preferred embodiment of this invention, the control system further comprises a stylus substituting the cloth clamping plates, an additional bus line connected to the first mentioned bus line, and a program operation panel unit including a fourth memory means connected to the additional bus line for storing the content of the first memory means, a fifth memory means connected to the additional bus line for storing various instruction groups necessary to process programmed operations, and means for writing the content of the fourth memory means in the first memory means, the program operation panel unit including switch means for setting addresses and type of control.

BRIEF DESCRIPTION OF THE DRAWINGS

In the accompanying drawings:

FIG. 4 is a perspective view showing the belt drive mechanism utilized in the automatic sewing machine shown in FIG. 1;

FIGS. 5 and 6 are plan views showing the belt drive mechanism for driving in the X and Y directions respectively;

FIG. 7 is an enlarged perspective view showing the connection between the cloth clamping plate and the X table;

FIG. 8 is a sectional view taken along a line VIII—VIII shown in FIG. 7;

FIG. 9 is a plan view showing a cloth clamping plate;

FIG. 10 is a sectional view taken along a line X—X in FIG. 9;

FIG. 11 is a sectional view showing means for aligning the sewing starting position;

FIG. 13 is a left hand side view of FIG. 12;

FIG. 14 is a plan view of the cutting tool shown in FIG. 13;

FIG. 15 is a chart showing the names of the output signals from respective bits of the PROMs;

FIG. 16 is a block diagram showing the input and output connections of three PROMs;

FIGS. 20a and 20b, when combined, show a table representing the data in a PROM for the sewing pattern shown in FIG. 19;

FIGS. 22a and 22b, when combined, show a table regarding the data of a PROM utilized to sew the pattern shown in FIG. 21 without using the mirror codes;

FIGS. 23a and 23b, when combined, show the data of the PROM utilized to sew the pattern shown in FIG. 21 by using the mirror codes;

FIG. 33 is a flow chart for storing a program in a PROM by using the program operation panel unit;

FIGS. 34, 34a, 34b, 34c, 34d, and 34e when combined, show the detail of the flow chart regarding program steps;

FIG. 35 shows a basic flow chart for effecting a sewing or cutting operation under the control of a PROM programmed by using an operation panel unit;

FIGS. 36a, 36b and 36c are flow charts showing the detail of the subroutines shown in FIG. 35a;

FIGS. 37a and 37b are flow charts showing the detail of flow charts shown in FIG. 36a–36c;

FIG. 39a and 39b are flow charts showing the detail of the data routine and a digital differential analyzer.

DESCRIPTION OF THE PREFERRED EMBODIMENTS

To have better understanding of this invention the sewing machine and an electric control system are divided into sections and the description will proceed according to the following sections with reference to the drawings described therein.

Figure 2:
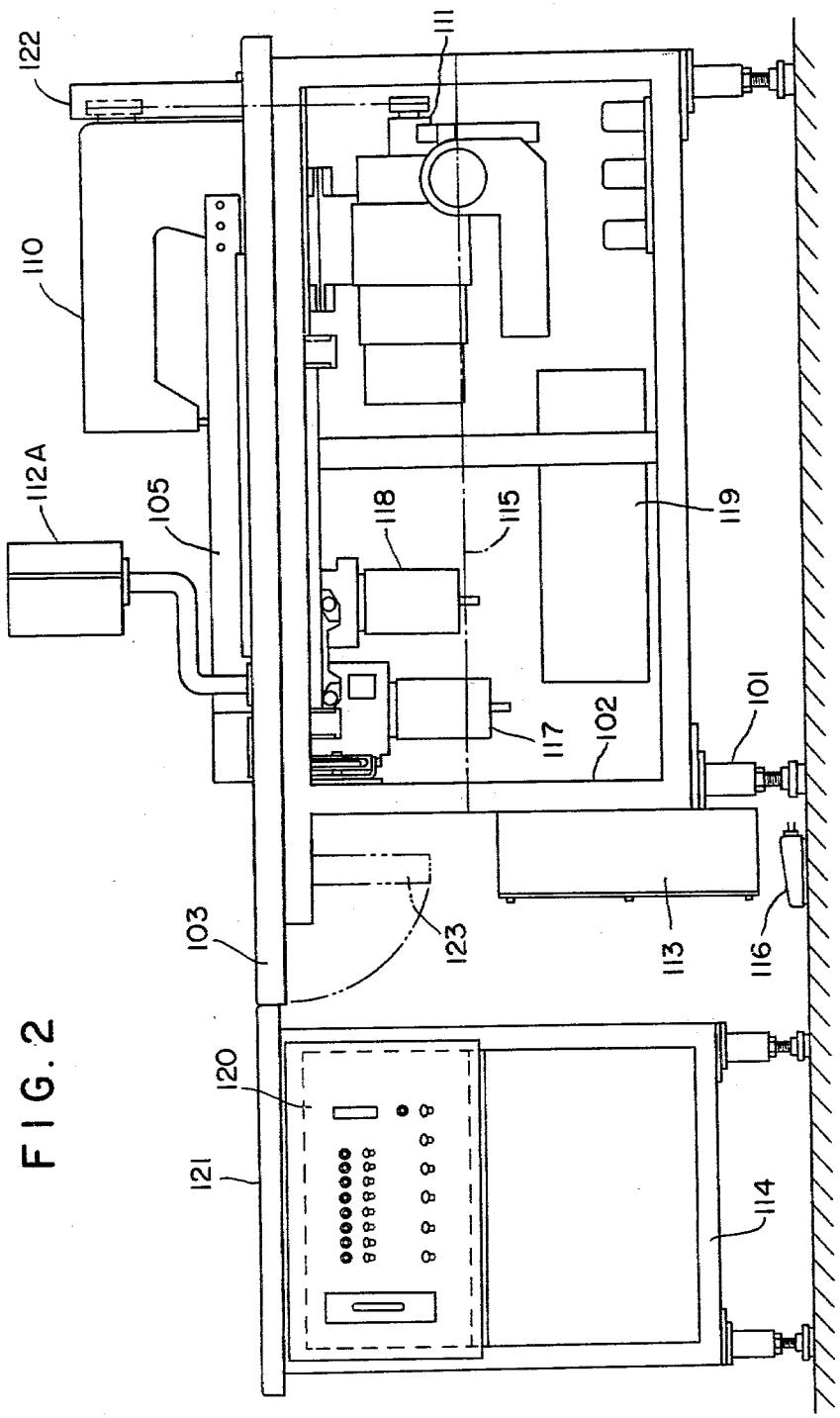
FIG. 2 is a right side view of the sewing machine shown in FIG. 1.
Figure 3:
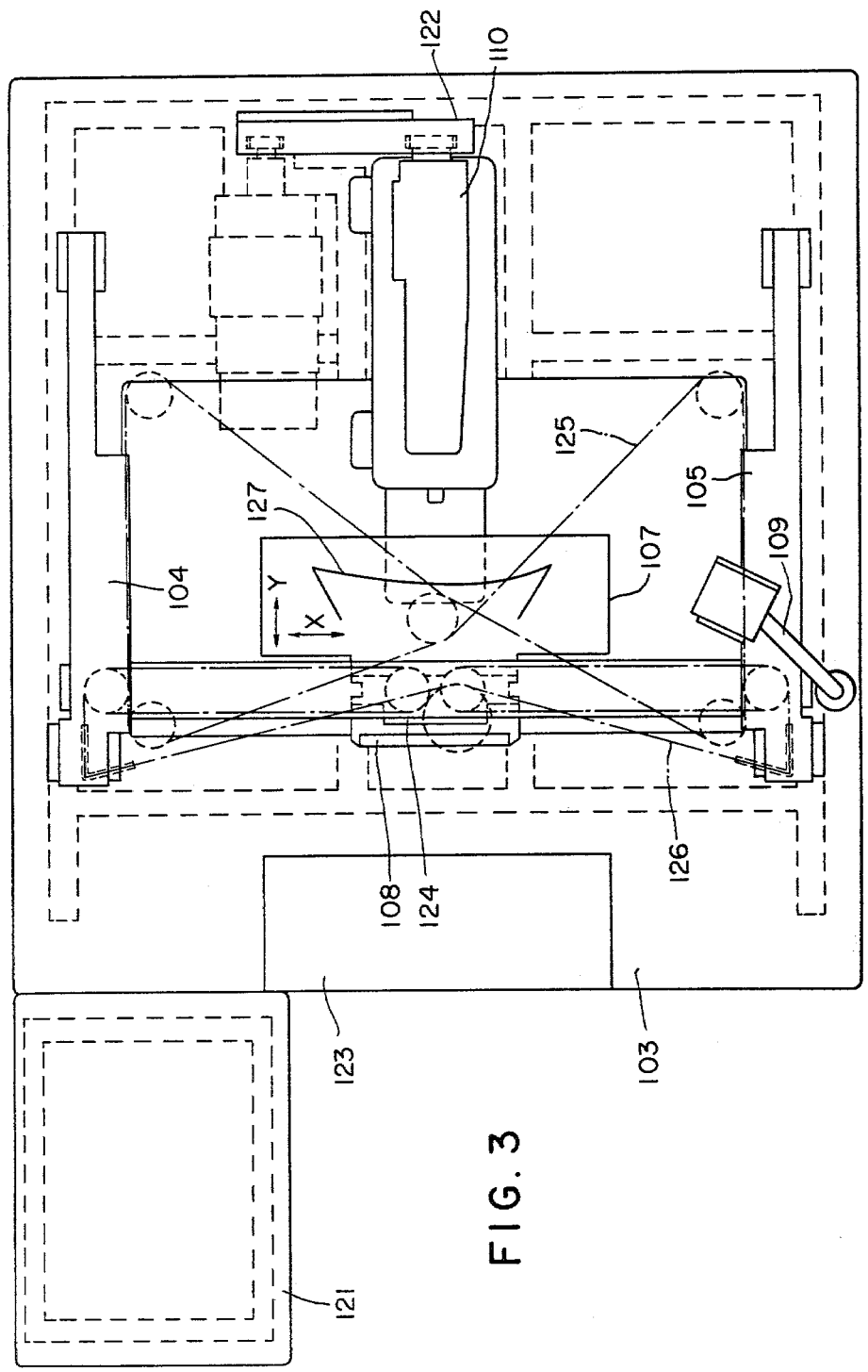
FIG. 3 is a plan view of the sewing machine shown in FIG. 1.

I. Automatic Sewing Machine (FIGS. 1–3)

Figure 1:
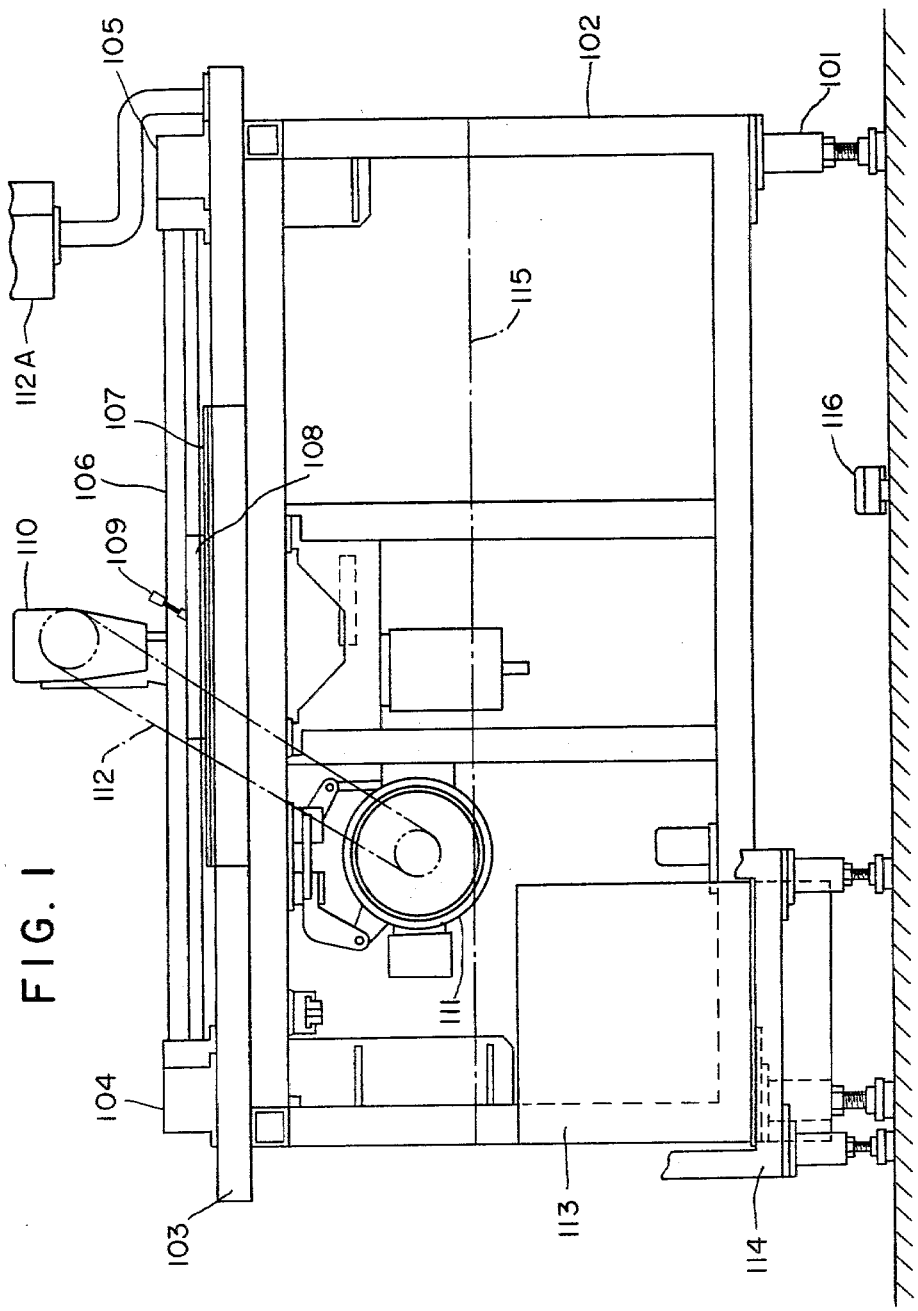
FIG. 1 is a front view showing an automatic sewing machine embodying the invention.

FIG. 1 of the accompanying drawing shows a pattern seamer comprising a frame 102 provided with legs 101 and a horizontal table 103 of the sewing machine. On the opposite sides of the table 103 are mounted guides 104 and 105 extending in the direction of Y axis of a rectangular coordinate (the direction perpendicular to the sheet of drawing) and shown as covered by covers. A table 106 is disposed between guides 104 and 105. Clamping plates 107 for clamping therebetween a cloth to be pattern sewed are supported by a supporting frame 108. When a knob 109 mounted on the Y table 106 is tilted to the right as viewed in FIG. 1, the clamping plates 107 are secured to the Y table 106.

The head 110 of the sewing machine is mounted on the table 103 and driven by an electric motor 111 suspended from the lower surface of the table through a belt 112. An operation box 112A which is used to indicate the time of exchanging the lower bobbin and for other purposes is also mounted on table 103. The operation box will be described later with reference to FIG. 27. Dot and dash lines 115 show that component elements located between the lower surface of the table and the dot and dash lines 115 are covered by a cover, not shown.

For the purpose of generating a start signal for starting the sewing operation, a foot switch 116 is provided.

As shown in FIG. 2, a X axis driving pulse motor 117 and a Y axis driving pulse motor 118 are suspended from the lower surface of the table 103 and controlled by a control unit 119. An operating panel unit 120 is mounted on a base 114, and its operation will be described later. An auxiliary table 121 is mounted upon the panel unit 120 on the same level as the table 103. The pulley and belt for driving the head are covered by a cover 122.

As shown in FIGS. 2 and 3 a portion 123 of table 103 is hinged to the remaining position thereof to be foldable as shown in FIG. 2 thereby permitting the operator to make access to the head 110 for exchanging the lower bobbin, pulling out and in of the cloth champing plates 7 or the like operations. The supporting frame 108 connected to the lefthand edge (as viewed in FIG. 3) extends beneath Y table 106 and clamped to the lefthand side of a movable body 124 movable in the X direction (hereinafter termed X table) by means of knob 109. The detail of this construction is shown by FIG. 7. As shown, the X table 124 is contained in the Y table 106 to be movable in the X direction, and as will be described later with reference to FIG. 4, the Y and X tables are driven by belts or cords 125 and 126. The clamping plates 107 are provided with a stitch groove 127 corresponding to the sewing pattern of the collar of a shirt, for example.

II. Driving Mechanism of the Cloth Clamping Plates (FIGS. 4–11)

The detail of the driving mechanism will now be described with reference to FIGS. 4–8. As shown in FIG. 4, the Y table 106 takes the form of a hollow rectangular box and a pair of downwardly projecting legs 132 are connected to the opposite ends of the Y table. Slidable members 133 in the form of bushings are secured to the lower ends of the legs 132 to slide along a pair of parallel stationary Y rails 134 which are secured to a stationary member, not shown. Pairs of rollers 136 are rotatably mounted on both sides of the movable body on X table 124 for rolling along the bottom plate of the Y table. A pair of pulleys 137 are rotatably mounted on the X table and cord 126 for driving the same in the X direction passes around these pulleys. One end of cord 126 is secured to a clamping member 135 and the cord passes about pulleys 138, 139, 137, 139A, 138A, and 140, about a pulley 117A driven by the pulse motor 117, then about similar pulleys to the clamping member 141. Clamping members 135 and 141 are constructed to adjust the tension of the cord 126. Accordingly, by rotating the X axis pulse motor 117 in the forward and reverse directions the X table 124 is reciprocated in the direction of X axis within the Y table 106.

Similarly, for the purpose of moving the Y table in the Y direction the cord 125 is passed about stationary pulleys 142 and 143, and pulley 118A driven by Y axis pulse motor 118 with the opposite ends secured to slidable members 133 at symmetrical positions. Accordingly, when the Y axis pulse motor 118 is energized, the Y table 106 is reciprocated in the direction of Y through a pair of legs 132. As the cloth clamping plates 107 are secured to the X table 124, it is possible to move them in any direction on table 103 by the X and Y axis pulse motors 117 and 118. FIG. 5 shows the arrangement of the cord 126 and various pulleys for the X table 124, whereas FIG. 6 shows that of the cord 125 and various pulleys for the Y table 106.

FIG. 7 is an enlarged view showing the detail of the mechanism for interconnecting the cloth clamping plates 107 and the X table 124. As shown, a supporting frame 151 is secured to the stationary portion in front of the X table 124 and a latch member 152 is secured to the front surface of the supporting frame 151 near the left end thereof. A latch member 153 connected to a toggle mechanism coupled with the knob 109 is mounted on the lefthand end to be movable in the horizontal direction. A frame 108 is secured to the front edge of the clamping plates 107 and latch members 154 and 155 are secured to the rear surface of the frame 108 for cooperating with latch members 154 and 155. To connect the clamping plates 107 to the X table 124, the clamping plates are moved in the direction of an arrow beneath X table to engage latch members 152 and 154. Thereafter, the knob 109 is turned to the left to engage latch members 153 and 155 and the knob 109 is turned to the right. For the sake of cleaness, the bottom plate 106A and the upper cover 106B of the Y table 106 are not shown in FIG. 7, and in FIGS. 3 and 7 the clamping plates 107 are shown as provided with a groove 127 alone.

FIGS. 9 and 10 show the detail of the cloth clamping plates 107 which are used to sew collars of shirts having the same contour but different size. There are provided upper and lower stationary plates 201 and 201A. Since the clamping plates 108 are used to clamp cloth therebetween they comprise upper and lower plates connected by hinges. Since the upper and lower plates have the same construction, only the upper plate will be described. To sew collars of different size a movable plate 204 is provided. For the purpose of adjusting the movable plate 204 with reference to the stationary plate 201, a slide member 207 is secured to the movable plate 204 to move in a slot of a guide member 206 which is mounted on the stationary plate 201 by screws 205. A clamping plate 208 is secured to the upper surface of the slidable member 207 by screws 209 to be urged against the upper surface of the guide member 206. Spacers 220 and 221 are interposed between the stationary plate 201 and the movable plate 204 to define a portion of the groove 127 by the opposed edges of the spacers. Mounting plates 224 and 225 are fastened to the spacers 220 and 221 respectively by screws 230 and 231. The joints between the mounting plates, the stationary plate 201 and the movable plate 204 are bonded together by a plate fasteners. Similarly, the joints between the upper spacers 220 and 221 and lower spacers (not shown) are also bonded together by a plate fastener thereby enabling ready mounting and dismounting of the mounting pieces 224, 225, spacers 220, 221, stationary plate 201 and movable plate 204. Pins 239 are used to correctly position the cloth to be sewed on one clamping plate 107. The stitching groove 127 is surrounded by a strip 243 of magnetic material. A pin hole 240 is formed so as to position the sewing needle just above the start point on the cloth clamping plate at the time of starting the sewing operation. Two clamping plates are connected together by hinges 237 and 238. In FIG. 10 which shows a sectional view taken along a line X—X in FIG. 9, reference charactors 201b, 203c and 201c show spacers, 201a and 204a screws, and 203a a nut. FIG. 11 is a sectional view showing a state in which the sewing needle 245 has just been positioned at the start point of the stitching groove 127 of the cloth clamping plates. As shown, a fixture 246 which supports a pin 244 to be movable in the vertical direction is secured to the lower end of the head 110 at a definite point from needle 245 so that by inserting the pin 244 in the hole 240, the needle 245 is positioned to the start position. As shown, two pieces of cloth 235 and 235A are clamped between two clamping plates.

Figure 12:
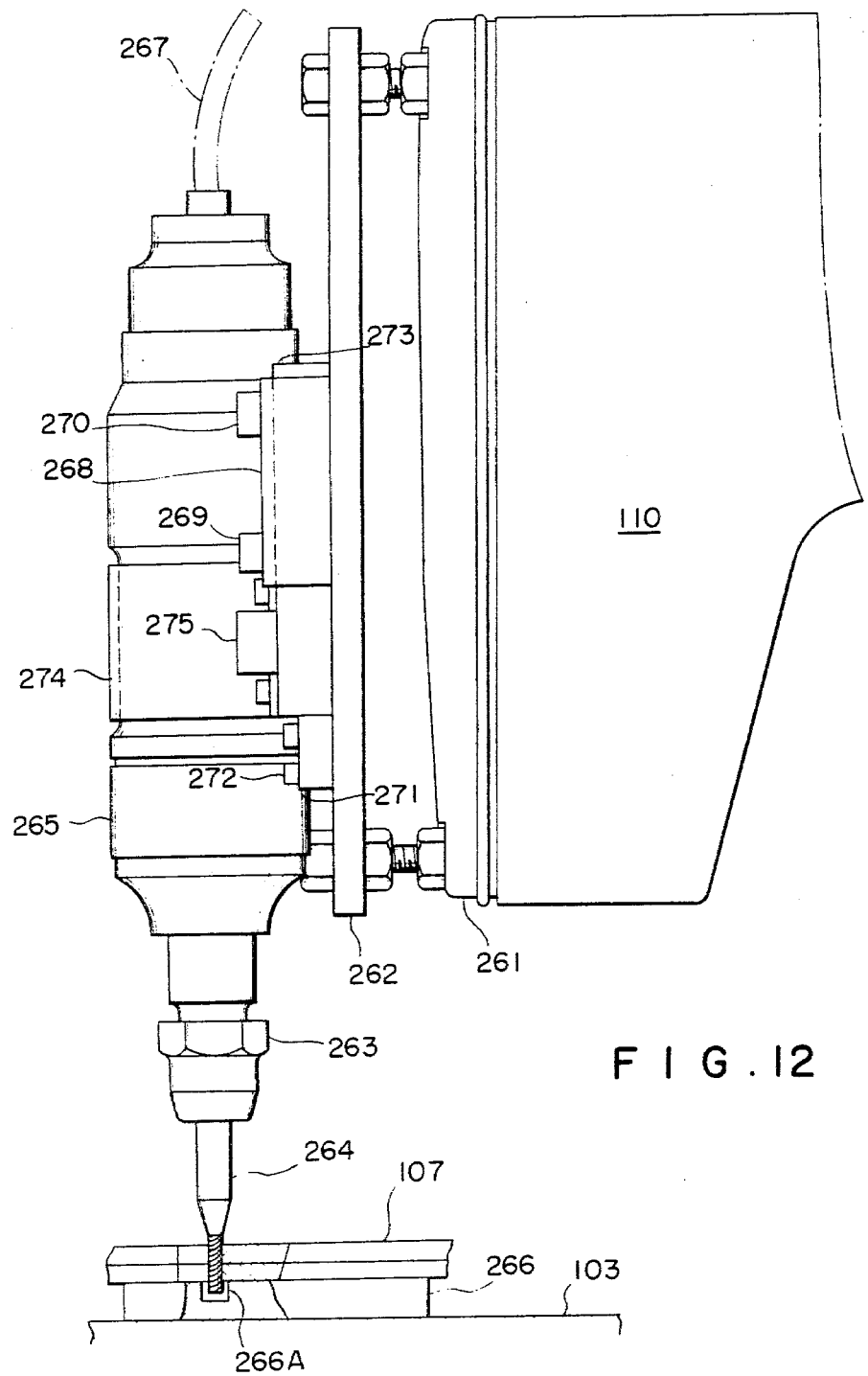
FIG. 12 is a side view showing a cutting tool mounted on the head of the sewing machine.

III Machining Device of the Cloth Clamping Plate (FIGS. 12, 13, 14)

FIG. 12 shows a manner of mounting a cutting tool for machining the stitching groove on the head 110. As shown, a supporting plate 262 is secured to the lefthand cover 261 of the head 110 by bolts and nuts. A pneumatic drill 265 having an end mill 264 connected thereto through a chuck 263 is mounted on the supporting plate 262. A supporting plate 266 provided with a groove 266A is secured to the table 103 of the sewing machine and the clamping plates 107 to be machined are supported by the supporting plate 266. Prior to the machining by the end mill the clamping plates are formed with an opening at the start point of the stitching groove 127 simultaneously with the drilling of hole 240 shown in FIG. 11. After inserting the end mill into the hole, air is supplied to the pneumatic drill through an air hose 267 and the X, Y pulse motors 117 and 118 are energized to cut the stitching groove 127 through the clamping plates 107.

As shown in FIG. 13, vertical guides 268 and 268A are secured to the supporting plate 262 by bolts 269, 270, 269A and 270A and stop members 271 and 271A are also secured by bolts 272 and 272A. A removable plate 273 is inserted between guides 268 and 268A and the pneumatic drill 265 is secured to the central portion of the plate 273 by means of a clamping band 274 and bolts 274A. The removable plate 273 is secured to the supporting plate 262 by bolts 275 and 275A passing through the slots at the lower end of the plate 273. Accordingly, by loosening the bolts 275 and 275A, the plate 274 can be removed together with the drill.

IV PROM and Method of Reading Out Data Therefrom (FIGS. 15 through 18)

FIG. 15 shows a table showing the name of data stored in a programmable read only memory device (PROM) and the arrangement of data when a PROM is used as the memory device for machining the stitching groove of the cloth clamping plates 107. In this example, three PROMs each having 8 bits are used. The first to fourth bits of PROM (1) are allocated to the index or type of control, the fifth and sixth bits are allocated for control signals and the seventh bit is allocated to the direction of movement along X axis. In the same manner, the eighth bit of PROM (1) and the first to third bits of PROM (2) are allocated to the binary data regarding the amount of movement in the X direction. By using these four bits it is possible to memorize a maximum of 15 pulses.

The fourth bit of PROM (2) shows the direction of movement along the Y axis and the fifth to eigth bits show the data regarding the amount of movement in Y direction. The first to eighth bits of PROM (3) are used to store operation number data and it is possible to store data up to 99 with a binary code decimal system by dividing bits 1-4 and 5-6. In this table output signals corresponding to respective bits of PROMs 1,2 and 3 are designated by D11–D18, D21–D28 and D31–D38.

Since the PROMs are constructed to be readable at each one address it is possible to produce a group of signals by designating one address.

As shown by the "Remark" where the bit states are D11, D12, D13, and D14, that is when the code representing the index of control is "0000", it is designated that data of D17–D38 should be read out. Codes "0001"–"1101" are mirror codes (M-code) as will be described later. When a M-code is read at an address i, address i-1 will be designated without reading out signals D17–D38 thereby reversing the order of addresses. Where M-code is used, either one of the outputs D15 and D16 is made to be "1". This prevents thread cutting. Where the code is "1110" it is termed an "optional stop code" and when an optional stop switch on the control panel is closed the advance of the address is stopped and the control is switched to manual operation. When the optional stop switch is opened the control is advanced to the next address.

Code "1111" means a "stop" and this code is used to designate an address at the position at which the sewing operation of a given pattern has completed. Control signal D15="1" designates a high speed stitching, D16="1" a low speed stitching and D15="0", D16="0" instruct stop of the needle at the upper dead center thus giving thread cut signal $\overline{SC}=0$.

Figure 17:
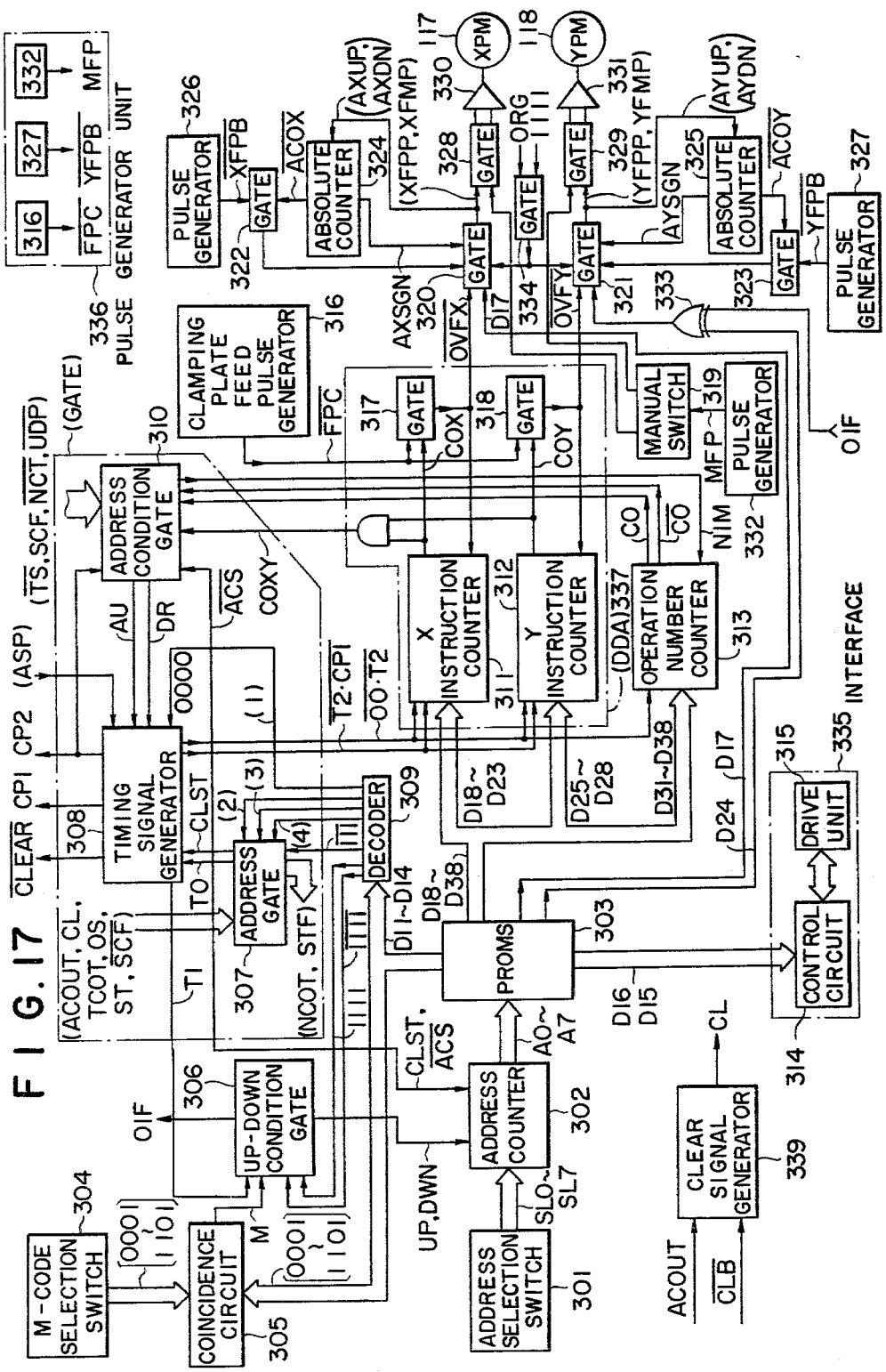
FIG. 17 shows a block diagram showing the system of this invention.

FIG. 16 shows the relationship between the input and output signals to and from the PROM 303, and FIG. 17 is a block diagram showing a control system useful to understand the processing of the data read out from PROM 303 for operating the automatic sewing machine of this invention. According to this invention a microcomputer system is used as the control system so that circuits shown in FIG. 17 do not present actually but the circuit shown in FIG. 17 is convenient to understand the operation.

As shown in FIG. 17, an address selection switch 301 is used to apply any desired address to an address counter 302. Thus, by using eight bits SL0–SL7, the output bits A0, A1, A2, A3, A4, A5, A6 and A7 of the address counter 302 are designated. An address gate circuit 307 produces an instruction signal $\overline{ACS}$ which is used to set bit signals SL0–SL7 of the address selection switch 301 into address counter 302. 305 designates the PROM 303 shown in FIG. 16 and comprises three PROMs (1) (2) and (3). The addresses of respective PROMs are designated by 8 bit outputs A0–A7 of the address counter 302 to read out output signals D11–D38 stored in the addresses.

304 represents a M-code selection switch constructed to set M-codes of a maximum of 13, that is from "0001" to "1101". A coincidence circuit 305 (see FIG. 18) is provided to check the coincidence between respective bits of the M-codes set by the M-code selection switch and the bits D11, D12, D13 and D14 of the codes representing the type of the control of the PROM 303. When a coincidence is obtained, the coincidence circuit 305 sends a M-code coincidence signal to a up-down condition gate circuit 306 for causing it to supply to the address counter 302 a signal for reversing the counting operation—in this case a down count signal. Signal T1 produced by a timing pulse generator 308 acts as a counting pulse when the address counter 302 counts up or counts down. During the count up operation, the binary count increases in the order of A7, A6 - - - A1, A0 of the eight output bits whereas during the count down operation the count is decreased. Signals UP and DOWN show the count up and count down operations of the address counter 302. Signal OIF is used to reverse the direction (D24) of the movement along Y axis. A decoder 309 is used to decode the codes D11–D14 which represent the type of control stored in the PROM 303 and when the code corresponds to (1) shown in the following table 1, that signal "0000" is applied to the timing pulse generator 308 and then a set signal $\overline{00.T2}$ for setting the output bits D18 - D23, D25 -D28, and D31 -D38 of the PROM 303 in X instructin counter, Y instruction counter and operation number counter 313 respectively is applied to the timing signal generator 308.

Table 1

|     | P11 | P12 | P13 | P14 |
| --- | --- | --- | --- | --- |
| (1) | 0 | 0 | 0 | 0 |
| (2) | 1 | 1 | 1 | 0 |
| (3) | 1 | 1 | 1 | 1 |
| (4) | (combinations other than (1) (2) and (3) | | | |

Case (2) of Table 1 represents an optional stop code "1110" which is applied to the address gate circuit 307. In this case, whether the address is to be advanced or stopped is determined by a signal OS representing the ON/OFF states of the optional stop switch.

Case (3) of Table 1 shows a stop code "1111" which is applied to the address gate circuit 307 and up-down condition gate circuit 306. In response to the stop code "1111" these gate circuits 306 and 307 generate signals CLST.$\overline{ACS}$ of which the former CLST is applied to the timing pulse generator 308 and the address counter 302, whereas the latter $\overline{ACS}$ to the address counter 302 and address condition gate circuit, where ACS means "address counter set" and CLST means a "clear" or "start". Case (4) of Table 1 shows mirror codes by which a signal TO is applied to the timing pulse generator 308 from the address gate circuit 307. A signal $\overline{111}$ is also applied to the address gate circuit 307 from decoder 309, where $\overline{111}$ represents an optional stop or $\overline{1111}$.

Furthermore, signals TCOT (lower bobbin exhaustion signal), ST (start push button switch signal), OS (optional stop switch signal), TC thread break detection signal $\overline{SCF}$ (thread break awaiting signal), CL (clear signal) and SW1 (test drive switch signal) are also applied to the address gate circuit 307 for producing signals NCOT (electromagnetic counter counting pulse), $\overline{STF}$ (pulse signal produced upon depression of the start push button) and $\overline{CL}$ (inversion of the clear signal).

The timing signal generator 308 produces two clock pulses CP1 and CP2 having different phases and signal T1 supplied to the up-down condition gate circuit 306. The timing signal generator 308 is supplied with a signal T0 from the address gate circuit 307. The purpose of signal T0 is to provide a count instruction to the address counter 302 for returning the address to i-1 when the counter is up counting and when a code representing the type of the control at address i corresponds to one of the M-codes ("0001"–"1101") preset in the M-code set switch 304 and to provide a count instruction for advancing (up or down) the address to the next address when the M-code is different from those set in the address selection switch 301. Signal T0 comprises signal T1. However, it should be understood that signal T1 may be constituted by a signal other than signal T0. In any case, it is used as an instruction signal for advancing the address by one. In addition, the timing pulse generator 308 is connected to receive an instruction signal AU for advancing (up or down) of the address of the address counter 302 and an instruction signal DR for reading the data without advancing the address from the address condition gate circuit 310, where AU represents "address up" and DR "data read". Where signal AU is applied when the data code representing the type of the control is "0000", the timing pulse generator 308 advances the address of the address counter 302 in accordance with signal T1. When signal DR is applied, the timing signal generator 308 firstly generates signal $\overline{T2.CP1}$ and then in responce to the next clock pulse CP2, generates a set signal $\overline{00.T2}$ (which is produced at time T2 when the data code is "0000" in synchronism with clock pulse $CP_2$) for setting the quantities of movements in the X and Y directions into X and Y instruction counters 311 and 312 respectively. Signal $\overline{T2.CP1}$ is herein used as the first clock pulse when the counts of the counters 311 and 312 are used for a digital differential analyzer (DDA). The address condition gate circuit 310 is supplied with clock pulse CP2 from the timing pulse generator 308 and pulse signal $\overline{ACS}$ from the address gate circuit 307. Furthermore, the address gate circuit 310 is supplied with a signal COXY which becomes "1" when both counters 311 and 312 count out and signal $CO.\overline{CO}$ which is produced when the operation number counter 313 counts out. In addition to signals AU and DR, signals NIM is also applied to the operation number counter 313 when both counters 311 and 312 count out for causing the counter 313 to count down. A "GATE including address gate circuit 307, timing pulse generator 308, and address condition gate circuit 310 which are bounded by dot and dash lines operates as follows:

(1) Codes D-11–D14 decoded by decoder 309 and representing the type of the control of PROM 303, the count out signal COXY of counters 311 and 312, and the count signals $CO.\overline{CO}$ of the operation number counters 313 are applied to the GATE.

(2) The GATE produces a signal which sets the data SL0–SL7 of the address selection switch 301, that is the address counter set signal $\overline{ACS}$ into the address counter 302.

(3) The GATE Produces a signal CLST which resets the content of the address counter 302.

(4) The GATE produces a signal T1 which advances (count up or down) the count of the address counter 302.

(5) The GATE applies set instruction signals $\overline{00.T2}$ of data D18–D23 and D25–D28 (except D19 and D20) to counters 311 and 312 and a subtraction pulse NIM to the operation number counter.

Above described items (1) through (5) are the principal functions of the GATE.

Data D15 and D16 are supplied to a control circuit 314 which exchanges signals with a drive unit 315 including the head of the sewing machine and other actuators as shown by a thick arrow. 335 shows an interface between the control circuit 314 and the drive unit 315. Feed pulse FPC for driving the cloth clamping plates is generated by a pulse generator 316 and when the counter 311 is not in the count out state, that is when COX="0", the feed pulse $\overline{FPC}$ is converted into an overflow pulse $\overline{OVFX}$ by the gate circuit 317 and supplied to a gate circuit 320. The overflow pulse $\overline{OVFX}$ is also applied to the counter 311 to decrease its count. Similarly, the feed pulse $\overline{FPC}$ is converted into an overflow pulc $\overline{OVFY}$ by a gate circuit 318 and this overflow pulse is applied to counter 312 and gate circuit 321.

Data D17 representing the direction along the X axis is also applied to the gate circuit 320 so as to apply to a gate circuit 328 positive and negative feed pulses in the X direction XFPP and XFMP (X feed plus pulse, X feed minus pulse).

Pulses XFPP and XFMP are also applied to an absolute counter 324 in the X direction. In FIG. 17 pulses XFPP and XFMP correspond to AXUP and AXDN respectively. The purpose of the absolute counter 324 is to memorize the absolute value of the amount of movement of the clamping plates from the start point of the program during the sewing operation so as to enable the clamping plates to return to the starting point independently of the instruction of the PROM 303 when the sewing operation is finished or the thread cuts during the sewing operation. A start point return instruction gate circuit 334 is provided to prevent application of the signals $\overline{OVFX}$ and D17 to the gate circuit 320 by an start point return instruction signal ORG or a stop signal "1111" and to apply signals AXSGN and $XFPB.\overline{ACOX}$ to the gate circuit 320 via a gate circuit 322.

Signal $\overline{XFPB}$ represents a feed pulse sent from the program start point return pulse generator 326 regarding X axis and signal $\overline{ACOX}$="1" when the absolute counter 324 is not in the count out state. Signal AXSGN is used to discriminate positive and negative signs of the count of the absolute counter 324.

Component elements regarding the Y axis are constructed similarly. Thus, gate circuit 321 corresponds to gate circuit 320, counter 325 to counter 324, gate circuit 323 to gate circuit 322, pulse generator 327 to pulse generator 326, signal AYSGN to signal AXSGN, signal $\overline{ACOY}$ to signal $\overline{ACOX}$ and signal $\overline{YFBP}$ to signal $\overline{XFBP}$ respectively. The gate circuit 333 comprises an exclusive OR gate circuit which reverses the bit D24 in the Y direction stored in PROM 303 when a M-code is given and a coincidense signal M is produced. This operation will become clear later.

The gate circuits 328 and 329 operate to effect switching between a feed pulse MFP applied through a manually operated switch 319 and the signal XFPP.XFMP or YFPP.YFMP. 330 and 331 are drive circuits for the X and Y axes pulse motors 117 and 118. 336 shows a pulse generator unit comprising pulse generators 316, 327 and 332 which generate pulses $\overline{FPC}$, $\overline{YFPB}$ and MFP respectively. The reason that two independent X and Y axes pulse generators 326 and 327 are provided for the purpose of returning to the starting point lies in that the sewing length in the X direction of the profile seam shown in FIG. 3 is generally longer than that in the Y direction so that it is necessary to increase the speed of movement of the cloth clamping plates 107 in the X axis direction by using a feed pulse $\overline{XFPB}$ having higher frequency. However, it is possible to use the same pulse as the X and Y feed pulses $\overline{XFPB}$ and $\overline{YFPB}$. 339 represents a generator of the clear signal CL supplied with signals ACOUT and $\overline{CLB}$. Signal ACOUT becomes "1" when $\overline{ACOX} = \overline{ACOY} = $"0" or the contents of the absolute counters 324 and 325 are zero, that is when the sewing operation is returned to the starting point whereas signal $\overline{CLB}$ becomes "0" when a clear button is depressed.

Figure 18:
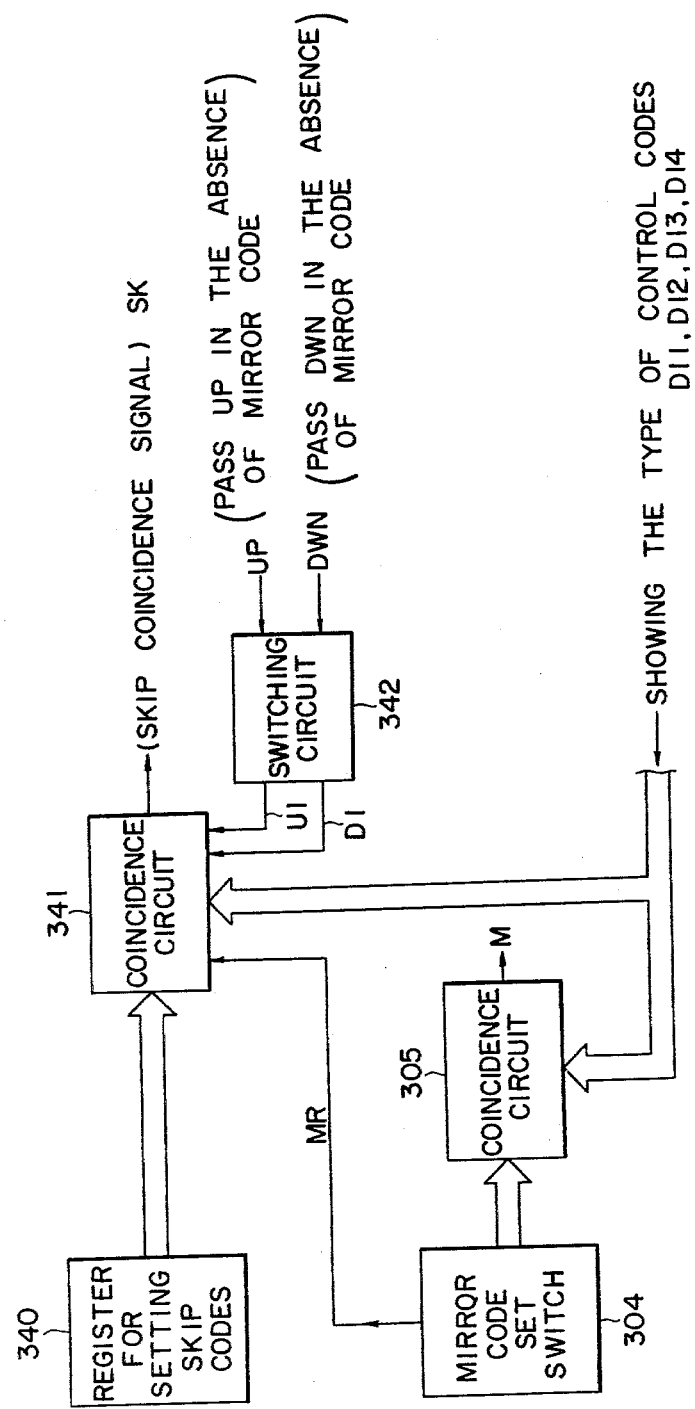
FIG. 18 is a block diagram to be added to the block diagram shown in FIG. 17 for processing skip codes.

FIG. 18 shows a block diagram to be added to the block diagram shown in FIG. 17 when a plurality of sewing patterns to be sewed are formed on the same clamping plates as in the case of sewing different pocket patterns. In this case, 4 bit skip codes similar to mirror codes are set in a register 340, and a coincidense circuit 341 produces a skip coincidence signal SK when a code presenting the type of the control coincides with a skip code thus effecting a skip (that is a data which moves the cloth clamping plates with respect to the needle while maintaining it at the upper dead center from the end point of one pocket pattern to the start point of the other pocket pattern which are arranged on the same clamping plates). P In FIG. 18 when one pocket pattern is sewed by using mirror codes, the comparison operation of the coincidence circuit 341 is governed by the outputs U1 and D1 of the switching circuit 342. Because, as will be described later, where a plurality of pocket patterns, for example, are sewed by using mirror codes the skip codes in the PROM are effective when they are read out when the count of the address is at the return state. Signal MR becomes "1" when the mirror codes are set by a mirror code set switch 304.

The skip code set register 340 is utilized when a plurality of sewing patterns are sewed even when mirror codes are not set. For example, the register can be used where a plurality of patterns, each not symmetrical with respect to the center line, are arranged on the same clamping plate. When the skip coincidence signal SK is produced in FIG. 18, the X and Y data and the operation number data of a given address are read out. In practice, it is sufficient to designate only one or two skips for one clamping plate, but usually a plurality of sequential skip codes are used.

For example, mirror codes and skip codes are segregated as follows.

| D11 | D12 | D13 | D14 | | |
|-----|-----|-----|-----|-----|-----|
| 0 | 0 | 0 | 1 | (1) | |
| 0 | 0 | 1 | 0 | (2) | |
| 0 | 0 | 1 | 1 | (3) | seven |
| 0 | 1 | 0 | 0 | (4) | skip codes |
| 0 | 1 | 0 | 1 | (5) | |
| 0 | 1 | 1 | 0 | (6) | |

-continued

| D11 | D12 | D13 | D14 | | |
|-----|-----|-----|-----|-----|-----|
| 0 | 1 | 1 | 1 | (7) | |
| 1 | 0 | 0 | 0 | (8) | |
| 1 | 0 | 0 | 1 | (9) | six |
| 1 | 0 | 1 | 0 | (10) | miller |
| 1 | 0 | 1 | 1 | (11) | codes |
| 1 | 1 | 0 | 0 | (12) | |
| 1 | 1 | 0 | 1 | (13) | |

With this grouping, by increasing or decreasing by one the count of register in which the skip codes are set, each time one pattern is completed, it is possible to designate the next skip code.

In the arrangement shown in FIG. 17, where a plurality of patterns utilizing skip codes are arranged on the same clamping plate it is advantageous to cause the stop code "1111" of the start point return instruction signal to be effective only when the sewing operation of the last pattern is completed.

V Data Regarding Sewing of Collar and Pocket Pattern of Shirt (FIGS. 19-23)

Figure 19:
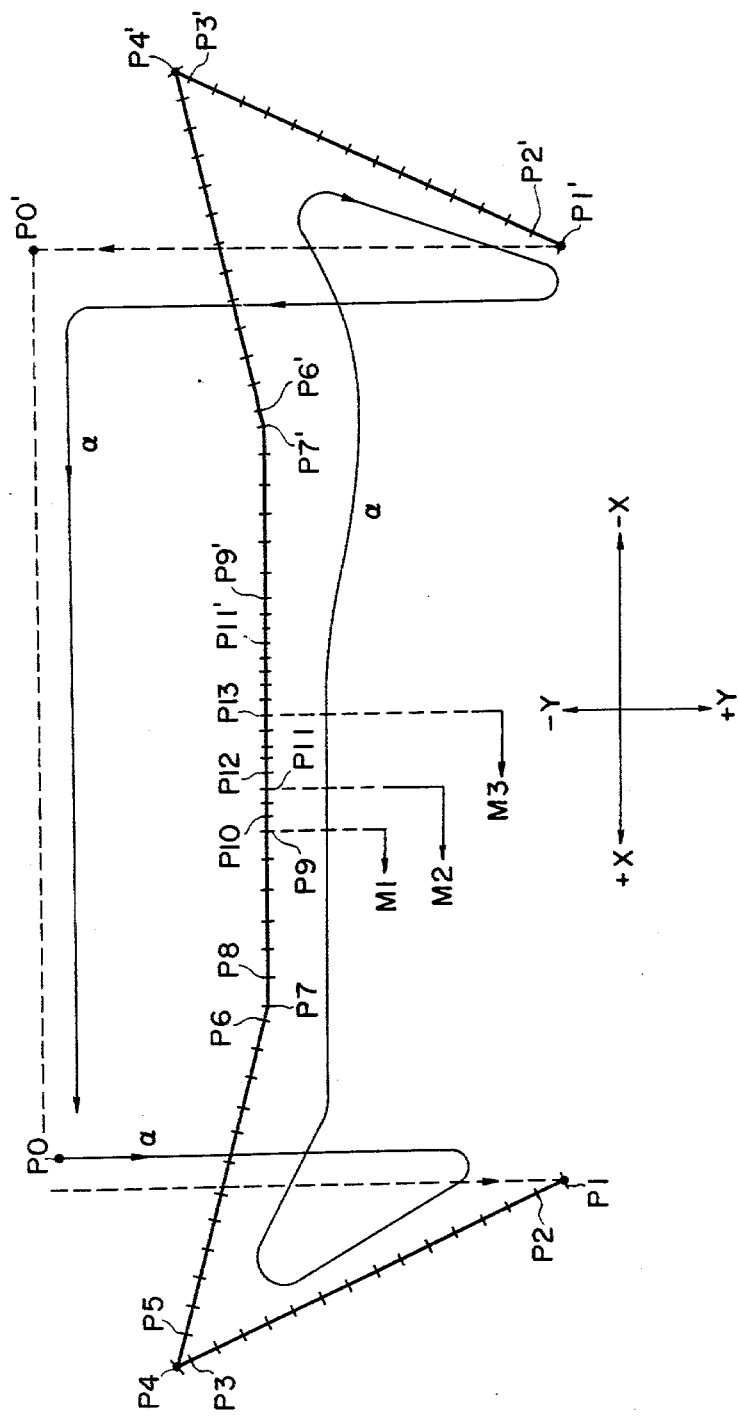
FIG. 19 is a diagram showing stitching positions when sewing a collar of a shirt by using mirror codes.

FIG. 19 shows the detail of a sewing pattern of a clamping plate for sewing the collar of a shirt. In this case, mirror codes are used instead of skip codes since the clamping plate is provided with only one pattern. With this pattern, it is possible to sew three types of collars of different size by utilizing points P9, P11 and P13 as the center positions respectively. Point P0 shows a program origin and point P1 a sewing start point. The needle is moved along a path $\alpha$ with respect to the clamping plate. The portion between points P1' and P0 through P0 shows the origin returning operation.

FIGS. 20a and 20b show the correspondence between the addresses of PROM 303 and the data stored therein for sewing three types of the collars shown in FIG. 19.

In FIGS. 20a and 20b, bits D11-D14 showing the type of control at addresses 9, 10 and 13 show the mirror codes corresponding to points P9, P11 and P13 shown in FIG. 19 and when one of these codes is set in the mirror code set switch 304 shown in FIG. 18, a collar having a size corresponding to the codes can be sewed.

On the assumption that a code "0011" corresponding to point P has been set, a process of reading out the data shown in FIGS. 20a and 20b for performing the profile sewing shown in FIG. 19 will now be described. In this case, the length of the spacers 220 and 221 (FIG. 9) between clamping plates 107 corresponds to that shown in FIG. 19 (that is from point P1 to point P13). After clamping the cloth between the clamping plates 107, the clamping plates are secured to the X table 124 in the Y table 106 with the needle positioned near the program origin (See FIG. 7).

Assume now that, address 1 is set in the address selection switch 301 shown in FIG. 17 and that a mirror code corresponding to point P13 shown in FIG. 19 is set in the mirror code set switch 304. When a start pulse signal $\overline{STF}=$"0" is applied by the start push button, the address counter 302 is reset by signal CLST, whereby the output bits A0-A7 of the address counter A0-A7 are changed to "0". Accordingly, the 0 address of the PROM 303 is designated to change the data D11-D38 at the 0 address to readable states. When decoder 309 decodes the data D11-D14 regarding the type of control into a stop code "1111", a signal $\overline{ACS}=$"0" is applied to the address counter 302 to set address 1 which has been set in the address selection switch 301 in the address counter 302. Accordingly, the address designation for PROM 303 becomes address 1. Then, when the set value one is set in the address counter 302 from the address selection switch 301, signal "$\overline{1111}$" becomes "1" since the type of the control is "0000" so that when applied with a signal T1 ($\overline{T2.CP1}$) the count of the address counter 302 is advanced by one. In the same manner, until a signal M is received the count of the address counter is increased in accordance with the count pulse.

Since the type of control at the addess 1 of PROM 303 is "0000", in response to the decoded code signal "0000" supplied to the timing pulse generator 308 from the decoder, the pulse generator 308 applies a signal $\overline{00.T2}$ to counters 311, 312 and 313. A signal $\overline{T2.CP1}$ is applied to DDA 337. Since D24="1", D25-D28="1111", D31-D34="0011" and D35-D38="0000", data for repeating 30 times a movement pattern in which the clamping plate is moved by 15 pulses in the −Y direction are stored in the PROM 303, 0 is set in counter 311, 15 in counter 312 and 30 in counter 313, respectively.

Consequently, the clamping plate 107 is moved in the negative direction (that is from point P0 to point P1) on the table 103 relative to the needle.

When the operation number counter 313 counts up (C0="1"), the address is advanced in the direction of up whereby the address counter 302 designates 2. At address 2, the type of control is "1110", that is the optional stop code.

During the first sewing operation, the optional stop switch is ON so that the operation of the sewing machine is stopped and the needle is brought to a position just above the start point P1 by manual operation. The needle 245 can readily be positioned just above the start point P1 by inserting pin 244 into a sewing start point confirmation opening 240 of the clamping plate 107 (see FIG. 11). Then, the optional stop switch is opened. When the start button is depressed again, the address is advanced to 3, in which D11-D14="0", D16="1" and D38="1" so that the cloth clamping plates 107 would not be moved and the needle 245 is reciprocated once at a low speed. Immediately after withdrawal of needle 245 from the cloth, a stitch detection signal $\overline{Ts}$="0" advances the address by one. At address 4 since D15="1", an instruction for repeating 14 times the movement pattern in which the clamping plate is moved by 4 pulses in the −X direction and by 12 pulses in the direction of +Y so that cloth is sewed up to point P3 by moving the needle 245 at a high speed. At point P3, immediately after withdrawal of needle 245 from the cloth, a stitch detection pulse $\overline{TS}$="0" is produced to advance further the address by one.

Since at address 5, D15="1" and D17="1", a movement pattern is designated according to which the clamping plate is moved in the −X direction by two pulses and in the +Y direction by six pulses. In the same manner, address is advanced to address 8. An instruction in which a movement pattern (+Y=15, Y=0) is to be repeated 6 times is stored in address 8. As a result, when the sewing operation reaches point P9, address 9 is designated. At address 9 is stored a M-code in which D11-D14 are "0001". At this time, since a code "0011" is set in the mirror code set switch 304, no coincidence signal M is produced so that the address will be advanced further by one.

The address is advanced by a pulse signal T1 produced by pulse signal T0. At the next address 10, an instruction for repeating 3 times a movement pattern (+X=8, Y=0) is given. When point P11 has been sewed, signal $\overline{TS}$ becomes "0" thus advancing to the next address "11". At address 11, since M-code is "0010" so that the coincidence signal M is not produced and the address is advanced further. At the next address 12, an instruction for repeating 5 times a movement pattern (+X=8, Y=0) is given. When signal TS=0 is applied at the completion of the sewing of point P13, the address is advanced by one to the next address 13. Since a M-code "0011" is stored in this address a coincidence signal M is produced and the count output of the up down condition gate circuit 306 changes to DWN from UP while signal 01F changes to "1" from 0.

Accordingly, the next address 12 is designated again. In a state wherein signal 01F="0", that is when the address is advanced from 1 to 13 the logical output of the exclusive OR gate 333 is the same as the bit sign of D24 that the same "direction" in the Y direction as that stored in PROM 303 is given. However, when signal 01F becomes "1", the bit of D24, that is the direction of movement in the Y direction is reversed and a new instruction is applied to pulse motor 113.

Upon designation of address 12, the same sewing operation is performed up to point P11' and when this point has been sewed, the address is shifted down by one by the signal $\overline{TS}$="0". (address is changed from 12 to 11). In the same manner, sewing is doen by the instructions till address 8 is reached.

The movement data along Y axis between points P13 and P7' are D24="0", D25-D28="0" so that even when signal D24="0" is inverted by signal 01F="1" no change occurs. When signal $\overline{TS}$ becomes "0" at point P7', address 7 is designated so as to read out +X=7 pulse and −Y=1 pulse from the PROM. However, at this time, since D24="1" and 01F="1", −Y is converted to +Y with reference to Y axis. In the same manner, the sewing operation proceeds in the order of points P6'→P4'→P3'→P2'→P1'. When a stitch detection signal $\overline{TS}$="0" is applied at point P1', the address is changed to 3 and stitching is repeated once at a low speed at this position.

Since the optional stop switch is OFF, the address is changed to 1 through 2. At address 1, since D16="0", an instruction for repeating 30 times a movement pattern in the Y direction (−Y=15, X=0) is given. At this time, −Y is converted to +Y by signal 01F="1".

Consequently, the clamping plate 107 is moved in the direction of +Y, that is from point P1' to point P0' with respect to the needle. When the operation number counter 313 produces a count out signal at point P0', the address is advanced further by one, thus reaching address 0 at which stop code "1111" is produced. Consequently, the gate circuits 320 and 321 pass the origin return feed pulse $\overline{XFPB}$ and $\overline{YFPB}$ to produce an output pulse AXDN thus moving the clamping plate 107 to point P0 with respect to the needle. The absolute counters 324 and 325 sequentially discriminate and count feed pulses XFPB, XFMP, XFPP and YFMP starting from the program origin P0' and their counts up to point P0 are as follows.

Point P0 (X.Y)=(0,0)
Point P1 (X.Y)=(0, −450)
Point P3 (X.Y)=(0−56, −450+192)
Point P4 (X.Y)=(0−52−2,,450+192+6)

Point P6 (X.Y)=(0−56−2+168−450, +192+6−24)
Point P7 (X.Y)=(0−56−2+168+7, −450+192+6−24−1)
Point P13 (X.Y)=(0−56−2+168+7+154, −450+192+6−24−1+0)
Point P13 (X.Y)=(+271, −277)

Since the data regarding the path between points P0 and P13 can be obtained by merely reversing the direction Y, the data regarding point P0' is as follows.

---
P0' (X . Y) = (+271 + 271, −277 + 277)
           = (+542.0)
---

Consequently, at point P0', the counts of the address counters 324 and 325 are +542 and 0, respectively. When the stop code "1111" is read out as above described after moving to point P0' signal $\overline{ACOX}$ becomes "1" (since the count of counter 324 is not 0), whereas signal $\overline{ACOY}$ becomes "0" (since the count of counter 325 is 0). Moreover since signal AXSGN="0", AND gate circuit 322 is enabled to produce an origin returning feed pulse $\overline{XFPB}$, thus producing a pulse signal AXDN.XFMP. In response to this signal the clamping plate 107 is moved to point P0 from point P0' and this movement stops when signal $\overline{ACOX}$ becomes 0.

With reference to the direction Y, as the gate circuit 323 is not enabled feed pulse $\overline{ACOY}$="0" would not be produced and when $\overline{ACOX}=\overline{ACOY}$="0" signal ACOUT becomes "1".

The address counter 302 is reset by the stop code "1111" produced at point P0.

When the program returns back to the origin P0, the sewed cloth is removed and a new cloth is clampled between the clamping plates for the second cycle. Although in the foregoing example of the sewing operation, a M code "0011" was set in the mirror code selection switch 304, where a M-code "0001" or "0010" is set, the address counter 302 returns from address 9 or 11. Further, in the example described above, the program is automatically returned to the origin P0 when the address has changed as 0→13→0, but where the lower thread breaks at any sewing position, the movement of the clamping plates 107 and the reciprocating motion of the needle are stopped at that position. In such case, when the origin return push button is depressed for the purpose of returning the program to the origin, signal ORG becomes "1" so that an origin returning operation will be made in the same manner as in the case of the stop code "1111". In this case, the clamping plate is moved directly to the origin P0 from the stop position and during this movement the needle is maintained at the upper dead center. In FIGS. 20a and 20b, address 14 and the following addresses are used for other profiles, and when the address selection switch 301 is set to address 15 the address is changed from 0 directly to address 15 when signal ACS="0".

Figure 21:
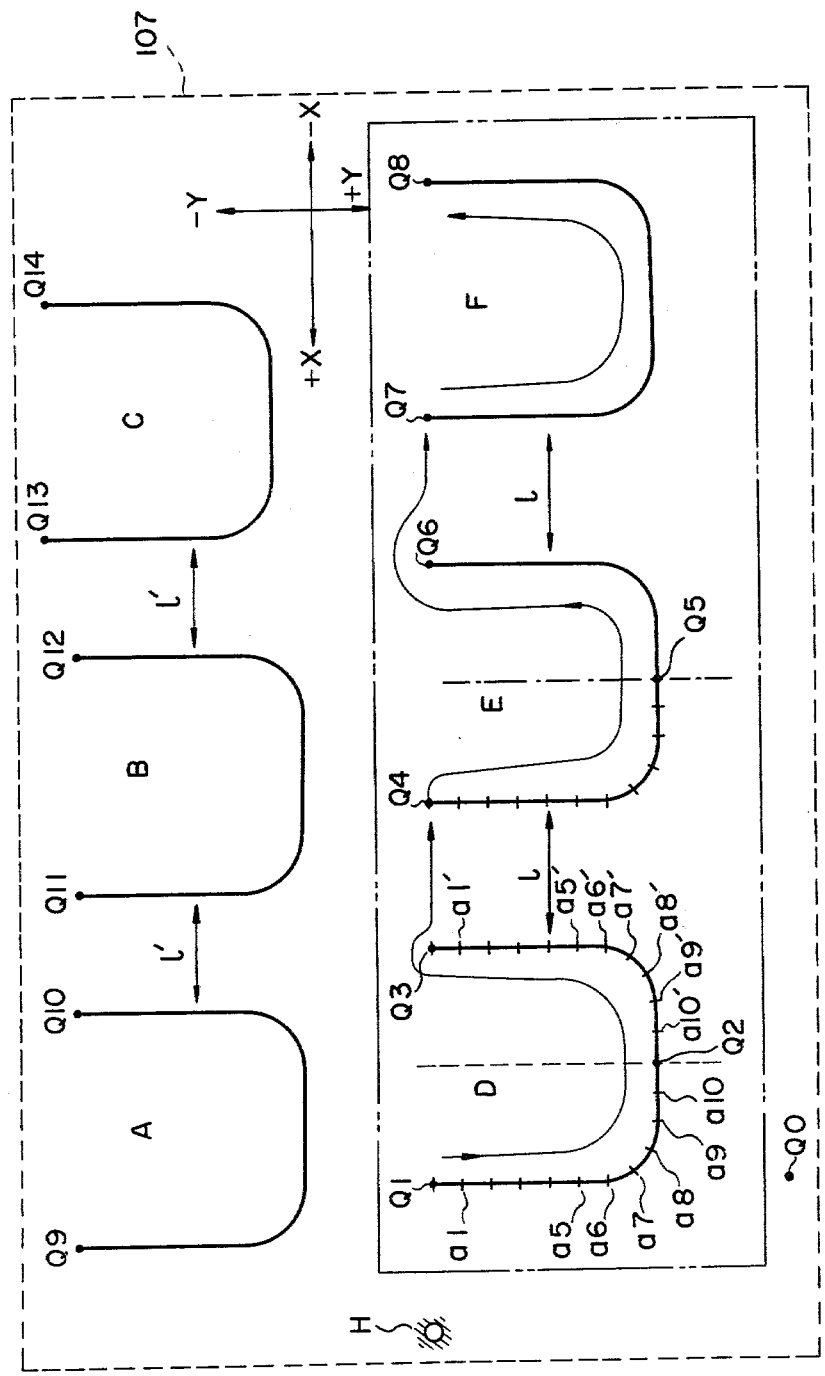
FIG. 21 is a diagram showing stitching positions when sewing pocket patterns.

FIG. 21 shows one example in which a plurality of pocket patterns are arranged on the same cloth clamping plate 107. Patterns D-F are arranged in the X direction with the same spacing l. They are arranged in the same manner also in the Y direction. Patterns A, B and C are arranged with the same spacing l' but pattern C is displaced in the Y direction and l=l'. Where only patterns D, E and F are to be sewed, data regarding the paths of points Q1-Q2, points Q2-Q3, points Q3-Q4 and points Q4-Q5 are stored in PROM 203 and a mirror code is set at point Q5. Then, the sewings from point Q5 to Q6 Q7 and Q8 are possible. However, between points Q3 and Q4 it is set that D15=D16="0" so that the clamping plate is moved while the needle is maintained at its upper dead center.

When one tries to substitute patterns A through F by a single pattern by using a first data starting from Q1 of pattern D to Q3 through Q2 and a second data including movement data regarding skip portions Q3-Q4, Q6-Q7, Q8-Q14, Q13-Q12 and Q11-Q10, it would be impossible to sew with only the mirror codes described above.

FIGS. 22a and 22b show the counter of the PROM containing a program for sewing the pocket pattern shown in FIG. 21 in the order of D, E, F, A, B and C without using the mirror codes, whereas FIGS. 23a and 23b show the content of the FROM containing a program for sewing the pocket pattern shown in FIG. 21 in the order of D, E, F, A, B and C by using the mirror codes.

FIGS. 22a and 22b are different from FIGS. 23a and 23b in the following points. Thus, in FIGS. 22a and 22b, data Q1→Q2→Q3 regarding a pocket pattern, for example the pattern D, are stored in addresses 3 through 12 and the skip quantities (Q3-Q4, Q6-Q7) between respective patterns are stored in addresses 13 through 17. However, in FIGS. 23a and 23b, the skip quantities are stored in addresses 3 through 7 preceding addresses 8 through 13 which store the data regarding the sewing operation. The number of addresses concerning the sewing operation is 6 (from 8 to 13), whereas in FIGS. 22a and 22b, the number of addresses is 10 (3 to 12).

In FIGS. 21, point Q0 shows the program origin, and H an opening for confirming the sewing operation start point. In FIGS. 22a and 22b, the pocket pattern D is sewed by executing addresses 3 to 12 and then the next address is designated. When a code "0001" is set in the skip code register 340 (FIG. 18), since the code stored in address 13 and representing the type of control is "0001", a skip coincidence signal SK is produced and data D15-D38 of address D13 are read out in the same manner as the data code "0000". The skip operation from point Q3 to point Q4 is represented by +X=1010, Y=0 and the operation number data is "00000101" that is 5.

In this manner, the clamping plate is moved from point Q3 to point Q4 by repeating 5 times the movement of 5 pulses in the direction of X. Upon completion of this skip operation, the address is advanced to the next address. The content of the skip code set register 340 is changed from "0001" to "0010" by an instruction signal (ST shown in FIG. 17) which is used to commence the sewing operation of the next pattern E. Thus, the address is changed from 13 to 14, and since a skip coincidence signal is not produced in response to code "0010" stored in address 14 and representing the type of control, the address is advanced further. At addresses 15, 16 and 17 no skip coincidence signal is produced for the reason just described.

At address 18, a stop code "1111" is read out. In the case where a number of sewing patterns are involved as in FIG. 21, no origin return instruction is produced at this time but instead address 2 would be designated for sewing the pattern E. While 1 was set in the address selection switch 301, 2 would be set when the optional stop switch is turned from ON to OFF.

Before advancing the address from address 2 content of the skip code set register 340 is changed from "0001"

to "0002" as above described so that the next skip coincidence signal SK will be produced at address 14. To sew the next pattern F, the address is sequentially advanced from addresses 2 and a skip coincidence signal is produced at address 15. Patterns A and B are sewed in the same manner until point Q13 is reached, and the sewing operation of the last pattern C is executed starting from address 2.

Under these conditions, the content of the skip code set register 340 is set to "0110" so that after the sewing operation has been proceeded to point Q14 by the data stored in address 12 no skip coincidence signal is produced at addresses 13 through 17. Then, when a stop code is produced as address 18, an origin return signal is produced so that the clamping plate is moved to point Q0 relatative to the needle. In the operation shown in FIGS. 23a and 23b, the skip code becomes effective when the control is returned to the mirror codes that is when the address counter 302 is down counting.

While the sewing processes of the collar and pocket patterns shown in FIGS. 19 and 21 have been described with reference to FIGS. 22a, 22b, 23a and 23b, it should be understood that the data of the PROM shown in FIGS. 20a, 20b, 22a, 22b, 23a and 23b can also be used for machining stitch grooves of the collar and pocket patterns through the clamping plate. In this case the needle is held at the dead center and the frequency of the feed pulses supplied to the X and Y pulse motors 117 and 118 is selected to be lower than that used for sewing. Since no stitch detection signal $\overline{TS}$="0" is detected the clamping plate is moved smoothly at the time of groove cutting instead of intermittently as at the time of sewing. When cutting the groove, it is necessary to hold the cutting tool at an elevated position at points corresonding to the skips. For this reason, optional codes are provided at addresses succeeding to addresses 12 and 17 respectively shown in FIGS. 22a and 22b so as to manually stop the movement of the clamping plate at these addresses thus moving the tool in the vertical position.

Figure 24:
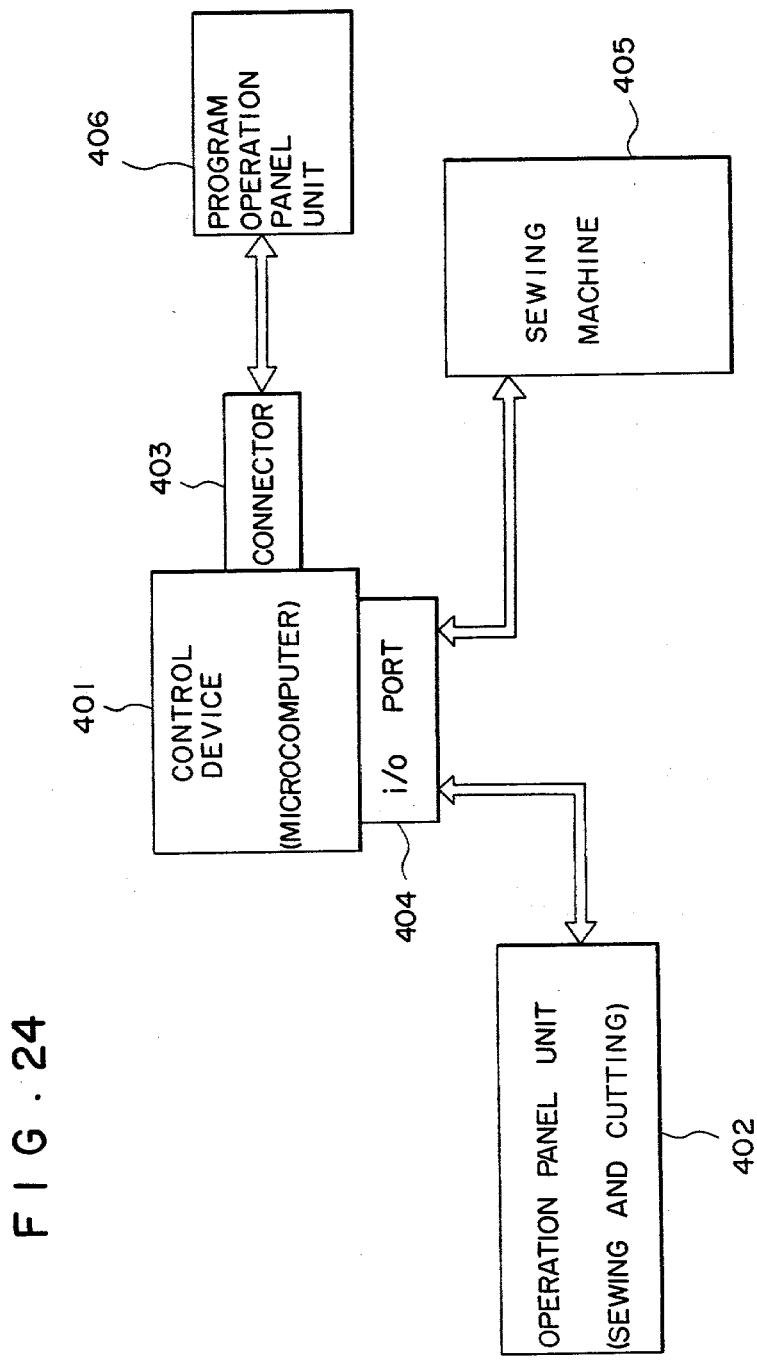
FIG. 24 is a block diagram showing a manner of combining various component elements of the control system of this invention.
Figure 25:
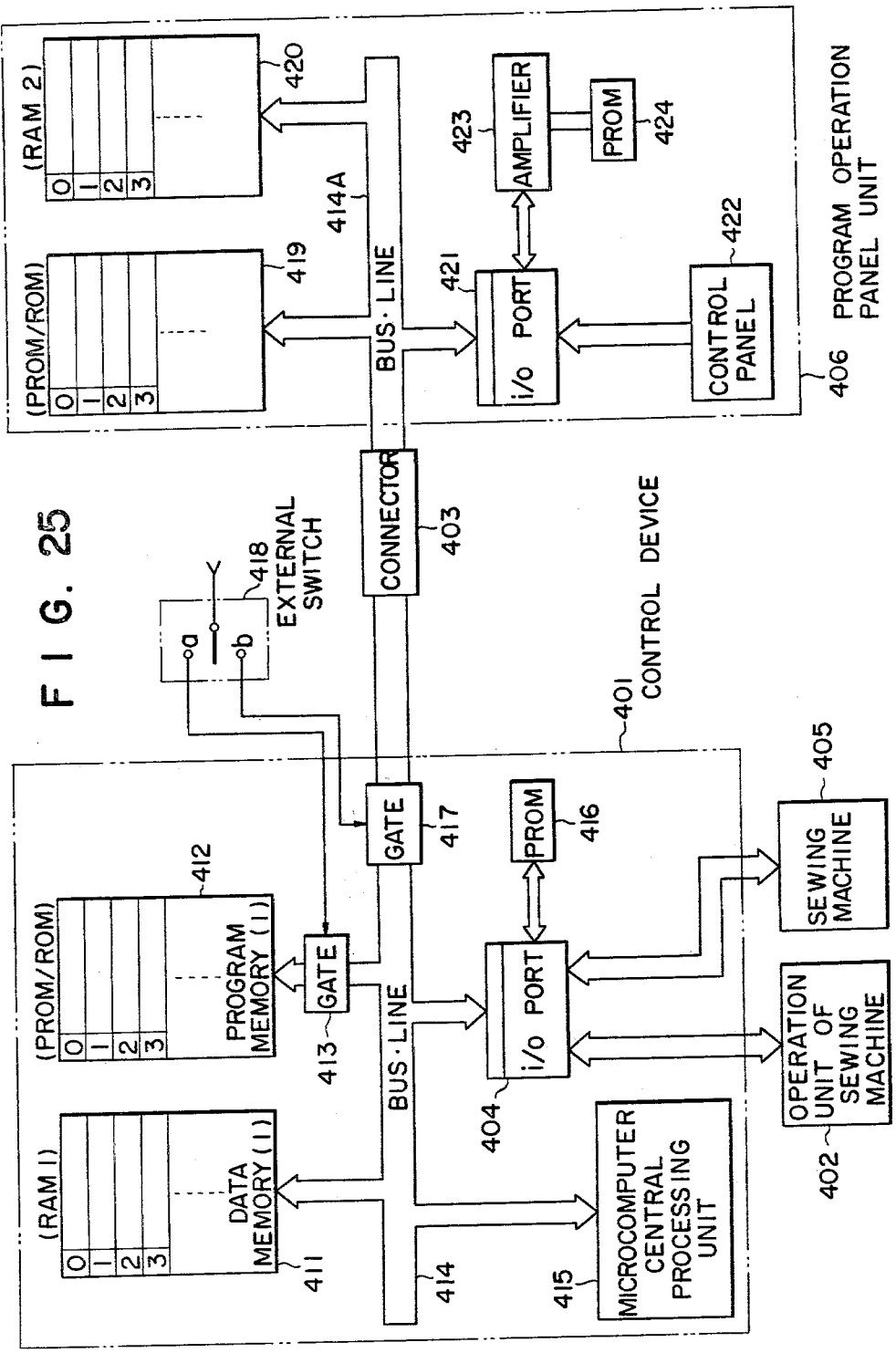
FIG. 25 represents a block diagram of a microcomputer system constructed according to the block diagram shown in FIG. 24.

VI Control Device and Programming Device Utilizing Microcomputer (FIGS. 24, 25)

FIG. 24 is a block diagram showing the basic arrangement of the apparatus wherein a microcomputer system is used to store programs for the sewing operation and the machining operation described above in a PROM. In FIG. 24, 401 designates a control device containing a microcomputer connected to a sewing machine 405 and an operation panel unit 402 thereof through an i/o port 404 of the parallel line unit type. 406 designates a program operation panel unit coupled with the control device 401 through a connector 403.

FIGS. 25a and 25b, when combined, show a detailed block diagram of the control device 401 and the program operation unit 406 shown in FIG. 24. In FIGS. 25a and 25b, a read access device (RAM) 411 is provided to temporarily store signals of the sewing machine operation panel unit 402, for example, discrimination between sewing and cutting, respective switch states of 8 bits of the address set switch 301, the states of various sequence signals of the sewing machine 405, X and Y movement data, and operation number data which are stored in a PROM 416 through a bus line 414 and the i/o port 404. In the PROM/ROM 412 are sequentially stored a series of operations necessary to sequentially read out sewing or machining data which are stored in the PROM 416 so as to cause the sewing machine to execute these operations. The PROM/ROM 412 is of nonvolatile type and its program is constructed to correspond to PROM 416. The central processing unit 415 of the microcomputer, and gate circuits 413 and 417 are connected to the bus line 414. These gate circuits 413 and 417 are controlled by an external switch 418 to designate either one of PROM/ROM 412 and the program operation unit 406 to operate. The bus line 414 of the control device is connected to a bus line 414A of the program operation panel unit 406 through a connector 403. A PROM/ROM 419 of this unit stores a series of operations or instructions for designating the address of PROM 424 in accordance with a predetermined order of sewing operations for storing data in the memory region of the address. The PROM/ROM 419 is constructed such that when the stitch positions of the needle on the table 103 of the sewing machine 405 are determined by the indices described below, the distances in the X and Y directions between respective stitch positions are given to RAM 420 as the amounts of movements of pulse motors 117 and 118 and then the contents of the RAM 420 are written into PROM 424 through an amplifier 423. Between the bus line 414A and the amplifier 423 is connected an i/o port of the parallel line type and control panel unit 422 provided with various switches and display lamps for confirming signals which are necessary to execute the program is connected to the i/o port 421. The detail of FIG. 25 will become apparent from the following descriptions regarding respective units.

Figure 26:
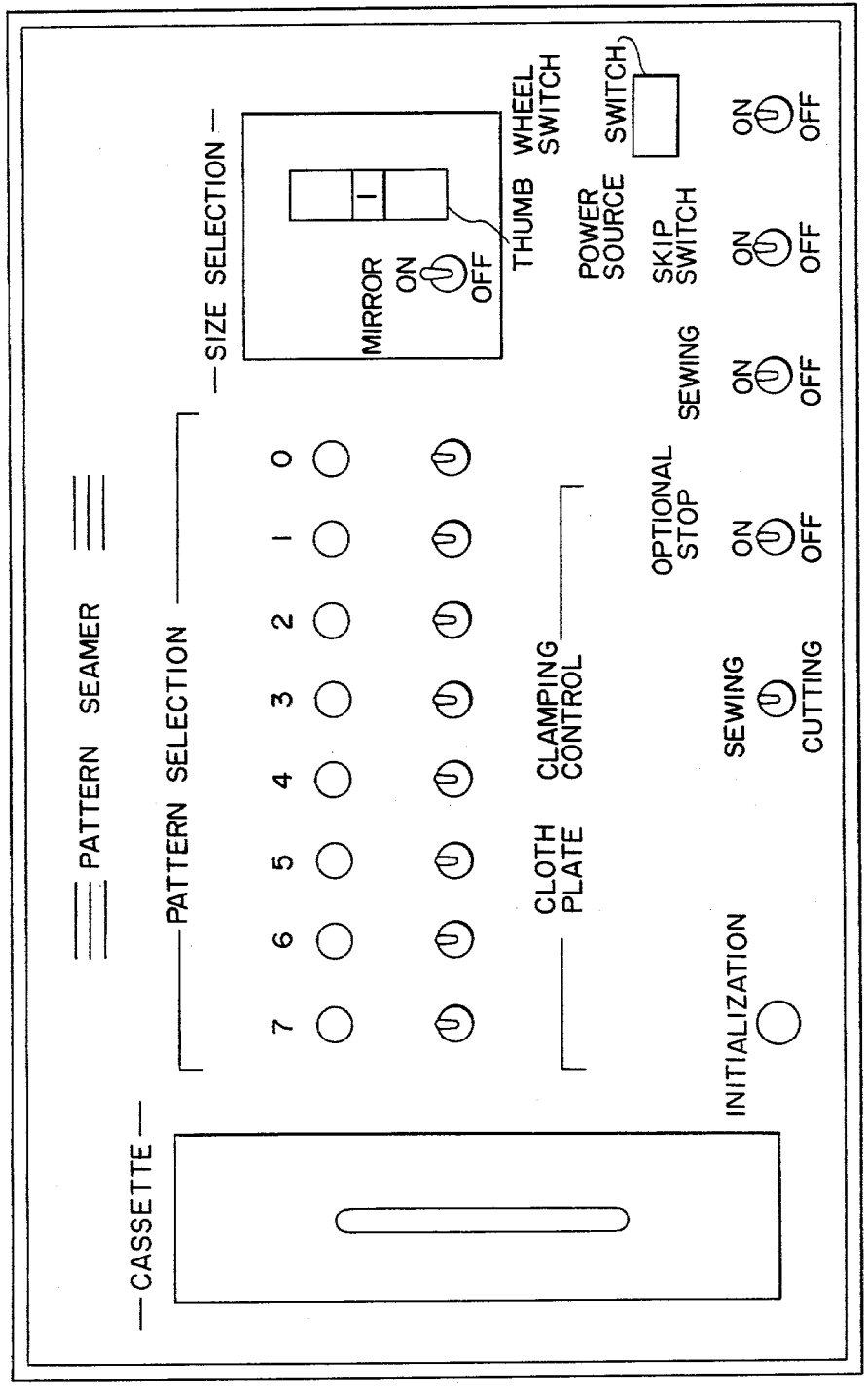
FIG. 26 is a front view of an operation panel unit of the sewing machine.
Figure 27:
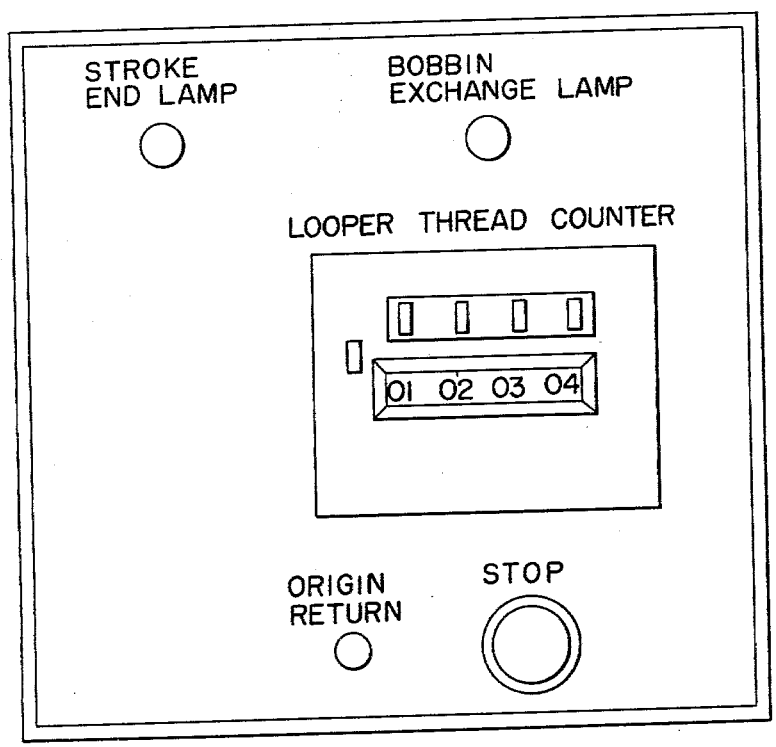
FIG. 27 is a front view showing an operating box mounted on the table of the sewing machine.

VII Operation Panel Unit (FIGS. 26, 27)

FIG. 26 is a front view showing the detail of the operation panel unit 402 shown, in FIG. 24. As shown a cassette opening is provided on the left of the panel to receive a PROM storing the data regarding sewing operation, and pattern selection snap switches and display lamps are arranged on the upper side. At the middle 8 snap switches are provided for designating the leading addresses of respective patterns (for example addresses 0 through 20 are allocated for the collar of a shirt, 21 through 50 for the pocket and 51 through 100 for the pocket covers) contained in the PROM inserted into the cassette opening. In the case of sewing a pocket pattern, the data is 21 (according to the binary representation "00011001") so that the first, fourth and fifth switches are turned ON.

The middle lower portion of the pannel is used for the control of the cloth clamping plate. Thus, when a initializing button is depressed, registers and RAM of the central control unit of the control device shown in FIG. 24 are cleared and necessary initialization is made.

Figure 28:
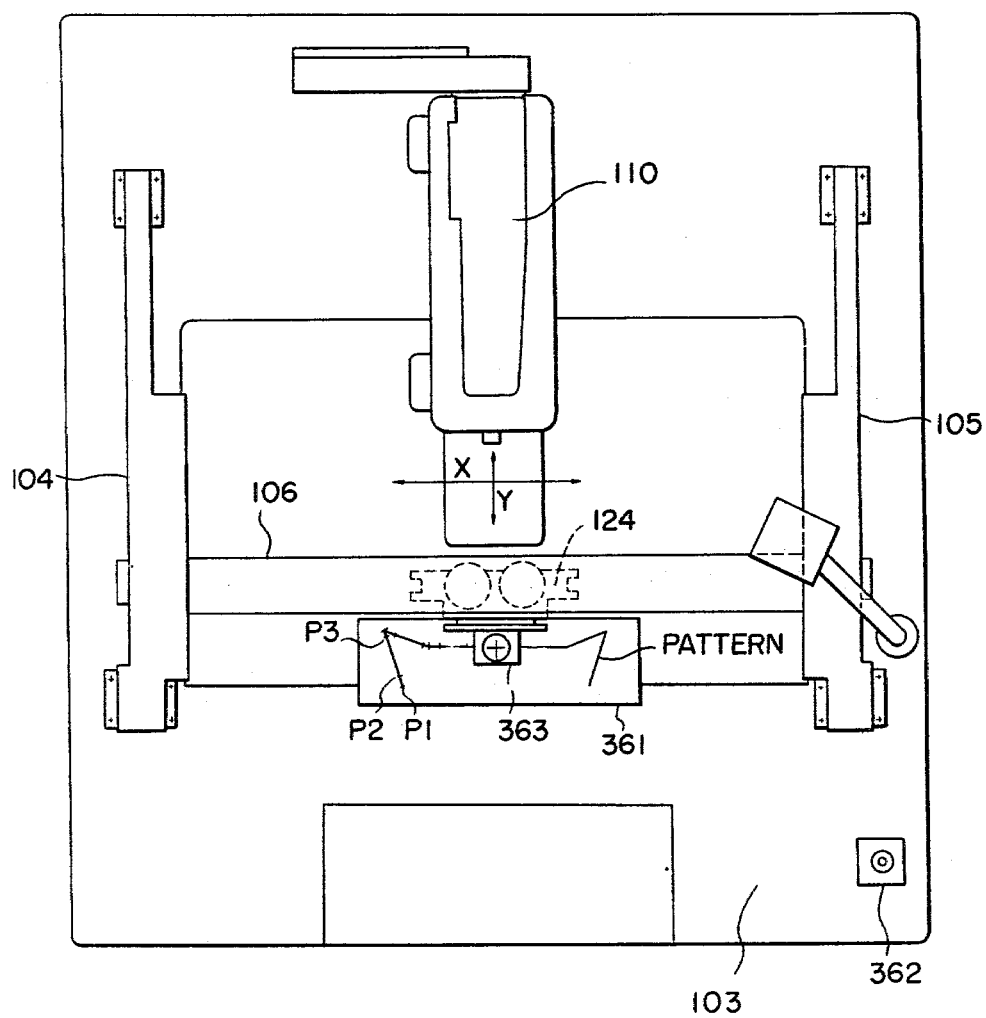
FIG. 28 is a plan view useful to explain the programming operation performed on the table of the sewing machine.

When an automatic/manual transfer switch is turned to the manual operation, it is possible to move the clamping plate 107, that is the X and Y tables 106 and 124 in any direction and at any desired speed by manipulating a joy stick 362 (FIG. 28).

In the case of the automatic operation the clamping plate is driven by the data stored in the PROM, and the sewing and cutting are discriminated by the sewing-/cutting transfer switch. In the case of the cutting, a cutting tool is mounted on the head of the sewing machine, as has been described hereinabove.

On the righthand side of the panel is mounted a thumb wheel switch for selecting the size so as to set one of the codes "0001", through "1101", that is mirror codes having a value of from 1 to 13 and regarding the type or index of control described above. Furthermore, there is provided a snap switch labelled "MIRROR" for causing effective the set value of the thumb wheel switch. A power source switch and a skip switch are also provided. The skip switch is turned ON when a plurality of patterns are to be sewed by using the same clamping plate irrespective whether the mirror codes are used or not.

FIG. 27 shows the front view of the operation box 112A shown in FIG. 1. At the left top is provided a display lamp for displaying the stroke end of the clamping plate 107 on the table in the X or Y direction. A looper thread counter provided at the center advances its count each time a sewing operation is completed on the clamping plate. The counter is provided with four push buttons for setting the digits, for example "1234" of the count.

The number of actual sewing operations is displayed to the left of the digits and in the example shown when "0000" becomes 1234 a bobbin exchange lamp located above the counter is lighted. A push button to the left of the counter is used to clear the counter, and a small push button beneath the counter is used to return the clamping plate 107 to the origin, whereas a large push button is used to stop the operation of the sewing machine.

VIII Sewing Pattern Programming Apparatus (FIGS. 28-32)

FIG. 28 is a plan view of an apparatus for programming a sewing pattern depicted on a sheet of paper 361 which is secured to the table 103 of the sewing machine. As shown, a joy stick 362 is provided for moving in the X-Y plane a magnifying lens (acting as a stylus) 363 secured to the X table 124 which is slidably received in the Y table 106 at any desired speed. Accordingly, it is possible to align the cross point (stylus) at the center of the magnifying lens with any one of the stitching positions P1, P2, P3 - - - on the sewing pattern depicted on the sheet 361.

Figure 29:
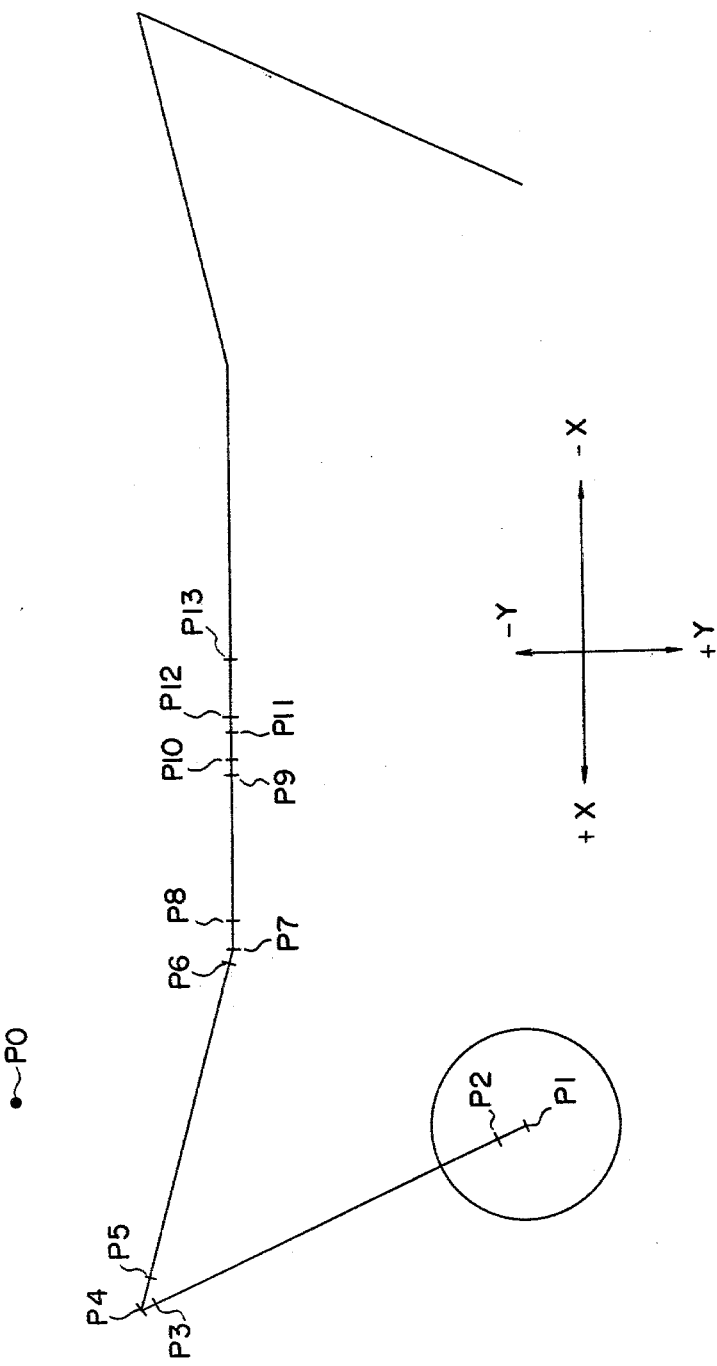
FIG. 29 is a diagram useful to explain the alignment of the stylus position shown in FIG. 28.

FIG. 29 is a magnified representation of the sewing pattern shown in FIG. 28 and is utilized to prepare a program of a collar. This pattern is identical to that shown in FIG. 19.

Figure 30:
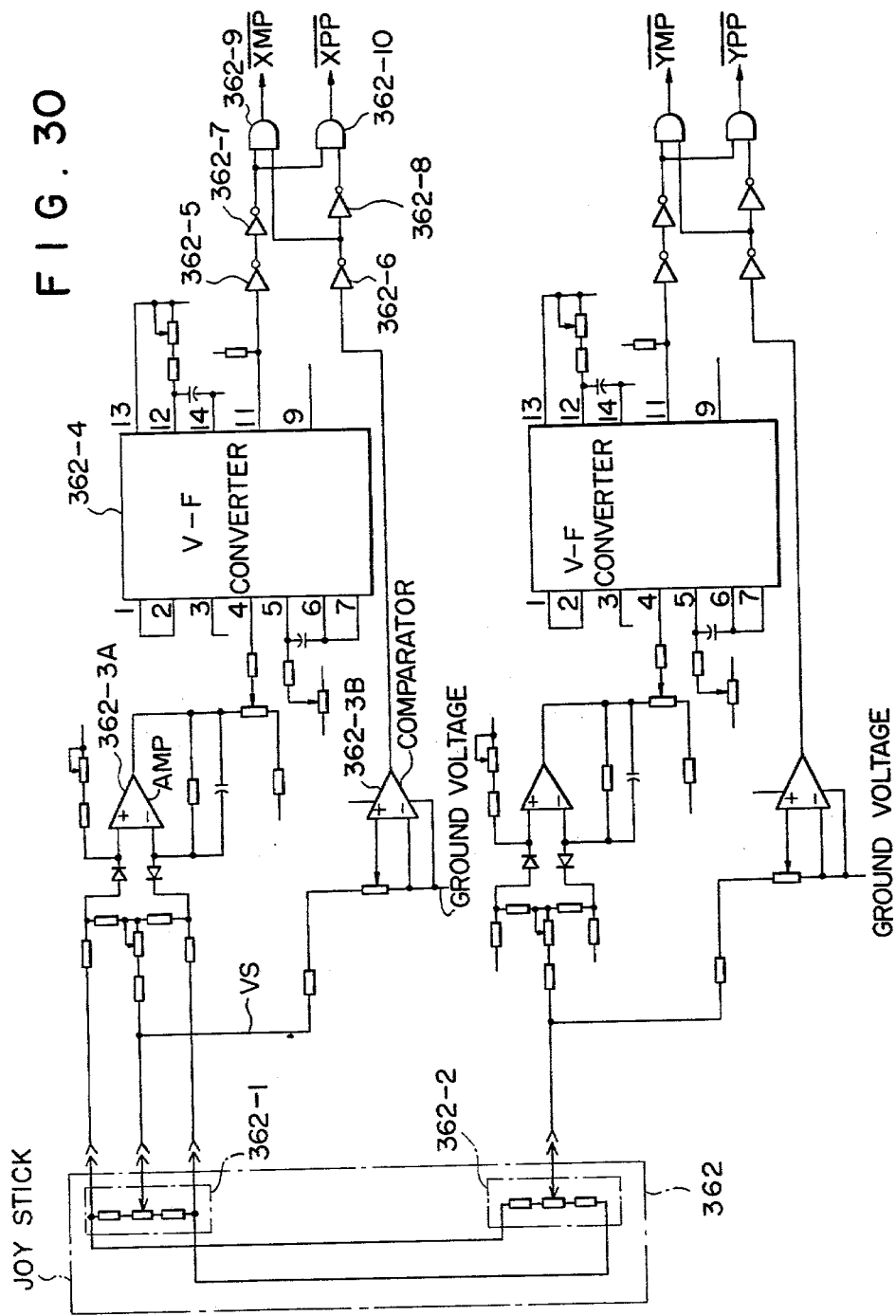
FIG. 30 is a connection diagram showing the detail of the joy stick and the V-F converter.

FIG. 30 shows a circuit utilized to convert the outputs of the joy stick 362 shown in FIG. 28 into pulse trains for driving X and Y pulse motors 117 and 118. The resistance value of a variable resistor 362-1 is varied by the manipulation of the joy stick and its output is used to drive the pulse motor in the X direction. The output VS of the variable resistor 362-1 is amplified by an amplifier 362-3A and its output is applied to an input 4 of a voltage-frequency converter 362-4, so that voltage having a frequency proportional to the output VS of the variable resistor 362-1 is applied to an inverter 362-5, the output thereof being applied to one inputs of NAND gate circuits 362-9 and 362-10 through an inverter 362-7.

The output voltage VS is compared with a zero ground voltage by a comparator 362-3B for applying "1" or "0" to an inverter 362-6 depending upon whether VS>0 or VS<0. When VS>0, the inverter 362-8 produces an output "1" whereby the NAND gate circuit 352-9 is enabled to produce a pulse train $\overline{XMP}$. The circuit for the Y axis shown at the bottom is constructed in the same manner as the circuit for the X axis.

Figure 31A:
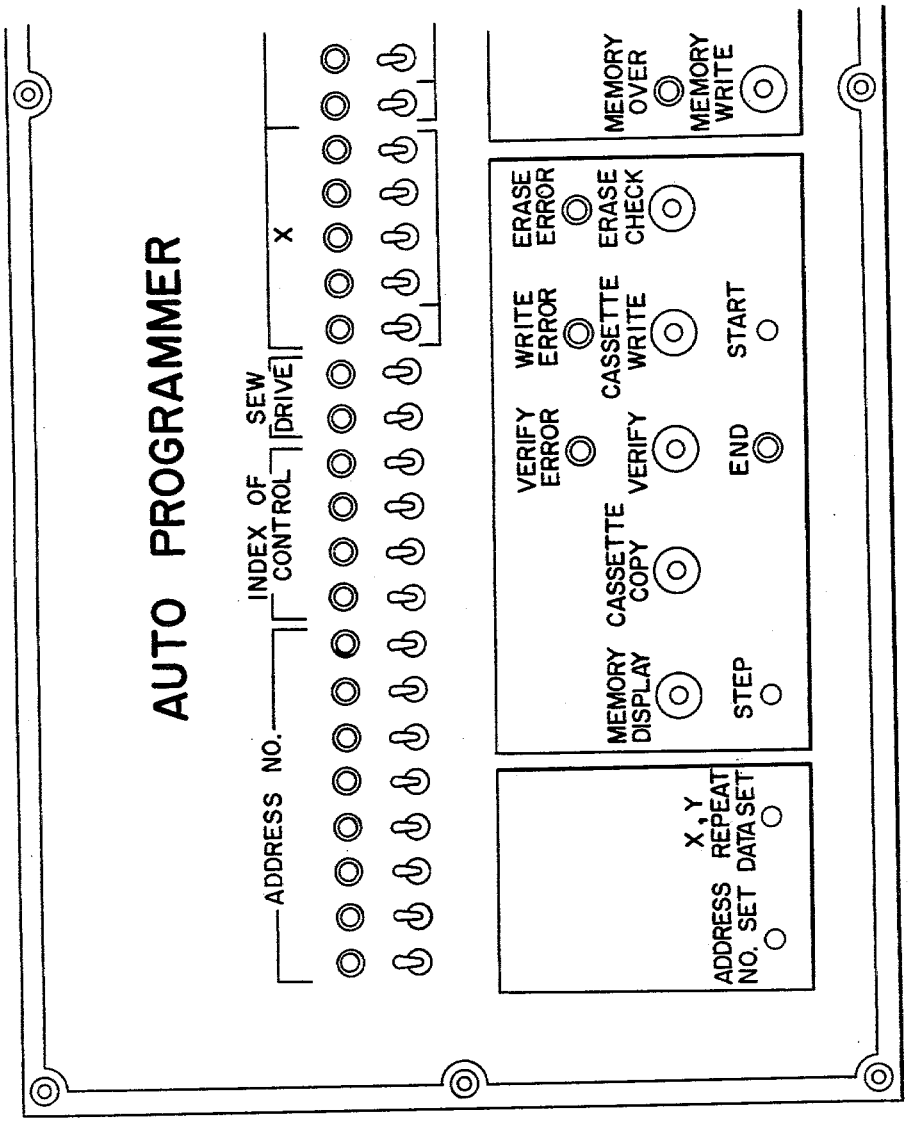
FIGS. 31a and 31b, when combined, show the front side of the program operation panel unit.
Figure 31B:
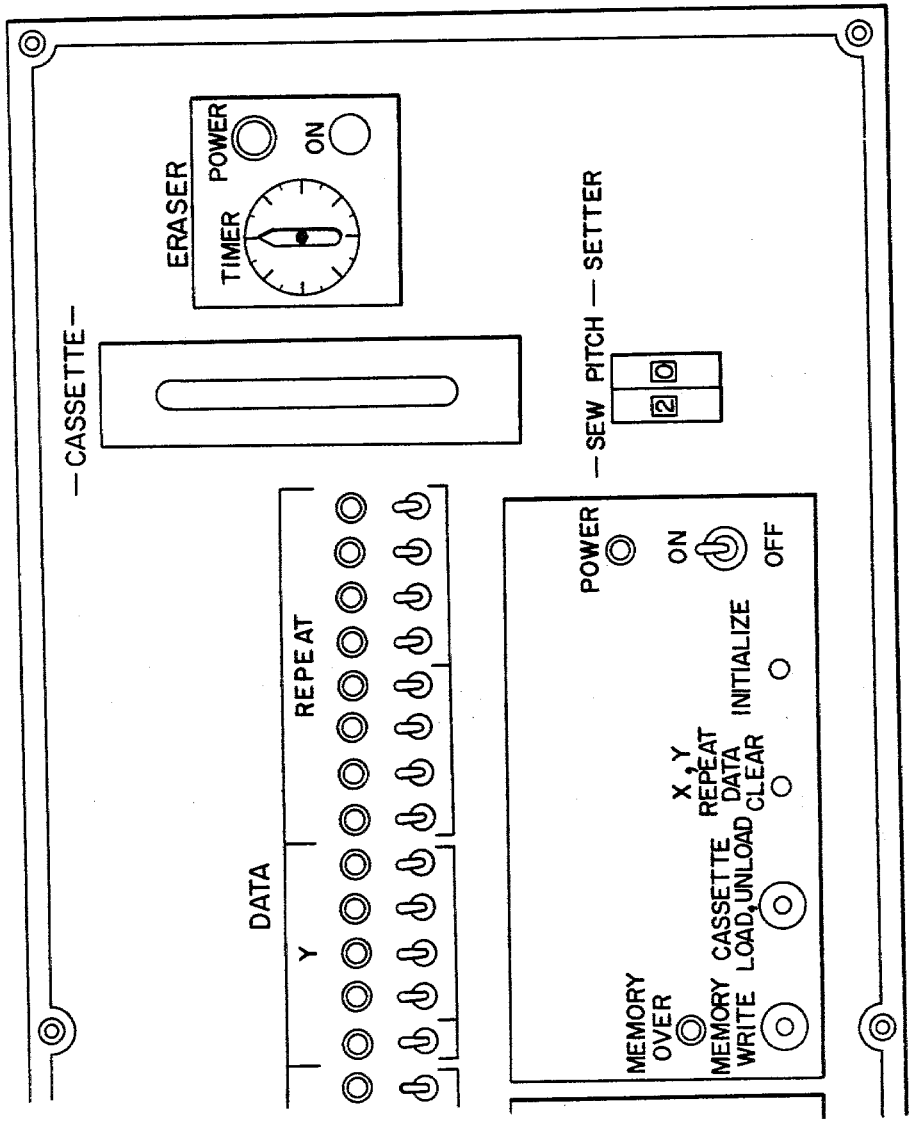

FIGS. 31a and 31b, when combined, show the front view of the program operation panel unit 406 shown in FIG. 24. At the upper portion of the panel are disposed lamps and snap switches for address numbers, for the index of control, sewing machine drive, for directions X and Y, and for the repeat number. 24 lamps and 24 snap switches correspond to the outputs bit data D11 through D38 of the PROM shown in FIG. 16.

Various push buttons and display lamps for the programmed operation are disposed on the lower portion of the panel. To the extreme left is located an address number set push button. When this button is depressed after turning ON a snap switch corresponding to an address number, respective bits are set in a region of RAM 420 (FIG. 25) for storing the address, provided that a "memory write" push button has already been closed. To the right of address number set push button is provided a push button for setting the data regarding X, Y and "repeat".

A step push button is provided to advance the address by one, and a memory display push button is used to display the contents of the RAM 420 by a lamp on the upper portion of the panel. Thus, the contents of the RAM can be sequentially displayed by depressing the step push button. A cassette push button is used to transfer the contents of PROM inserted into the righthand portion of the panel to RAM 420.

A "verify push button" is utilized to check the contents of the PROM and RAM 420 at each address when the start button is depressed. Where an error is found the check is stopped and a verify error lamp is caused to flicker, and the address at this time is displayed by a corresponding lamp located on the upper portion of the panel.

A "cassette write push button" is used to write the content of RAM 420 into the PROM. A "write error lamp" is lit when the content of the PROM written therein at an address is different from the content of PROM 429 and write operation is started by the start push button. In the same manner, an "erase check push button" is used to check whether the erasure of the content of the PROM has been completed or not and such check operation is also started by the start push button. If the erasure is imperfect, an "erase error lamp" is lighted. A "memory over lamp" is lighted when the last address is reached when the writing into the RAM 260 is performed sequentially. A "cassette loading and unloading push button" is depressed when the PROM is inserted or removed from the cassette opening and a "X,Y, repeat data clear push button" is provided to clear the data in RAM 420. An "initializing push button" is provided to clear the contents of the central processing unit, and RAM 420 and 411 and to set necessary initial values.

At the right upper corner of the panel is provided an "eraser" including a timer which is set to light the PROM loaded in the cassette opening after a predetermined time thus erasing the content of the PROM. A "sew pitch setter" is provided beneath the cassette opening for setting the sew pitch of the needle by thumb wheel switches.

In the system shown in FIGS. 24 and 25, the program operation panel unit 406 is connected to the control device through a connector 403, so that the program operation panel unit 406 must be integral with the whole sewing machine including the control device 401, sewing machine 405, and the operation panel unit 402.

Figure 32:
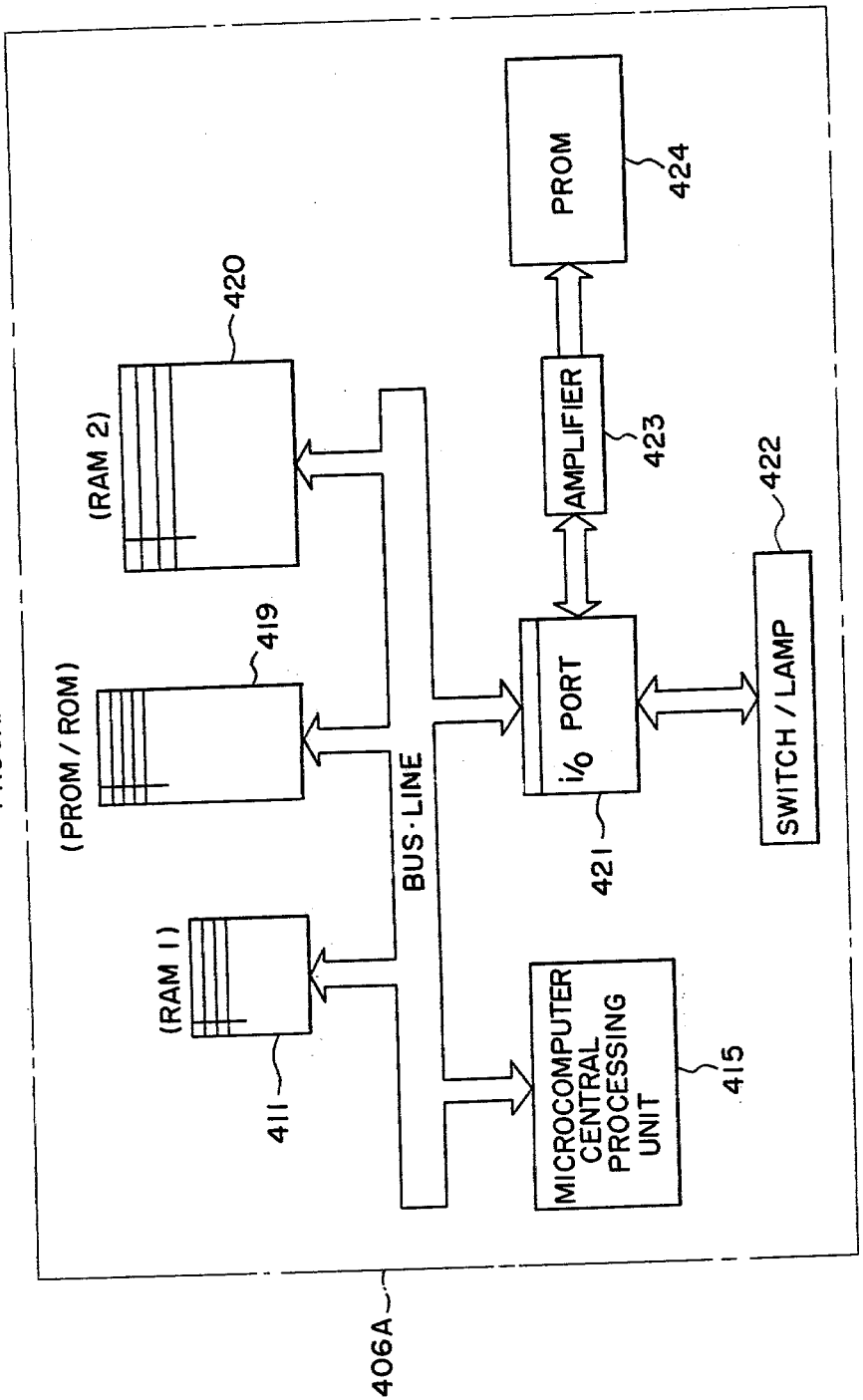
FIG. 32 is a block diagram showing the connection of the program operation panel unit.

In a modified program operation panel unit 406A shown in FIG. 32, a RAM 411 and a central processing unit (CPU) 415 are added. With this modified panel unit it becomes possible to write the data in the PROM. In this case it is necessary to provide pulse generating means for determining the amount of movement effected by pulse motors and the joy stick and means corresponding to indices.

IX Process of Programming PROM and Process of Cutting Stitch Groove (FIGS. 34-48)

FIGS. 33, 34-1 to 34-3 are flow charts showing the content of the program memory 419 utilized to store the sequence and data regarding the sewing operation in the PROM 424 shown in FIG. 25.

The sequence of storing the data in PROM 424 will now be described with reference to the flow charts. In the following description, reference is made to FIGS. 28 and 29 wherein the pattern to be sewed is the collar of a shirt, FIGS. 31 and 25 showing the program panel unit, and FIG. 20 showing the content of the PROM storing the pattern of the collar.

In FIG. 33, an initializing routine is executed when the power source is turned ON or when the initializing switch is turned ON after the power source has been turned ON.

As shown at the bottom of FIG. 33, the initializing routine comprises a first step ST1 at which RAM2(FIG. 25) is cleared, a second step ST2 at which the register of the CPU is cleared, a third step ST3 at which external apparatus are cleared and a fourth a stop ST4 at which the value is initialized. Upon initialization, a scanning routine is executed as shown by a thick arrow.

FIGS. 34-1 and 34-2 show various steps of the scanning routine. At the first step ST1, the states of all switches of the program panel unit, and the states (bit) of all signals regarding the sewing machine are set in the RAM1 (FIG. 25) acting as a data memory device. Among various switches on the program panel for displaying the memory content ("memory display"), cassette content transfer, check, cassette writing and erasure confirmation, only the bit of a switch operated at the last is turned to "1".

When a cassette loading and unloading switch is operated all other switches described above are opened. When the switches for displaying the content of the memory device and for writing the data in the memory device, the bit of the casette loading and unloading switch is also turned to "1".

At the second step ST2, a lamp on the panel is lighted when a corresponding bit is "1".

At the third step ST3, a judgment is made whether the bit of a region corresponding to the address number set switch SW is "1" or not. If YES, at step ST4, respective 8 bits representing the state of the address set switch are transferred to the region that constitutes the address counter of RAM1. At step ST5, the bit="1" of the address number set switch is cleared and then the sequence is returned to scanning. If NO at step ST3, judgement is made at step 6 to determine whether the bit of the memory content display switch is "1" or not. If YES, the contents of the address counter of RAM1 are sequentially displayed at steps ST7 through ST11 provided that the step switch bit="1". At step 11, the bit ="1" of the step switch is cleared thus returning to the scanning.

If NO at step ST6 judgment is made at step ST12 whether the bit of the "cassette copy switch is "1" or not. On the other hand, if YES, and when the bit of the start switch is "1", the content of PROM at addresses 0 through the last are written in RAM2 at step ST14. Steps ST13, ST14, ST15 and ST16 are used to transfer the programmed content of PROM to RAM2 for the purpose of check. At steps ST17-ST24, the coincidences between the content of PROM and the content of RAM2 are checked.

When the result of judgment at step ST17 is NO, writing is made for erased PROM at step ST25. Writing of the cassette is made when all data are written in the PROM after all data regarding the sewing pattern have been written in RAM 2. Steps ST28, ST30 and St31 are executed at each address. At steps ST26 through ST32 steps for advancing the address by one are not shown.

When the result of judgment at step ST33 shown in FIG. 34-2 is YES, the confirmation of the erasure of PROM effected by the eraser (FIG. 31) is made at steps ST34 through ST39. When the result of the judging at step ST40 is YES the data are written in RAM2. Steps ST41 through ST63 except steps ST49 and ST50 directly correspond to the programmed operation of the patterns shown in FIGS. 28 and 29.

There are two regions in RAM1 for storing X and Y data. These regions are designated as NEW and OLD counters respectively.

At step ST42, the X and Y axes data which have been stored in a counter of RAM1 are set in a new counter corresponding to the switch state.

When the bit of data in switch is judged to be "1" the step is advanced to step ST51.

Although with reference to step ST42, it was described that the X, Y data of ROM1 are set in a new counter corresponding to the switch state in the normal program operation, with regard to X and Y data, instead of the state of the switch, the number of pulses given by the joy stick is stored in the RAM1 as shown in FIG. 30, and the operation number data is determined in a manner described hereinafter. (refer to steps ST52, ST54, ST55 -ST58). At step ST51, with regard to X and Y data, the contents of the new and old counters are compared with each other and when they coincide with each other, judgment is made whether new and old data D11-D14, D15 and D16 stored in the RAM1 coincide or not, and when they coincide with each other the count of the operation number counter of RAM1 is increased by one.

When the result of step ST51 is NO or the result of step ST52 is NO, at step ST53, whether the new X, Y data consist of more than 4 bits or not is checked. When the result of check is YES, the operation is advanced through steps ST55-St58 and when the result of step ST58 is NO, steps ST59 through step ST61 are executed.

At step ST62, one is set in the operation number counter of RAM1 and at step ST63, the bit of a data-in switch is cleared.

The processings at steps ST51 through ST63 can be summerized as follows. After moving the magnifying lens 363 from start point P1 to Point P2 (FIG. 29) by manipulating the joy stick 362, the X, Y data of $\overline{P1.P2}$ are stored in the old counter and then the center of the magnifying lens 363 is moved to point P3.(it is assumed now that the sewing pitch and the sewing direction between points P2 and P3 are the same as those between points. P1 and P2, see address 4 shown in FIG. 32). The distance $\overline{P2.P3}$ between point P2 and P3 requires 14 stitches ($\overline{P2.P3}=\overline{P1.P2}$) so that X or Y data exceeds 4 bits (15 pulses).

Consequently, when the result of step ST53 is YES, the step is advanced to step ST55. Furthermore, the result of step ST51 becomes NO when the magnifying lens 363 is moved from point P3 to point P4, for example. At this time, the result of judgment made at step ST53 becomes NO and the data of the previous step are transferred to RAM2 from RAM1 at step ST59. At step ST60, one is added to the count of the address counter of RAM1.

At step ST61, the data D11–D14 (index of control), D17–D23 (X data) and D24–D28 (Y data) are transferred to the old region of RAM 1.

Even when the new and old X and Y data are judged to be equal at step ST51, when the new and old data D11–D14, D15 and D16 are judged to be not equal at step ST52, the step is advanced to step ST53 and the address is advanced by one. When new and old data are judged to be equal at step ST52 one is added to the count of the operation number counter of RAM1. Step ST52 is advanced to step ST54 when respective points can be thought to lie on the same straight line under the same sewing pitch at the time of storing the positions of few adjacent points (stitch positions), for example when the sewing pattern takes the form of a large circular arc.

FIG. 34-3 is a flow chart showing the process wherein input pulses $\overline{XPP}$ $\overline{XMP}$ $\overline{YPP}$ $\overline{YMP}$ representing the position of the magnifying lens 363 and checked by limit switches are successively applied to the pulse motors and algebraically added by the new counter of RAM1.

As above described, by merely aligning the magnifying lens 363 with points P1, P2 or P3 the X, Y operation number data of respective addresses are stored as in RAM2.

With regard to the bits D11–D14 representing the index of control, it is necessary to set snap switches on the control panel for respective addresses. However, with the pattern shown in FIG. 29, these bits at addresses 3-8 are all "0000". Where the sewing curve is straight as between points P1 and P4, it is only necessary to align position of the megnifying lens at the start point P1 and the end point P4. Then, the X, Y and operation number data for each address between points P1 and P3 are automatically stored in RAM2 at stitch pitches designated by the thumb wheel switch panel (see FIG. 31) while the other addresses are assigned to the stitch points between points P3 and P4.

Addresses 4 and 5 shown in FIG. 20 are automatically programmed by the process described above.

FIGS. 35 through 39, are detailed flow charts showing the instructions provided by the program memory 412 shown in FIG. 25 for sewing the cloth and for cutting the stitch groove through the cloth clamping plate by using the data in a PROM (PROM 416 shown in FIG. 25) prepared by the programming operation described with reference to FIGS. 33 and 34. As above described, to perform a sewing operation or a cutting operation in accordance with the data in the PROM, the transfer switch 418 shown in FIG. 25 is thrown to contact a to enable gate circuit 413 to render operative memory device 47 and to disenable gate circuit 417 to render inoperative the connector 403, and program panel unit 406.

In FIG. 35 when power is ON or after connecting the power when the initializing push button (FIG. 26) is depressed, an initializing routine is started and then a scanning routine is scanned.

In the initializing routine instructions are executed at steps ST1 through ST4. At step St1 in the scanning routine, bits of respective switches shown in FIGS. 26 and 27 and bits of sequence signals of the sewing machine (that is ON and OFF of the foot switch or the start switch) are written in RAM1. At step 2, a judgment is made as to whether the bits of the stop switch and the limit switch of RAM1 are "1" or not. If the result is YES, the step is advanced to step 3 of stop routine whereas when the result is NO, judgment is made at step 4 as to whether the bit of the automatic switch of RAM1 is "1" or not. When the result of step 2 is NO, at step 4 judgment is made as to whether the bit of automatic switch of RAM1 is "1" or not. According to the results NO and YES, the process is divided into the manual routine and the automatic routine respectively and the process is returned to scanning after executing steps 3, 5 and 6.

Figure 36A:
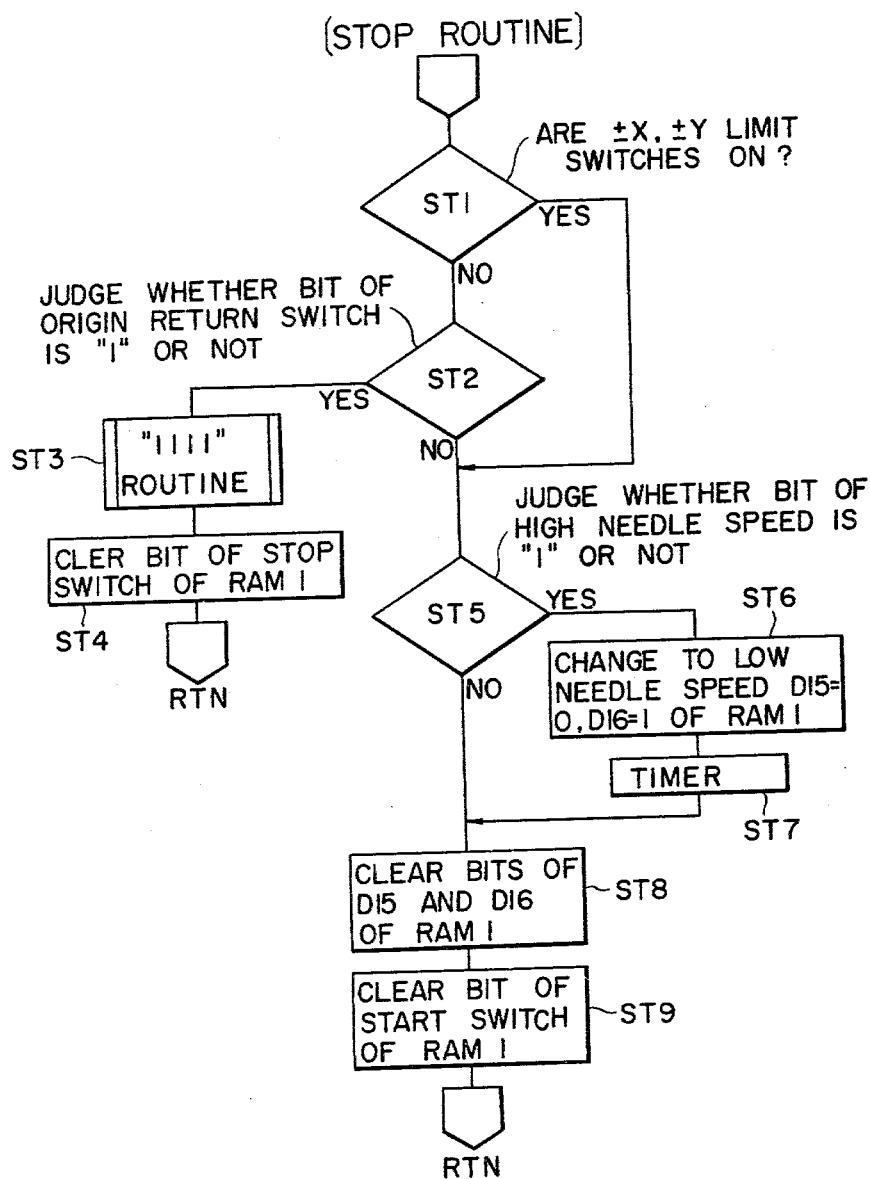
Figure 36B:
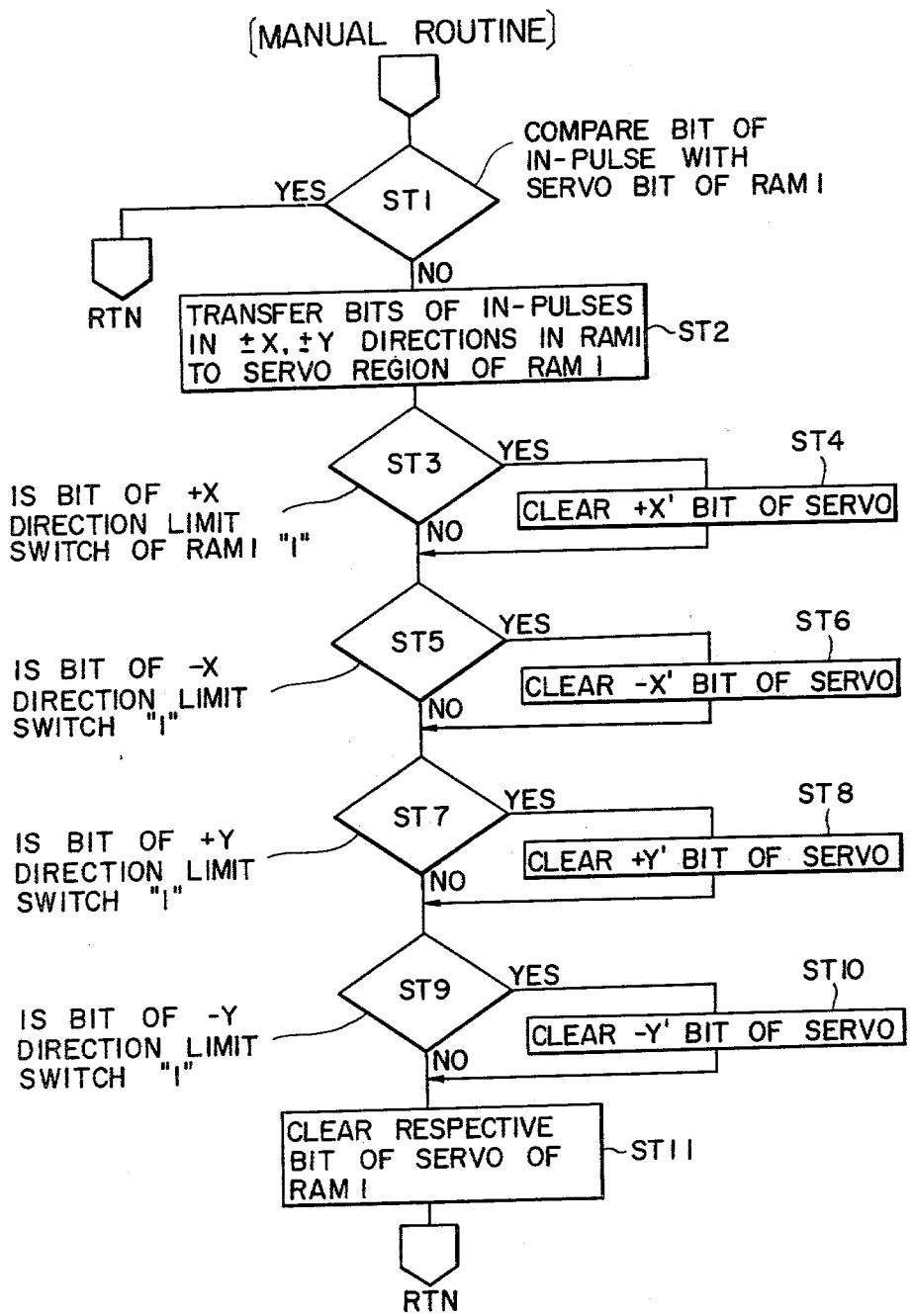
Figure 36C:
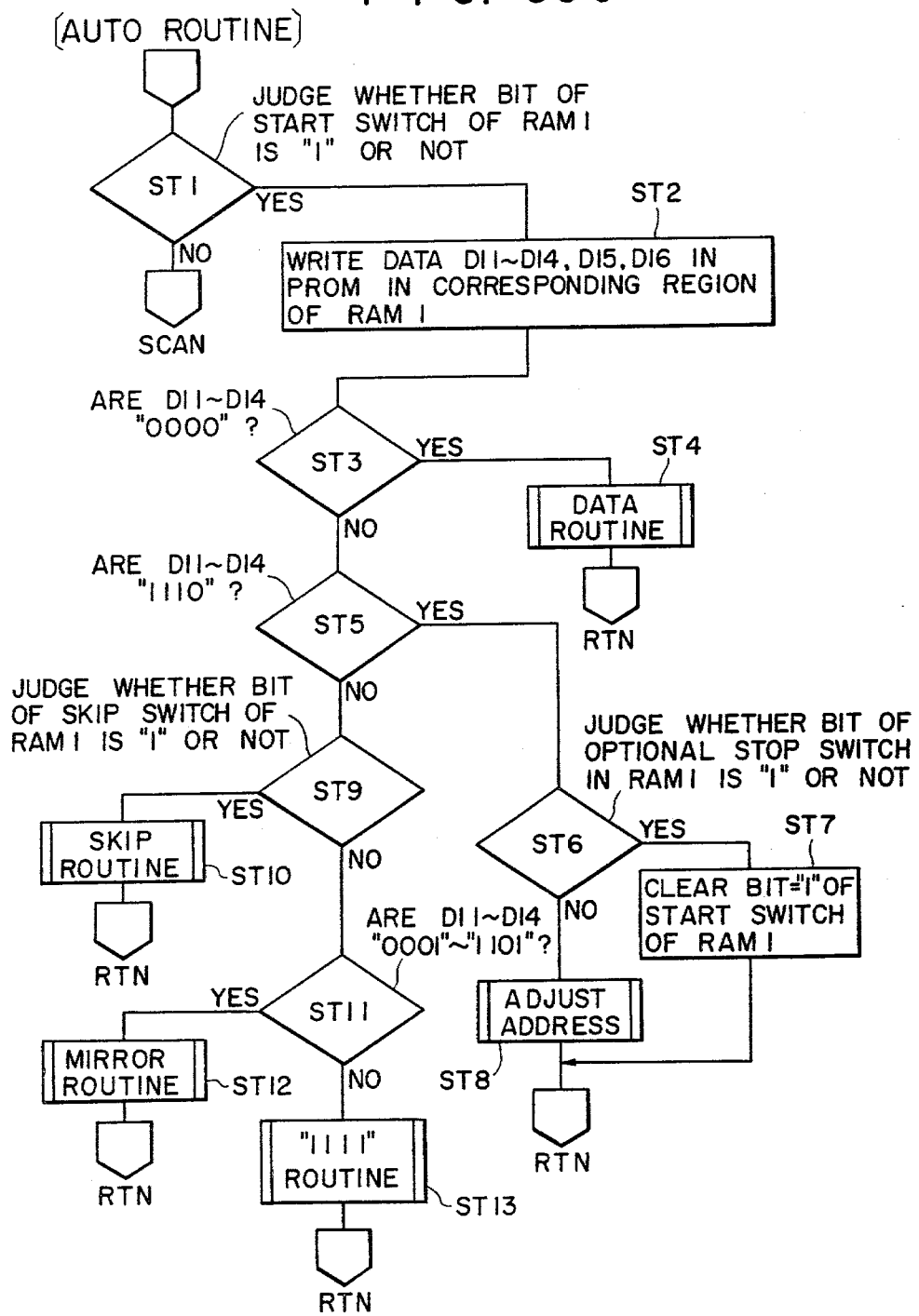

FIGS. 36a, 36b and 36c show details of the stop routine, the manual routine and automatic routine respectively. At step 1 of the stop routine shown in FIG. 36a, judgment is made as to whether the ±X, ±Y limit switches are ON or not. When these switches are ON, at step 5 judgment is made as to whether the bit of high needle speed (vertical movement) at address D15 is "1" or not. When D5="1", at step 6 the needle speed is changed to low (D15="0", D16="1"). After a predetermined time later determined by a timer at step 7 the bits at addresses D15 and D16 of RAM1 are cleared at step 8 so as to stop the vertical motion of the needle.

Then the step is advanced to step 9 to clear the bit of start switch of RAM1. The term "advance" means that a specific process step of the program is designated.

When the result of step 1 is NO, at step 2 judgment is made as to whether the bit of the origin return switch is "1" or not and when the result is YES, the step is advanced to step 3 for executing "1111" routine or the stop code routine. Upon completion of this routine, the step is advanced to step 4 to clear the bit of stop switch of RAM1. When the result of step 2 is NO, the step is advanced to step 5. Thereafter the step is advanced to step 9 in the same manner as above described and then advanced to RTN (return), in this case scanning. Even when instructions up to the step 9 of the stop routine have been executed X and Y axis movements are not stopped. This problem can be solved by the following two ways.

The first case corresponds to a case in which the control is shifted to the stop routine under manual operation. In this case as shown by steps 4, 6, 8 and 10 of the manual routine shown in FIG. 36b, the servo bits of respective axis directions are cleared so as to prevent the axial movement. The second case corresponds to a case in which the control is shifted to the stop routine under automatic operation. In this case, at step 1 of the auto routine shown in FIG. 1 judgment is made as to whether the bit of the start switch of RAM1 is "1" or not. If the result is YES, the clamping plate would not be moved more than 3 mm (15 pulses) at the maximum in each direction (15 pulses×0.2 =3 mm). For this reason, the position of the limit switch is set such that even when the clamping plate is moved 3 mm at a maximum when the start switch is closed, the clamping plate would not be damaged.

The manual routine shown in FIG. 36b will now be described. For the manual operation, ±X and ±Y pulses $\overline{XPP}$, $\overline{XMP}$, $\overline{YPP}$ and $\overline{YMP}$ are generated by the joy stick 362 (FIG. 28) in the same manner as in the programming operation. These four type pulses are stored in the in-pulse region of RAM1. At step 1, the bit of each in-pulse is compared with each servo bit of RAM1. When the result of step 2 is NO, (at least the bit of one of the pulses $\overline{XPP}$, $\overline{XMP}$, $\overline{YPP}$ and $\overline{YMP}$ is "1"), the bits of in-pulses in ±X and ±Y directions in RAM1 are transferred to the servo region of RAM1 and the ON state of the limit switches are checked at steps 3, 5, 7 and 9. When the limit switches are ON state the respective bits of the servo of RM1 are cleared at step 11 thereby preventing drive of pulse motors.

The automatic routine shown in FIG. 36c will now be described. At step 1 judgment is made as to whether the bit of the start switch of RAM1 is "1" or not as above described. When the result is YES the step is advanced to step 2 in which data D11-D14, D15 and D16 stored in PROM are written in corresponding regions of RAM1. Then at step 3 judgment is made as to whether data D11-D14 are data code "0000" or not. If the result is YES the step is advanced to step ST4 or the data routine. On the other hand, if the result is NO, at step 5 the optional stop code is checked. When the result is YES, the step is advanced to step 6 at which the bit of the optional stop switch stored in RAM1 is checked. When the result is YES the bit="1" of the start switch is cleared at stop 7 so as to switch the control to the manual operation (FIG. 26), thus executing the manual routine.

When the result at step 6 is NO, the address is adjusted at step 8 to go to RTN (return). When the result at step ST5 is NO, the bit of the skip switch of RAM1 (where a plurality of same patterns on the same cloth clamping plate are used for sewing or where such patterns are cut) is checked at step 9. When the result of check is YES the step is advanced to step 10, that is the skip routine. On the other hand, when the result is NO, judgment is made as to whether data 11-D14 are "0001" "1101" or not at step 11. When the result is YES, the control is advanced to the mirror routine (step 12). If the result is NO, D11-D14 represent the stop code "1111" so that the control is advanced to a "1111" routine. Alternatively, at step 11, the bit of the mirror snap switch shown in FIG. 26 may be checked.

FIGS. 37a and 37b show the address adjusting routine, the mirror routine and the "1111" routine which constitute a subroutine utilized in the automatic routine. At step 1 of the address adjusting routine judgment is made as to whether the mirror bit of RAM1 is "1" or not. The mirror bit becomes "1" by reversing the addresses of PROM when data D11-D14 coincide with the mirror code set by the thumb switch shown in FIG. 26 so as to read the addresses downwardly or in the opposite direction. Accordingly, when the result of step 1 is YES, the count of the address counter of RAM1 is decreased at step 2. If the result is NO, the count of the address counter is increased at step 3.

At step 1 of the mirror routine, data D11-D14 and the mirror code set value (the mirror code set by the thumb wheel switch) are compared with each other, and when a coincidence is obtained the mirror bit is made to be "1" at step 2. If the result of step 1 is NO the control is advanced to the address adjusting routine (step 3).

At step 1 of the "1111" routine it is made that D15=D16="0" that is the needle is stopped at the upper dead center so as to prevent sewing or cutting. (This step 1 corresponds to steps 5-8 of the stop routine shown in FIG. 36). At step 2, the bit of the start switch is cleared and at step 3 judgment is made as to whether the counts of X, Y absolute counters of RAM1 are "0" or not. When the counts are "0", the speed of RAM1 is cleared or initialized. When the result is NO the control is advanced to step 11 through steps 5 to 10 until the counts of the X, Y absolute counters become "0". At steps 7 through 10 pulses are generated and their width is set to a value to which the pulse motors can respond. At step 11 the generation of the next pulse is delayed by a timer to a frequency range to which the X,Y pulse motors can respond.

Figure 38A:
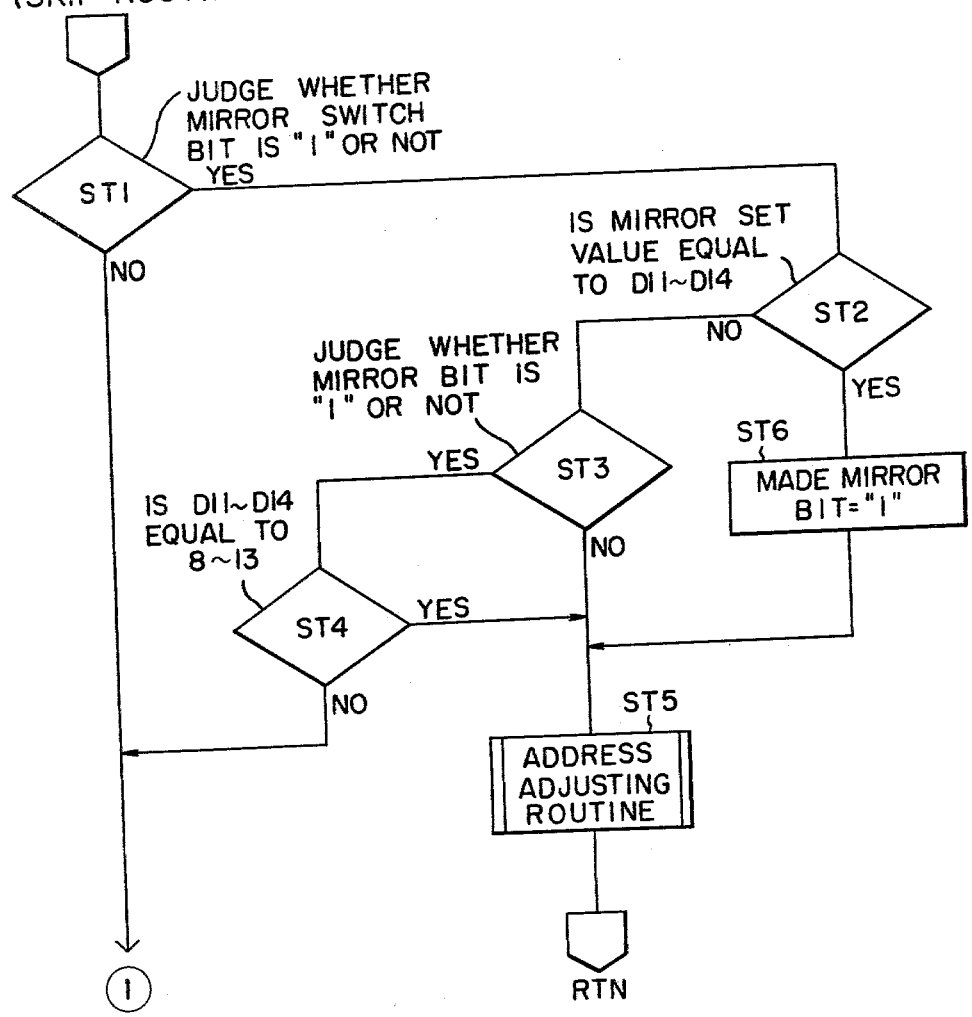
FIG. 38 is a flow chart showing the detail of the skip subroutine shown in FIG. 37a and 37b.
Figure 38B:
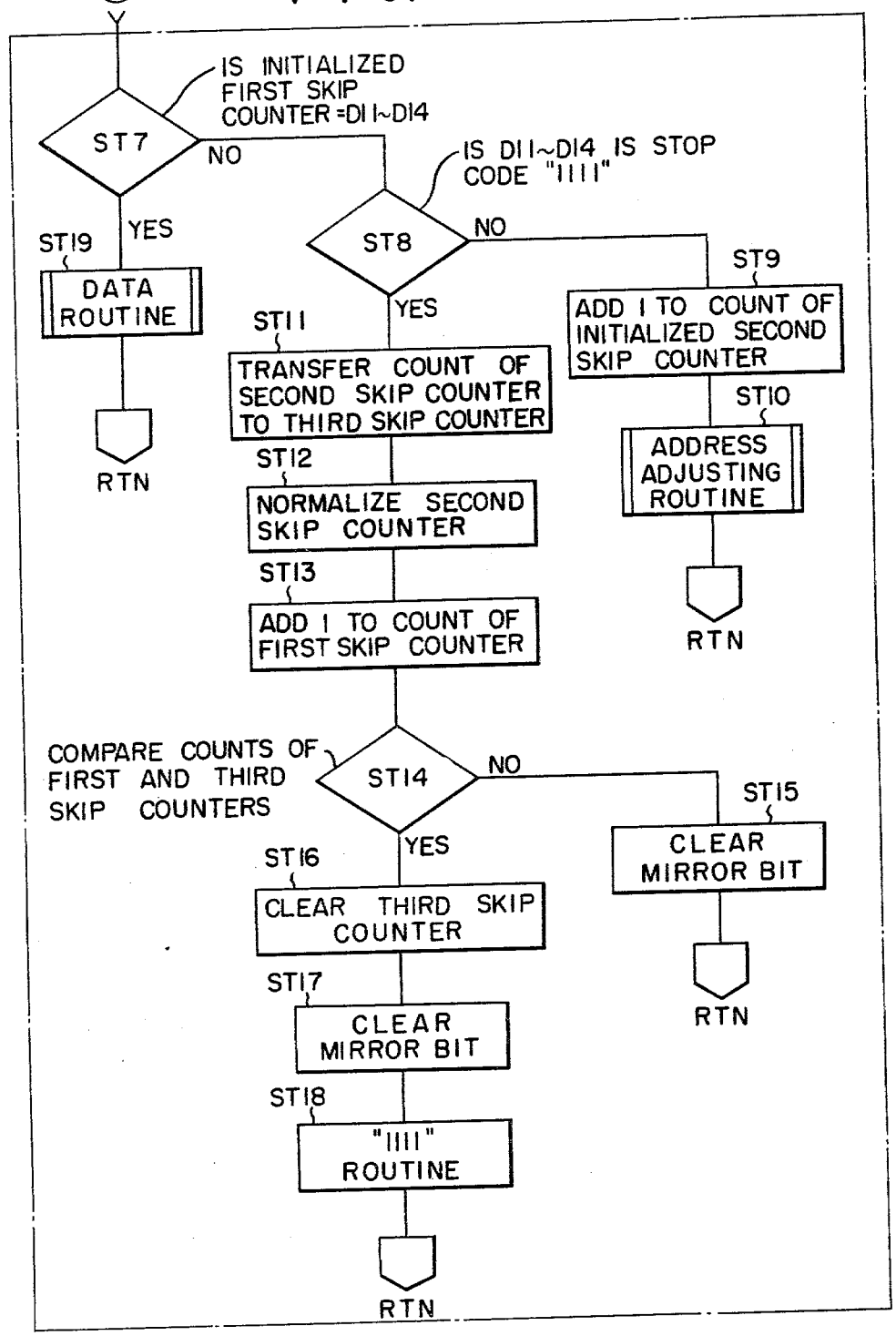

FIG. 38 shows a skip routine. At step 1 judgment is made as to whether the bit of the mirror snap switch (FIG. 26) is "1" or not. When the result is YES, the control is advanced to steps 2-5. YES means a case in which a plurality of patterns are formed on the same clamping plate and these patterns utilize mirror codes. At step 2, the mirror code set by the thumb switch shown in FIG. 26 that is the mirror set value is compared with data D11-D14 representing the index of control. When the result is YES, the mirror bit is made to "1" at step 6 and then the address is adjusted, in this case reversed. If the result of step 2 is NO judgment is made at step 3 as to whether the mirror bit is "1" or not. When the result of step is NO, the control is advanced to step 5 for executing the address adjusting routine.

When the result of step 3 is YES, at step 4 judgment is made as to whether the value of D11-D14 at addresses representing the index of control stored in RAM1 is equal to 8-13 or not. When the result of step 4 is YES the control is advanced to step 5 whereas when the result is NO the control is advanced to step 7. Of 1-13 mirror set values set by the thumb wheel switch shown in FIG. 26, 1-7 are used as the skip codes and 8-13 as the mirror codes (where a plurality of patterns are formed on the same clamping plate, all values of 1 through 13 are used as mirror codes) so that YES at step 4 means that the value of D11-D14 corresponds to one of the mirror codes 8-13, but this value is not a mirro set value. Moreover, since the control is advanced to step 4 when the result of step 3 is YES, the address is advanced. NO of step 4 means that D11-D14 are advanced addresses and that this state corresponds to one of the skip codes 1-7. NO of step 1 means a case in which a plurality of patterns are formed on the same clamping plate and when the patterns are the same, mirror codes are not used. This case corresponds to a case wherein addresses are 13-18 as shown in the table of FIGS. 22a, 22b.

The process of steps 7 to 18 means the following.
1. To check the number of skip codes used.
2. To select and sequentially designate one of said plurality of skip codes. Where one of several identical patterns is sewed and the needle is then moved to the start point.
3. Even when one pattern is sewed and its stop code is designated, until all identical patterns have been sewed, that is until all stop codes are designated the control should be returned to the first sewing address that is the address designated by the address set switch without transferring to the "111" routine when a stop code is read.

To this end RAM1 is provided with memory regions corresponding to the first to third skip counters. At first, the first and second skip counters are initialized and their counts are 1 respectively. The data D11-D14 up to step 7 are 1-7 ("0001"-"01111") or "1111".

At step 7, the data D11-D14 is compared with the content of the first skip counter. When D11-D14 is "1", the result is YES and the data routine (see FIG. 39a) is executed at step 9. Thus, the data regarding X, Y directions and the operation number of the skip code and data D15 and D16 are read out and executed. This corresponds to D11-D14="0001" at address 13 shown in FIG. 22.

When the result at step 7 is NO, judgment is made at step 7 as to whether D11-D14 is a stop code or not. When the result at step 8 is NO, at step 9, 1 is added to the count of the initialized second skip counter and the address is adjusted (advanced or reversed) at step 10. The process is advanced in this manner up to addresses 14-17 shown in FIG. 22. When address 17 is reached, the content of the second skip counter becomes 5 which is the same as the number of the skip codes. Since D11-D14="1111" the result of step 8 is YES and at step 11 the count (5) of the second skip counter is transferred to the third skip counter. Then at step 12 the count (5) of the second skip counter is normalized so as to set its count to 1. At step 13, 1 is added to the count of the first skip counter so as to prepare the value of the second skip (from point Q6 to point Q7) shown in FIG. 21 so that the result at step 7 would become YES when D11-D14 corresponds to the second skip code (address 14). Then the process is advanced to step 14 where counts of the first and second skip counters are compared. Since the count of the first skip counter is 1 and the counts of the third skip counter is 5, the result is NO. Accordingly, at step 15 the first skip counter is cleared when the mirror bit is "1". When the process is returned to step 1 of the automatic routine shown in FIG. 36, address is returned to address 1 (FIG. 22) designated by the 8 bits the address set switch so that the same pattern is sewed again.

In this manner, the skip codes shown in FIG. 22 are sequentially designated until the result of step 14 (FIG. 38) becomes YES. When the result of step 14 is YES, the count of the third skip counter is cleared at step 16. When the mirror bit="1" at step 17, it is cleared and the "1111" routine is executed at step 18. In this manner a plurality of identical patterns are sewed.

Where both skip codes and mirror codes are used as shown in FIG. 23, one of the skip codes is transferred to the data routine at step 19 (FIG. 38) at the address down state and under these conditions mirror bit="1" so that the mirror bit is cleared at steps 15 and 17. In FIG. 23 when address is advanced, even when a skip code presents, since the address is advanced through steps 2, 3 and 5 as shown in FIG. 38, the process would not be transferred to steps 7 and 19.

Figure 39A:
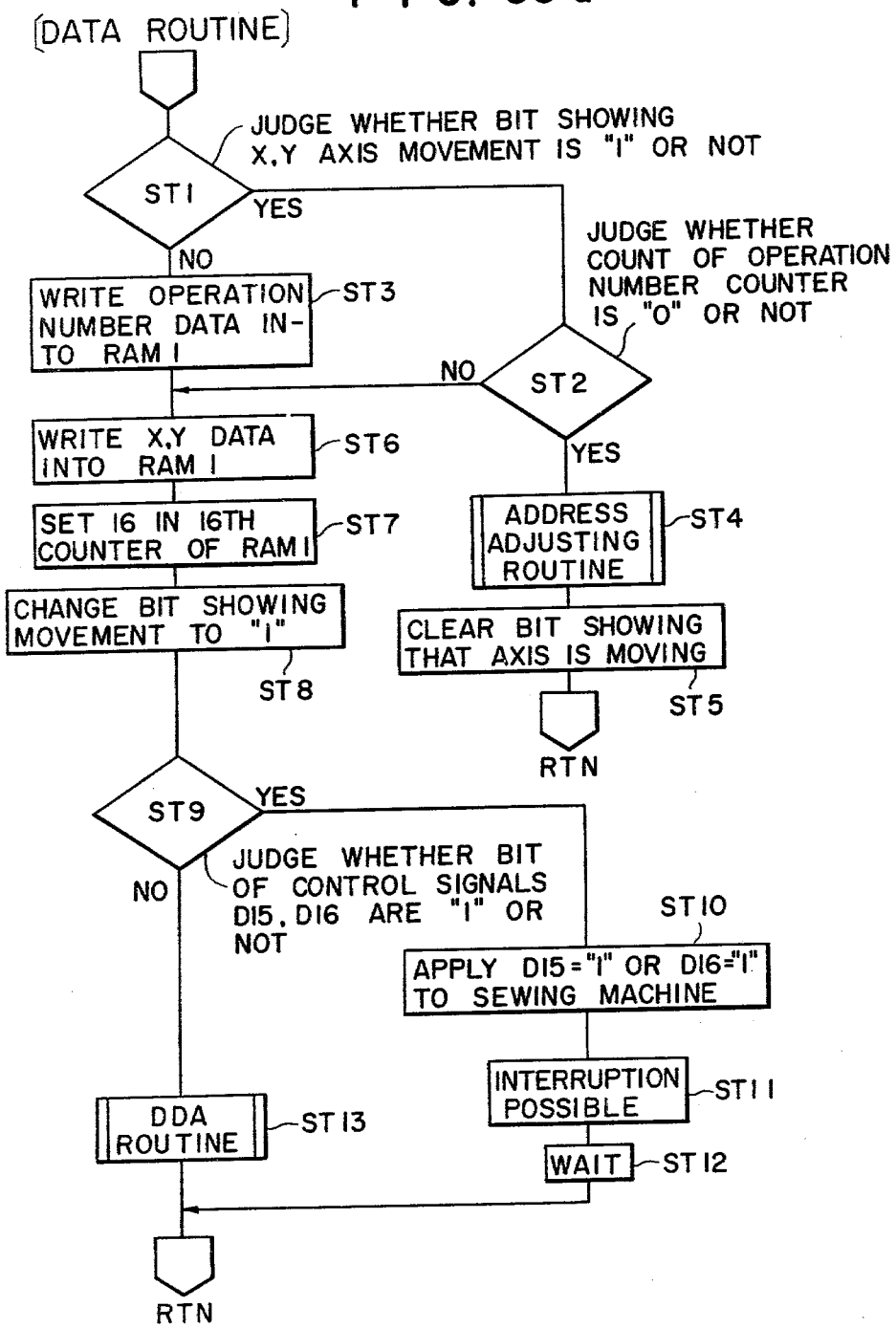

FIGS. 39a and 39b show a data routine and DDA thereof respectively.

At step 1 of the data routine, judgment is made as to whether a bit showing X, Y axis movement is "1" or not. When the result is YES, at step 2 judgment is made as to whether the count of the operation number counter is "0" or not. When the result is NO, the process is transferred to step 6 whereas when it is YES, at step 4 the address is adjusted and bit="1" showing movement is cleared. If the result of step 1 is NO, operation number data are written into RAM1. Then at step 6, X, Y data are also written and at step 7, 16 is set into 16th counter of RAM1. Then the bit showing the movement is changed to "1". At step 9 judgment is made as to whether bits of control signals D15 and D16 are "1" or not.

If the result of step 9 is NO, the DDA routine is executed at step 13 while maintaining the needle at the upper dead center (in the case of groove cutting, the tool is withdrawn from the groove) thus moving the clamping plate. In this case, the cloth clamping plate is moved smoothly, not intermittently as in the case of sewing. When the result of step 9 is YES, a bit D15="1" or D16="1" (designating high speed or low speed stitch) is given to the sewing machine at step 10. Step 11 shows an interruption possible state. Even when interruption is possible, when the stitch detection signal $\overline{TS}$="0" (this signal is applied to the input of address condition gate circuit 310 shown in FIG. 17 immediately after withdrawal of the needle from the cloth, and the cloth is moved to the next stitch position after this signal $\overline{TS}$="0" has been applied) is applied interruption is made possible. At step 12 the step of the program is held at a waiting state.

Turning now to DDA (interrupt/subroutine call) shown in FIG. 39b, at step 1 respective X, Y integrands and remainders stored in RAM1 are added. At step 2 judgment is made as to whether the mirror bit of RAM1 is "1" or not. If the result is YES, the sign bit of Y axis is reversed at step 3 (this corresponds to the operations of the up-down condition gate circuit 306 and the exclusive OR gate circuit 333 shown in FIG. 17). When the result of step 2 is NO, at step 4 judgment is made as to whether the sign bits of X, Y axes are "1" or not. When the result of step 4 is YES, that is where a negative sign presents, at step 5, in response to an overflow caused by the addition at step 1, a corresponding servo bit (−X or −Y) of RAM1 is changed to "1". Then at step 6, the count of the X or Y absolute counter of RAM1 is decreased by 1. When the result of step 4 is NO, +X or +Y bit of the servo of RAM1 is turned to "1" at step 7. Then at step 8, 1 is added to the count of X or Y absolute counter.

At step 9 respective servo bits are read out and these bits are cleared at step 10. The pulse width is determined by a timer at step 11, and the cleared servo bits="0" are read out at step 12, and at step 13 the count of 16th counter of RAM1 is reduced by 1. At step 14 judgment is made as to whether the count of 16th counter is "0" or not and when the result is YES, one DDA operation completes thus decreasing the count of the operation number counter by 1. When the result of step is NO, the DDA operation is repeated. At this time, at step 16 judgment is made as to whether sew switch bit is "1" or not. When the result of step 16 is NO, at step 17, the progress of the steps of the program is delayed by a timer until the pulse motors can respond to the overflow pulses given by DDA.

NO of step 16 means cutting so that the step is advanced to step 18 where the progress is delayed by a timer having a longer delay time than that of the timer used at step 17.

By the foregoing descriptions, the operations of the control circuits shown in FIGS. 17 and 18 which utilize a microcomputer and a method of programming a PROM are made clear. In the followings, some supplemental descriptions and modifications will be added.

1. With reference to steps 8 through 18 shown in FIG. 38, it is supposed that amounts of skips 1 of patterns D, E and I (FIG. 21) are the same, that pattern C is arranged at the same Y level as patterns A and B and that l=l'. Further it is assumed that the first skip from point Q3 to point Q4, the second skip from point Q6 to point Q7, the fourth skip from point Q10 to point Q11, and the fifth skip from point Q12 to point Q13 are shown by the first skip code, that the skip from point Q8 to point Q9 is shown by the second skip code, and that the skips from point Q10 to Q11 and from point Q12 to point Q13 are shown by the third skip code. In this case, it is necessary to use data showing the number of repetitions of each skip code.

Figure 40:
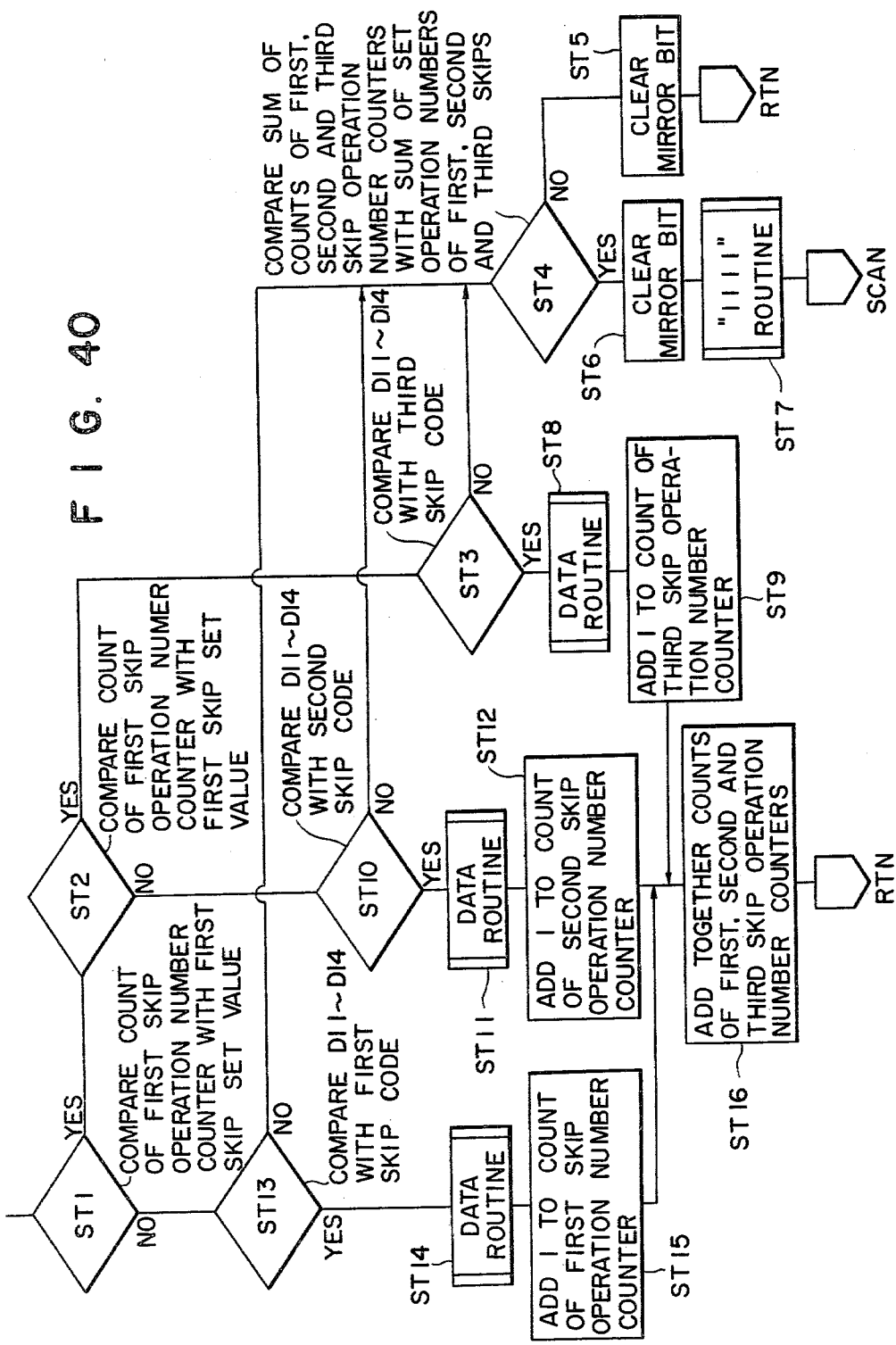
FIGS. 40a and 40b are flow charts showing a modification of the portions of the flow chart shown in FIG. 38 bounded by dot and dash lines.

FIG. 40 shows a generalized flow chart enabling this. However, only three types of the skip codes are shown, and this flow chart corresponds to the portions bounded by dot and dash lines in FIG. 38. Although not shown in the panel unit (FIG. 26), and in the flow chart shown in FIG. 40, it should be understood that there is a thumb wheel switch that sets the number of repetitions of the first skip code "0001". In the same manner, there are switches for setting the repetition number of the second and third skip codes.

At step 1 shown in FIG. 40, the repetition number set value of the first skip code of RAM1 is compared with the count of the operation number counter for the first skip. If the result is 40, at step 13, data D11–D14 are compared with the first skip code, and when the result is NO, the process is advanced to step 4 whereas when YES the data routine is executed at step 14.

At step 15, 1 is added to the count of the first skip operation number counter. When the result of step 1 is YES, at step 2, the count of the second skip operation number counter is compared with the second skip set value. When the result of step 2 is NO, D11–D14 are compared with the second skip code at step 10. If the result of step 10 is NO, the sum of the counts of the operation number counters of the first, second and third skips is compared with the sum of the operation number set values of the first, second and third skips at step 4. If the result of step 10 is YES, the data routine is executed at step 11 and then 1 is added to the count of the second skip operation number counter at step 12. In the same manner, if the result at step 2 is YES, D11–D14 is compared with the third skip code at step 3, and if the result of this step is YES, data routine is executed at step 8, and then 1 is added to the count of the third skip operation number counter at step 9. At step 16, the counts of the first, second and third skip operation number counters are added together. When the result of step 4 is NO, the mirror bit is cleared at step 5. On the other hand, when the result of step 4 is YES, the mirror bit is cleared at step 6 and the "1111" routine is executed at step 7. When the skip code is 4, a judging step corresponding to steps 1 and 2 is provided between steps 2 and 3. When the result of such additional step is YES, the step is advanced to step 4 for judging that whether D11–D14 are equal to the fourth skip code or not. By increasing the number of steps in this manner, it is possible to use skips of any number.

In the flow chart shown in FIG. 40, although the repeat numbers of the first to third skips were set by the thump wheel switch on the operation panel unit, it is possible to decrease 8 bits (D31–D38) of the operation number data to 6 bits and to represent them by binary numbers instead of BCD. For example, D31–D36 are used to represent the operation number data for representing a maximum of 63, and the remaining two bits D37 and D38 are used to represent the repeating number of the skip code (in this case, maximum 3). Then it becomes possible to set the number of repeating the skips in the PROM, thus eliminating the thumb wheel switch. Alternatively, the repeating number of the skip code may be set at D15 and D16.

2. Where the skip code is used to cut the stitch groove through the cloth clamping plate by using the data stored in PROM, it is necessary to withdraw the tool from the groove by manual operation. However, it is possible to produce a tool withdrawal instruction signal by using a signal D15=D16="0" and by adding a suitable mechanism for withdrawing the tool in response to this signal. Since in this embodiment a micro-computer system is used, before writing the content of RAM2 into PROM, it is possible to sew or cut the groove by using the content of RAM2, and if the result is satisfactory then the content is written in the PROM.

3. Although in FIG. 25, RAM1 (411) and RAM2 (420) were constructed independently, it is possible to combine them into a single RAM in which the addresses are used for different purposes. Program memory devices 412 and 419 can be combined similarly.

4. In the foregoing embodiment, the sign of Y data stored in the address subsequent to a mirror coincidence signal is reversed (refer to step 3 of DDA shown in FIG. 39) since respective sewing patterns are symmetrical with respect to a Y axis passing through a stitch point corresponding to a mirror code. Accordingly, if the pattern is symmetrical with respect to a X axis passing through the stitch point the sign of X data would be inverted. Furthermore, if the pattern is symmetrical with respect to a straight line Y=X, the signs of X and Y data should be exchanged. Generally speaking, if the pattern is symmetrical with respect to Y=ax, then not only the sign should be inverted but also the value of a should also considered.

5. In the embodiment shown in FIG. 28, at the time of the manual operation, pulse motor driving pulses are generated by the joy stick which is manually operated for programming the PROM and for positioning the clamping plate to the start point when sewing or cutting operation is to be made by using the programmed PROM (such positioning is necessary only for the first cycle where the pattern is sewed successively by using clamping plates provided with the same patterns) and by closing the optional stop switch. Instead of using such joy stick it is possible to construct the circuit such that one pulse is produced each time a push button switch is depressed. Alternatively, a combination of a joy stick and a push button switch may also be used.

6. In the illustrated embodiment, a cutting tool was mounted on the head of the sewing machine for cutting the stitch groove but an independent cutting tool head may be provided for the table to carry out the invention.

7. Although in FIG. 26 gate circuits 413 and 417 were provided for PROM 412 and bus line 412, it is not always necessary to construct such gate circuits as hardwares but it is possible to connect either one of the gate circuits with the bus line by designating a number specific thereto.

8. It is also possible to decrease the frequency of the pulses generated by the joy stick such that the operator can slowly move the stylus to effect position alignment.

Some of the component elements will be considered in more detail.

i. Operation number data of PROM

The PROM is provided with a region (D31–D38) for storing the operation number data.

Use of the operation number data is advantageous not only to save the addresses of the PROM but also to greatly decrease the number of steps of aligning the stylus for the purpose of programming the PROM. By combining the operation number data with a microcomputer system, it is possible to greatly simplify the programming operation. This is especially advantageous to sew a pattern constituted by a relatively large number of straight lines, such as a collar of a shirt.

Although use of the operation number data is advantageous in that the number of the necessary addresses of the PROM such as the mirror codes and the skip codes can be saved, the effect of the operation number data cannot be provided by the mirror codes or skip codes. More particularly, where the pattern is not symmetrical and where a single pattern including straight lines is sewed by using a cloth clamping plate, it is possible to use the operation number data, whereas the mirror codes and the skip codes cannot be used.

Similarly, mirror codes (or skip codes) have inherent characteristics that cannot be substituted by other skip codes (or mirror codes) or operation number data.

ii. In view of the essential concept of this invention that "to construct the control system of a sewing machine with a microcomputer for enabling to use the central processing unit of the computer for programming a PROM, and to align the position of a stylus with a stitch position by operating pulse motors by such means as a joy stick thus storing the number of pulses required for position alignment in a RAM" and that "to move the cloth clamping plate for cutting stitch groove by using the programmed PROM, and to mount a groove cutting tool on the head or table of the sewing machine", the use of the operation number data is not so important. More particularly, when sewing a given pattern, even when all addresses representing the operation number data are set to "1", it is still necessary to use pulse motors for programming the PROM.

Summarizing the above the invention has the following advantages.

1. Since the control system comprises a microcomputer, it is possible to greatly simplify the circuit construction.

2. Since a program operation panel unit is combined with the control system, it is possible to use the central processor unit, read access memory RAM1, pulse motor and the joy stick for storing the data utilized for sewing and groove cutting in the PROM. Thus it is possible to directly store the stitch positions at curved portions of the pattern in the PROM.

3. It is not necessary to align the stylus or the crosspoint of a magnifying lens with all stitch positions along the curve of the pattern when programming the PROM, and along a straight line it is only necessary to align at the first and last stitch positions thereby automatically preparing the data regarding all stitch positions between the first and last stitch positions by the operation of the microcomputer. Accordingly, the programming operation is much simpler than the prior art programming system.

4. Since a joy stick is used, it is possible to automatically feed the stylus, thus making easy the position alignment.

Especially, as it is possible to convert the pulse produced by the joy stick into a pulse having higher frequency by a voltage-frequency converter, the positioning can be effected more easier.

5. Since the program operation panel unit is provided with means for transferring the content of the PROM, it is possible to check or erase the content of the programmed PROM. In other words, comparison of data, correction and modification can be made readily in a case where it is desired to correct or modify the sew curve.

6. With regard to the content of the PROM, as operation number data, mirror codes and skip codes are used in addition to X, Y data (including sign), it is possible to greatly decrease the number of addresses of the ROM where sewing is made by using a clamping plate provided with a plurality of identical patterns or where such patterns are cut, or where one of the patterns is symmetrical. This not only decreases the number of steps for programming the PROM but also greatly decreases the number of addresses regarding the pattern.

7. As shown in FIG. 32, by connecting RAM1 and CPU with the program operation panel unit the panel unit can act as an independent programming device.

8. A cutting tool is mounted on the head of the sewing machine so as to cut a stitch groove through a cloth clamping plate by using a PROM originally programmed for sewing, thereby enabling groove cutting on the table of the sewing machine.

9. Origin returning data are provided by providing X, Y absolute counters for RAM1. For this reason, where a number of identical patterns are sequentially sewed by using the same cloth clamping plate it is possible to correctly align the clamping plate at the origin during second and succeeding sewing operations by merely aligning the start point to the first sewing operation thereby improving the operating efficiency.

In addition, as it is possible to return the cloth clamping plate to the origin by operating an origin return push botton at any time, trouble caused by thread cutting can be avoided.

We claim:

1. A control system of an automatic sewing machine of the type having a sewing head mounted on a table, cloth clamping plates, cloth clamping plates driving means including pulse motors for moving said cloth clamping plates on said table in X and Y axis directions of rectangular coordinates, and pulse generating means, for applying driving pulses to said pulse motors, characterized in that said control system comprises first memory means including a first code region representing the type of control corresponding to a predetermined number of addresses and a second code region to store data required for respective sewing steps; a sewing machine operation panel unit including means for generating control signals for controlling the operation of said sewing machine; a bus line extending between said first memory means and said sewing machine operation panel unit; second memory means connected to said bus line and including a first memory region for storing drive pulses supplied to said pulse motors and said control signals, and a second region for storing data corresponding to an address count value which designates an address of said first memory means, and for storing the type of control and the data in said second code region of said first memory means; a central processor unit connected to said bus line; and a third memory means in the form of a programmable memory means connected to said first and second memory means and to said central processor unit through said bus line, said third memory means containing a program of various instruction groups for sequentially forming operation instructions for operating said pulse motors and said head.

2. The control system according to claim 1 wherein said second code region of said first memory means includes addresses for storing operation number data.

3. The control system according to claim 1 wherein one or more codes representing the type of control are mirror codes which are set by said operation panel.

4. The control system according to claim 1 wherein one or more codes representing the type of control are skip codes which are set by a skip switch provided for said operation panel.

5. The control system according to claim 4 wherein the number of repeating said skip codes is set by the second code region of said first memory means.

6. The control system according to claim 1 wherein said second memory means includes a memory region corresponding to absolute counters which count the absolute values of the movements of said cloth clamping plates in said X and Y axis directions.

7. The control system according to claim 1 wherein said operation unit comprises an origin return switch.

8. The control system according to claim 1 which further comrises a tool removably mounted on said sewing machine and controlled by the output of said first memory means for cutting a stitch groove of a predetermined pattern through said cloth clamping plate.

9. The control system according to claim 8 which further comprises means for vertically moving said tool with respect to said cloth clamping plate.

10. The control system according to claim 1 which further comprises a stylus substituted for said cloth clamping plates, an additional bus line connected to said first mentioned bus line, and a program operation panel unit including a fourth memory means connected to said additional bus line for storing the content of said first memory means, a fifth memory means connected to said additional bus line for storing various instruction groups necessary to process programmed operations, and means for writing the content of said fourth memory means in said first memory means, said program operation panel unit including switch means for setting address and type of control.

11. The control system according to claim 10 wherein said fourth memory means includes a memory region corresponding to operation number data.

12. The control system according to claim 10 wherein said program operation panel unit further comprises means for erasing said first memory means.

13. The control system according to claim 10 wherein said program operation panel unit further comprises switch means for setting data regarding the type of control, and operation numbers in the X and Y directions.

14. The control system according to claim 10 wherein said program operation panel unit further comprises means for setting a stitch pitch of a needle mounted on said head.

15. The control system according to claim 10 wherein said third and fifth memory means are combined into a single memory means with the addresses of said third and fifth memory means divided into separate groups.

16. The control system according to claim 10 wherein said second and fifth memory means are combined into a single memory means with the addresses of said second and fifth memory means divided into separate groups.

17. The control system according to claim 10 wherein said program operation panel unit further comprises means for transferring the content of said first memory means to said fourth memory means.

18. The control system according to claim 1 wherein said program operation panel unit further comprises means for displaying the content of said fourth memory means.

19. The control system according to claim 10 wherein said program operation panel unit further comprises switch means for reading the content of said fourth memory means to perform a sewing operation.

* * * * *